US012580137B2

(12) United States Patent
Hiraoka et al.

(10) Patent No.: US 12,580,137 B2
(45) Date of Patent: Mar. 17, 2026

(54) CURRENT SEPARATION METHOD, PREDICTION METHOD, SYSTEM AND LIKE OF NONAQUEOUS LITHIUM POWER STORAGE ELEMENT

(71) Applicant: Asahi Kasei Kabushiki Kaisha, Tokyo (JP)

(72) Inventors: Koichi Hiraoka, Tokyo (JP); Fumiya Nakamura, Tokyo (JP); Ryusuke Okoshi, Tokyo (JP); Yusuke Morikawa, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/025,506

(22) PCT Filed: May 30, 2022

(86) PCT No.: PCT/JP2022/021950

§ 371 (c)(1),
(2) Date: Jun. 26, 2024

(87) PCT Pub. No.: WO2023/105817

PCT Pub. Date: Jun. 15, 2023

(65) Prior Publication Data

US 2025/0111997 A1 Apr. 3, 2025

(30) Foreign Application Priority Data

Dec. 10, 2021 (JP) ................................ 2021-201089
Dec. 10, 2021 (JP) ................................ 2021-201107
Dec. 10, 2021 (JP) ................................ 2021-201108

(51) Int. Cl.
*H01G 11/14* (2013.01)
*H01G 11/06* (2013.01)
(Continued)

(52) U.S. Cl.
CPC ............ *H01G 11/14* (2013.01); *H01G 11/06* (2013.01); *H01G 11/08* (2013.01); *H01G 11/50* (2013.01); *H01G 11/86* (2013.01)

(58) Field of Classification Search
CPC ........ H01G 11/14; H01G 11/06; H01G 11/08; H01G 11/50; H01G 11/86
See application file for complete search history.

(56) References Cited

U.S. PATENT DOCUMENTS

2003/0099884 A1* 5/2003 Chiang ................. H01G 11/28 429/231.95
2010/0153038 A1* 6/2010 Tomura ............. G01R 31/3842 702/63
(Continued)

FOREIGN PATENT DOCUMENTS

CN 108701553 A 10/2018
CN 108802620 A 11/2018
(Continued)

OTHER PUBLICATIONS

International Search Report issued in corresponding International Patent Application No. PCT/JP2022/028944 dated Oct. 18, 2022.
(Continued)

*Primary Examiner* — Lisa M Caputo
*Assistant Examiner* — Sharah Zaab
(74) *Attorney, Agent, or Firm* — Morgan, Lewis & Bockius LLP

(57) ABSTRACT

The present disclosure relates to a current separation method and the like of a nonaqueous lithium power storage element. In the current separation method, the nonaqueous lithium power storage element includes a cell including: a positive electrode precursor that includes a positive electrode active material layer containing lithium carbonate and activated carbon; a negative electrode that includes a negative electrode active material layer containing a negative electrode
(Continued)

active material capable of occluding and releasing lithium; a separator arranged between the positive electrode precursor and the negative electrode; and an electrolyte solution. The current separation method includes the step of calculating a capacitor current $I_C$ and an electrode reaction current $I_d$ of the cell based on voltage and current of the cell that are measured during doping of the cell.

17 Claims, 19 Drawing Sheets

(51) Int. Cl.
*H01G 11/08* (2013.01)
*H01G 11/50* (2013.01)
*H01G 11/86* (2013.01)

(56) References Cited

U.S. PATENT DOCUMENTS

2018/0198300 A1 7/2018 Howey et al.
2018/0313906 A1* 11/2018 Takahashi .......... G01R 31/3842
2019/0027320 A1* 1/2019 Kimura ............. H01M 10/0567
2019/0074143 A1 3/2019 Naoi et al.
2019/0157891 A1* 5/2019 Chemali ............... H02J 7/0047
2019/0198941 A1 6/2019 Oniki et al.
2020/0091567 A1 3/2020 Takahashi
2022/0190380 A1 6/2022 Hirakawa et al.

FOREIGN PATENT DOCUMENTS

JP 2008-241246 A 10/2008
JP 5036662 B2 9/2012
JP 2014-032825 A 2/2014
JP 2015-050062 A 3/2015
JP 2015-228324 A 12/2015
JP 2018-056410 A 4/2018
JP 2019-114475 A 7/2019
JP 2020-047587 A 3/2020
JP 2020-167350 A 10/2020

OTHER PUBLICATIONS

Written Opinion issued in corresponding International Patent Application No. PCT/JP2022/028944 dated Jul. 26, 2022.
Supplementary European Search Report issued in European Patent Application No. 22862403.7 dated May 6, 2024.
Li et al., "Physics-informed neural networks for electrode-level state estimation in lithium-ion batteries," Journal of Power Sources, 506: 230034 (2021).
Nascimento et al., "Hybrid physics-informed neural networks for lithium-ion battery modeling and prognosis," Journal of Power Sources, 513: 230526 (2021).
Kuchly et al., "Li-ion battery SOC estimation method using a Neural Network trained with data generated by a P2D model," IFAC Papers Online, 54 (10): 336-343 (2021).
Wu et al., "Application of artificial neural networks in design of lithium-ion batteries," Journal of Power Sources, 395: 128-136 (2018).
International Preliminary Report on Patentability issued in International Patent Application No. PCT/JP2022/028944 dated Feb. 29, 2024.
Notice of Reasons for Refusal issued in related Japanese Patent Application No. 2022-560999 dated Feb. 28, 2023.
Decision to Grant issued in related Japanese Patent Application No. 2022-560999 dated Jun. 6, 2023.

* cited by examiner

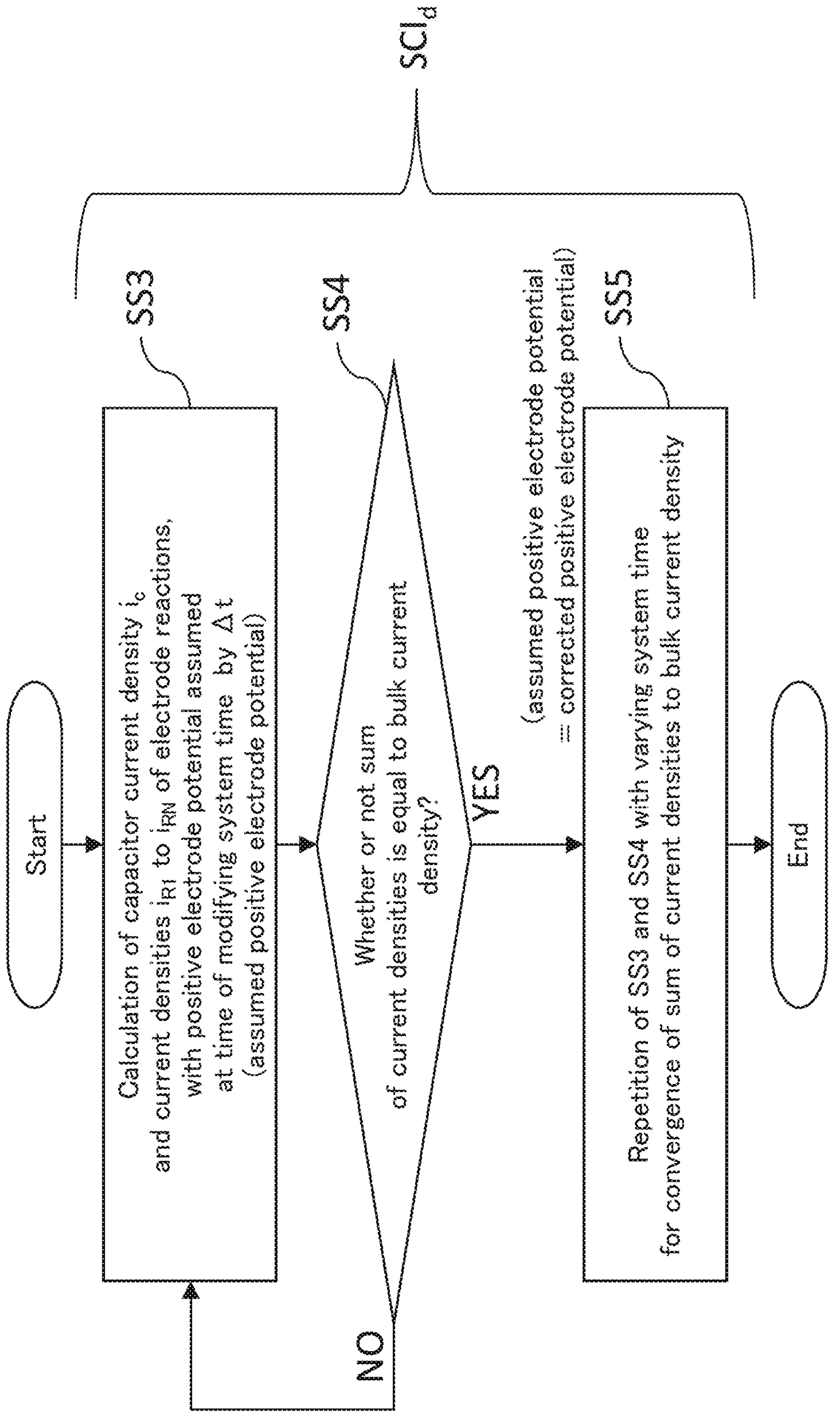

FIG. 7

Start

SS3

Calculation of capacitor current density $i_c$ and current densities $i_{R1}$ to $i_{RN}$ of electrode reactions, with positive electrode potential assumed at time of modifying system time by $\Delta t$ (assumed positive electrode potential)

SS4

Whether or not sum of current densities is equal to bulk current density?

NO

YES (assumed positive electrode potential = corrected positive electrode potential)

SS5

Repetition of SS3 and SS4 with varying system time for convergence of sum of current densities to bulk current density End $SCI_d$

CURRENT SEPARATION METHOD, PREDICTION METHOD, SYSTEM AND LIKE OF NONAQUEOUS LITHIUM POWER STORAGE ELEMENT

FIELD

The present disclosure relates to a current separation method, a prediction method, a system, and the like of a nonaqueous lithium power storage element.

BACKGROUND

In recent years, from the viewpoint of effective energy utilization aimed at global environmental conservation and resource saving, a great deal of attention is being drawn to, for example, power smoothing systems and nighttime power storage systems for wind power generation, household distributed power storage systems based on photovoltaic power generation technologies, and power storage systems for electric vehicles. Batteries used in these power storage systems are demanded to have a high energy density. As a promising candidate for a high-energy-density battery that can meet such a demand, nonaqueous lithium power storage elements have been actively developed.

A method of producing a nonaqueous lithium power storage element generally includes, after assembling a cell that includes a positive electrode having a positive electrode active material layer containing a positive electrode active material, a negative electrode having a negative electrode active material layer containing a negative electrode active material, a separator arranged between the positive electrode and the negative electrode, and an electrolyte solution, the doping step of doping the negative electrode active material with lithium ions. A conventional general doping method includes: assembling a cell using a negative electrode that has a negative electrode active material layer obtained by laminating lithium metal foils; subsequently dissolving the lithium metal foils by applying a voltage to the cell; and allowing the negative electrode active material layer to occlude lithium ions. In recent years, for example, as disclosed in PTL 1, a lithium carbonate decomposition-type doping method including: assembling a cell using a positive electrode precursor that has a positive electrode active material layer containing lithium carbonate and activated carbon; subsequently applying a voltage to the cell to decompose lithium carbonate; and allowing a negative electrode active material to occlude the resulting lithium ions is known.

CITATION LIST

Patent Literature

[PTL 1] Japanese Unexamined Patent Publication (Kokai) No. 2020-167350

[PTL 2] Japanese Unexamined Patent Publication (Kokai) No. 2008-241246

[PTL 3] Japanese Unexamined Patent Publication (Kokai) No. 2019-114475

SUMMARY

Technical Problem

When the same materials are used in nonaqueous lithium power storage elements, their performance (e.g., cell capacity, cell resistance, and self-discharge performance) are greatly affected by the status of the progress of electrode reactions in the doping step. In a lithium carbonate decomposition-type doping method, it is believed that various electrode reactions occur in addition to an electrode reaction of decomposing lithium carbonate (main reaction), and that the status of the progress of each electrode reaction varies with the progress of the doping step. Therefore, it is difficult to predict the performance of the resulting nonaqueous lithium power storage element.

Generally, as means for estimating the internal state of a secondary battery during charging and discharging, for example, a method of electrochemically estimating electrode reactions based on information such as voltage, current, and temperature of the secondary battery is employed. For instance, PTL 2 discloses an apparatus which detects the voltage, the current, and the temperature of a secondary battery during charging and discharging, dynamically estimates the internal state according to a battery model, and thereby estimates the charging rate of the battery more accurately. PTL 3 discloses a secondary battery system which estimates the state of lithium deposition on a negative electrode of a lithium ion secondary battery by calculating the negative electrode potential using a battery model or the like for calculation of lithium concentration distribution inside a negative electrode active material, and subsequently correcting the negative electrode potential with the state of charge (SOC) of the secondary battery, an average current value in a charging period, and an integrated current value in the charging period. However, with regard to the lithium carbonate decomposition-type doping step of a nonaqueous lithium power storage element, there has not been developed a method of predicting the performance of the resulting nonaqueous lithium power storage element.

In view of the above, an object of the present disclosure is to provide a method, a system, and the like that can predict the performance of a nonaqueous lithium power storage element produced by a lithium carbonate decomposition-type doping method, as well as a current separation method that can be utilized for the same.

Solution to Problem

Embodiments of the present disclosure are exemplified below.

[1]

A current separation method of a nonaqueous lithium power storage element, wherein the nonaqueous lithium power storage element includes a cell including: a positive electrode precursor that contains a positive electrode active material layer containing lithium carbonate and activated carbon; a negative electrode that contains a negative electrode active material layer containing a negative electrode active material capable of occluding and releasing lithium; a separator arranged between the positive electrode precursor and the negative electrode; and an electrolyte solution, and the method includes the step of calculating a capacitor current $I_C$ and an electrode reaction current $I_d$ of the cell based on voltage and current of the cell that are measured during doping of the cell.

[2]

A prediction method, including the step of using parameters calculated from the capacitor current $I_C$ and the electrode reaction current $I_d$ that are calculated by the current separation method according to [1].

[3]

The prediction method according to [1] or [2], including:

the measurement step of measuring a positive electrode potential E (V) of the cell during doping of the cell;

the step of calculating the capacitor current $I_C$ (A) of the cell based on the thus measured positive electrode potential E (V) of the cell;

the parameter calculation step of calculating at least one parameter selected from the group of parameters consisting of an integrated capacity parameter of the capacitor current $I_C$ (A), a positive electrode potential change parameter of a current capacity Q (mAh) of the capacitor current $I_C$ (A), and a temporal change parameter of the positive electrode potential E (V), in a constant-current (CC) charged region; and the prediction step of inputting the thus calculated parameter to a learned model which has learned the correlations between the group of parameters and the performance of the nonaqueous lithium power storage element, and outputting the performance of the nonaqueous lithium power storage element, which performance includes at least one selected from the group consisting of cell capacity, cell resistance, and self-discharge performance.

[4]

The prediction method according to [3], wherein the capacitor current $I_C$ (A) is calculated by the following equation:

[Math. 1]

$$I_C = C\frac{dE}{dt}$$

{wherein, $I_C$ represents the capacitor current (A); C represents a capacitor capacity ($F/m^2$) of the cell; E represents the measured positive electrode potential E (V); and t represents time (s)}, and in the parameter calculation step, at least one parameter selected from the group of parameters is calculated based on the capacitor current $I_C$ (A) calculated from the measured positive electrode potential E (V), or based on the measured positive electrode potential E (V).

[5]

The prediction method according to [3] or [4], including:

(1) the doping condition setting step of setting doping conditions including input current or input voltage;

(2) the measurement step of measuring the positive electrode potential E (V) and a bulk current density i ($A/m^2$) of the cell while applying the input current or the input voltage to the cell;

(3) the current calculation step of, with an assumed positive electrode potential E (V) assumed at the time of modifying the system time by Δt based on the measured positive electrode potential E (V) of the cell, calculating the capacitor current $I_C$ (A) of the cell by the following equation, calculating a capacitor current density $i_C$ ($A/m^2$) of the cell by dividing the capacitor current $I_C$ (A) by a positive electrode precursor area ($m^2$), and calculating, based on the Butler-Volmer equation and the diffusion equation, a current density $i_{R1}$ ($A/m^2$) of an electrode reaction 1 which is a main reaction in which lithium carbonate is decomposed to release lithium ions and electrons, as well as current densities $i_{R2}$ ($A/m^2$) to $i_{RN}$ ($A/m^2$) of electrode reactions 2 to N (wherein, N represents an integer of 3 or larger) which are side reactions:

[Math. 2]

$$I_C = C\frac{dE}{dt}$$

{wherein, $I_C$ represents the capacitor current (A); C represents a capacitor capacity ($F/m^2$) of the cell; E represents the assumed positive electrode potential E (V); and t represents time (s)};

(4) the positive electrode potential correction step of correcting the assumed positive electrode potential E (V) such that a total current density of the capacitor current density $i_C$ and the current densities $i_{R1}$ to $i_{RN}$ of the respective electrode reactions is equal to the bulk current density i, and thereby obtaining a corrected positive electrode potential E (V); and (5) the current separation step of repeating the steps (3) and (4) while modifying the system time such that the total current density converges to the bulk current density i, wherein in the parameter calculation step, at least one parameter selected from the group of parameters is calculated based on the capacitor current $I_C$ (A) calculated from the assumed positive electrode potential E (V), or based on the corrected positive electrode potential E (V).

[6]

The prediction method according to any one of [3] to [5], wherein parameters of the group of parameters are each calculated in a positive electrode potential E (V) range of x (V) to y (V) {wherein, x and y are each independently 3.3 V to 3.8 V and satisfy $x<y$} in the constant-current (CC) charged region.

[7]

The prediction method according to [5] or [6], wherein the calculations in the step (3) are performed based on the following standards:

(i) in a case where the measured positive electrode potential E (V) is lower than an onset potential of an electrode reaction x (wherein, x corresponds to 1 to N), the current density $i_{Rx}$ of the electrode reaction x is not generated (0 $A/m^2$);

(ii) in a case where the measured positive electrode potential E (V) is equal to or higher than the onset potential of the electrode reaction x, the current density of the electrode reaction x is determined by the Butler-Volmer equation and, when the thus determined current density is lower than a limiting current density of the electrode reaction x, this current density is defined as the current density $i_{Rx}$ of the electrode reaction x; and (iii) in a case where the current density determined based on the above-described (ii) is equal to or higher than the limiting current density of the electrode reaction x, a current density determined by the diffusion equation and the Butler-Volmer equation is defined as the current density $i_{Rx}$ of the electrode reaction x.

[8]

A production condition prediction method of a nonaqueous lithium power storage element using the learned model according to any one of [3] to [7], wherein the nonaqueous lithium power storage element includes a cell including: a positive electrode precursor that contains a positive electrode active material layer containing lithium carbonate and activated carbon; a negative electrode that contains a negative electrode active material layer containing a negative electrode active material capable of occluding and releasing lithium; a separator arranged between the positive electrode precursor and the negative electrode; and an electrolyte solution, and the production condition prediction method includes executing:

the step of inputting performance required for the nonaqueous lithium power storage element to the learned model; and the step of inputting the required performance to the learned model and outputting at least one production condition selected from the group consisting of electrode production conditions, doping conditions, aging conditions, and cell design.

[9]

A method of producing the learned model according to any one of [3] to [7], the method including:

the step of doping of a cell of a nonaqueous lithium power storage element, the cell including: a positive electrode precursor that contains a positive electrode active material layer containing lithium carbonate and activated carbon; a negative electrode that contains a negative electrode active material layer containing a negative electrode active material capable of occluding and releasing lithium; a separator arranged between the positive electrode precursor and the negative electrode; and an electrolyte solution;

the step of calculating: at least one parameter selected from the group of parameters consisting of an integrated capacity parameter of an electrode reaction current $I_d$ (A), a positive electrode potential change parameter of a current capacity (mAh) of the electrode reaction current $I_d$ (A), and a temporal change parameter of the positive electrode potential E (V), in a constant-current (CC) charged region; or the group of parameters consisting of an integrated capacity parameter of the capacitor current $I_C$ (A), a positive electrode potential change parameter of a current capacity Q (mAh) of the capacitor current $I_C$ (A), and a temporal change parameter of the positive electrode potential E (V), in the constant-current (CC) charged region, which parameters are obtained from the doping step of the cell; and the step of inputting, as training data, the thus calculated at least one parameter and performance data of the doped cell to a machine learning model, and thereby allowing the machine learning model to learn the correlations between the at least one parameter and the performance data.

[10]

A prediction method of a nonaqueous lithium power storage element, the method using the nonaqueous lithium power storage element according to any one of [1] to [9], and including:

the measurement step of measuring a positive electrode potential E (V) and a bulk current I (A) of the cell during doping of the cell;

the step of calculating a capacitor current $I_C$ (A) based on the thus measured positive electrode potential E (V) of the cell, and calculating an electrode reaction current $I_d$ (A) of the cell by subtracting the capacitor current $I_C$ (A) from the bulk current I (A);

the parameter calculation step of calculating at least one parameter selected from the group of parameters consisting of an integrated capacity parameter of the electrode reaction current $I_d$ (A), a positive electrode potential change parameter of a current capacity (mAh) of the electrode reaction current $I_d$ (A), and a temporal change parameter of the positive electrode potential E (V), in a constant-current (CC) charged region; and the prediction step of inputting the thus calculated parameter to a learned model which has learned the correlations between the group of parameters and the durability performance of the nonaqueous lithium power storage element, and outputting the durability performance of the nonaqueous lithium power storage element.

[11]

The prediction method according to [10], wherein the electrode reaction current $I_d$ (A) is calculated by the following equations:

[Math. 3]

$$I_C = C\frac{dE}{dt}$$

$$I_d = I - I_C$$

{wherein, $I_C$ represents the capacitor current (A); C represents a capacitor capacity (F/m$^2$) of the cell; E represents the measured positive electrode potential (V); t represents time (s); and I represents the bulk current (A)}, and in the parameter calculation step, at least one parameter selected from the group of parameters is calculated based on the electrode reaction current $I_d$ (A) calculated from the measured positive electrode potential E (V), or based on the measured positive electrode potential E (V).

[12]

The prediction method according to [10] or [11], including:

(1) the doping condition setting step of setting doping conditions including input current or input voltage;

(2) the measurement step of measuring the positive electrode potential E (V) and the bulk current I (A) of the cell while applying the input current or the input voltage to the cell;

(3) the current calculation step of, with an assumed positive electrode potential E (V) assumed at the time of modifying the system time by Δt based on the measured positive electrode potential E (V) of the cell, calculating the capacitor current $I_C$ (A) and the electrode reaction current $I_d$ (A) of the cell by the following equations, calculating a bulk current density i (A/m$^2$) and a capacitor current density $i_C$ (A/m$^2$) by dividing the bulk current I (A) and the capacitor current $I_C$ (A) by a positive electrode precursor area (m$^2$), respectively, and calculating, based on the Butler-Volmer equation and the diffusion equation, a current density $i_{R1}$ (A/m$^2$) of an electrode reaction 1 which is a main reaction in which lithium carbonate is decomposed to release lithium ions and electrons, as well as current densities $i_{R2}$ (A/m$^2$) to $i_{RN}$ (A/m$^2$) of electrode reactions 2 to N (wherein, N represents an integer of 3 or larger) which are side reactions:

[Math. 4]

$$I_C = C\frac{dE}{dt}$$

$$I_d = I - I_C$$

{wherein, $I_C$ represents the capacitor current (A); C represents a capacitor capacity (F/m$^2$) of the cell; E represents the assumed positive electrode potential (V); t represents time (s); and I represents the bulk current (A)};

(4) the positive electrode potential correction step of correcting the assumed positive electrode potential E (V) such that a total current density of the capacitor current density $i_C$ and the current densities $i_{R1}$ to $i_{RN}$ of the respective electrode reactions is equal to the bulk current density i, and thereby obtaining a corrected positive electrode potential E (V); and (5) the current separation step of repeating the steps (3) and (4) while modifying the system time such that the total current density converges to the bulk current density i, wherein in the parameter calculation step, at least one parameter selected from the group of parameters is calculated based on the electrode reaction current $I_d$ (A) calculated from the assumed positive electrode potential E (V), or based on the corrected positive electrode potential E (V).

[13]

The prediction method according to [12], wherein parameters of the group of parameters are each calculated in a positive electrode potential E (V) range of x (V) to y (V) {wherein, x and y are each independently larger than 3.8 V and satisfy x<y} in the constant-current (CC) charged region.

[14]

The prediction method according to [12] or [13], wherein the calculations in the step (3) are performed based on the following standards:

(i) in a case where the measured positive electrode potential E (V) is lower than an onset potential of an electrode reaction x (wherein, x corresponds to 1 to N), the current density $i_{Rx}$ of the electrode reaction x is not generated (0 A/m$^2$);

(ii) in a case where the measured positive electrode potential E (V) is equal to or higher than the onset potential of the electrode reaction x, the current density of the electrode reaction x is determined by the Butler-Volmer equation and, when the thus determined current density is lower than a limiting current density of the electrode reaction x, this current density is defined as the current density $i_{Rx}$ of the electrode reaction x; and (iii) in a case where the current density determined based on the above-described (ii) is equal to or higher than the limiting current density of the electrode reaction x, a current density determined by the diffusion equation and the Butler-Volmer equation is defined as the current density $i_{Rx}$ of the electrode reaction x.

[15]

The prediction method according to [14], wherein in the standard (ii), the Butler-Volmer equation of the respective electrode reactions 1 to N is represented by:

[Math. 5]

$$i_{RX} = i_{Ox}\left\{\left(\frac{C_{Rx}}{C_{Rx}^e}\right)^{m_x}\exp\left(\frac{\alpha_x n_x F}{RT}\eta_x\right) - \exp\left(-\frac{(1-\alpha_x)n_x F}{RT}\eta_x\right)\right\}$$

$$\eta_x = E - E_x^{eq}$$

{wherein, $i_{Rx}$ represents the current density (A/m$^2$) of the electrode reaction x (wherein, x corresponds to 1 to N); $i_{0x}$ represents an exchange current density (A/m$^2$) of the electrode reaction x; $C_{Rx}$ and $C^e_{Rx}$ represent a reductant surface concentration (mol/m$^3$) and a reductant bulk concentration (mol/m$^3$) of the electrode reaction x, respectively; $m_x$ represents a reaction order (=1); ax represents a symmetry factor of the electrode reaction x; $n_x$ represents a valence of the electrode reaction x; F represents the Faraday constant; R represents the gas constant; T represents the temperature (K); $\eta_x$ represents an overvoltage (V) of the electrode reaction x; E represents the assumed positive electrode potential (V); and $E_x^{eq}$ represents the onset potential (V) of the electrode reaction x}, and in the standard (iii), the diffusion equation of the respective electrode reactions 1 to N is represented by:

[Math. 6]

$$\frac{\partial C_{Rx}}{\partial t} = D_x\frac{\partial^2 C_{Rx}}{\partial r^2}$$

{wherein, t represents time (s); $C_{Rx}$ represents the reductant surface concentration (mol/m$^3$) of the electrode reaction x (wherein, x corresponds to 1 to N); $D_x$ represents a reductant diffusion coefficient (m$^2$/s); and r represents a diffusion layer thickness (m)}, with a proviso that:

when r=0,

[Math. 7]

$$C_{Rx} = C_{Rx}^e$$

{wherein, $C^e_{Rx}$ represents the reductant bulk concentration (mol/m$^3$)}; or when r=$L_0$ (diffusion layer thickness),

[Math. 8]

$$-D_x\frac{\partial C_{Rx}}{\partial r} = Q_x = \frac{i_{Rx}}{n_x F}$$

{wherein, $n_x$ represents the valence of the electrode reaction x; F represents the Faraday constant; $Q_x$ represents a reductant mass flux (mol/m$^2$s); and $i_{Rx}$ represents the current density (A/m$^2$) of the electrode reaction x}.

[16]

The prediction method according to any one of [12] to [15], wherein the side reactions include an electrode reaction that is a water splitting reaction, and an electrode reaction that is a decomposition reaction of an electrolyte solution solvent.

[17]

The prediction method according to any one of [10] to [16], wherein the learned model used for predicting the durability performance of the nonaqueous lithium power storage element is a learned model which has learned the correlations between:

at least one parameter selected from the group of parameters consisting of an integrated capacity parameter of an electrode reaction current $I_d$ (A), a positive electrode potential change parameter of a current capacity (mAh) of the electrode reaction current $I_d$ (A), and a temporal change parameter of the positive electrode potential E (V), in a constant-current (CC) charged region; or the group of parameters consisting of an integrated capacity parameter of the capacitor current $I_C$ (A), a positive electrode potential change parameter of a current capacity Q (mAh) of the capacitor current $I_C$ (A), and a temporal change parameter of the positive electrode potential E (V), in the constant-current (CC) charged region, which parameters are obtained from the doping step of the cell; and electrode production conditions, doping conditions, aging conditions, cell design, and the cell performance.

[18]

A learned model, obtained based on the method according to any one of [1] to [17].

[19]

A system for predicting the performance of a nonaqueous lithium power storage element, the system using the nonaqueous lithium power storage element according to any one of [1] to [18], and including:

a measurement device which measures the positive electrode potential E (V) of the cell, and/or a measurement device which measures the positive electrode potential E (V) and the bulk current I (A) of the cell;

an arithmetic device which calculates the group of parameters based on the positive electrode potential E (V) measured by the measurement device, extracts a sample matching the thus calculated parameters from a learned model which has learned the correlations between the group of parameters and the performance of the nonaqueous lithium power storage element, and predicts the performance of the nonaqueous lithium power storage element;

a memory device which stores programs, parameters, and learned model for allowing the arithmetic device to execute the calculation and the prediction; and an output device which outputs the results of the prediction.

[20]

A method of producing a nonaqueous lithium power storage element, the method including predicting at least one performance selected from the group consisting of cell capacity, cell resistance, and self-discharge performance by the prediction method according to any one of [2] to [17] at the time of doping the nonaqueous lithium power storage element, and not performing an inspection of the thus predicted performance.

[21]

A production condition prediction method of a nonaqueous lithium power storage element using the learned model according to any one of [10] to [20], wherein the nonaqueous lithium power storage element includes a cell including: a positive electrode precursor that contains a positive electrode active material layer containing lithium carbonate and activated carbon; a negative electrode that contains a negative electrode active material layer containing a negative electrode active material capable of occluding and releasing lithium; a separator arranged between the positive electrode precursor and the negative electrode; and an electrolyte solution, and the production condition prediction method includes executing:

the step of inputting performance required for the nonaqueous lithium power storage element to the learned model; and the step of inputting the required performance to the learned model and outputting at least one production condition selected from the group consisting of electrode production conditions, doping conditions, aging conditions, and cell design.

[22]

A method of producing the learned model according to any one of [10] to [21], the method including:

the step of doping of a cell of a nonaqueous lithium power storage element, the cell including: a positive electrode precursor that contains a positive electrode active material layer containing lithium carbonate and activated carbon; a negative electrode that contains a negative electrode active material layer containing a negative electrode active material capable of occluding and releasing lithium; a separator arranged between the positive electrode precursor and the negative electrode; and an electrolyte solution;

the step of calculating: at least one parameter selected from the group of parameters consisting of an integrated capacity parameter of an electrode reaction current $I_d$ (A), a positive electrode potential change parameter of a current capacity (mAh) of the electrode reaction current $I_d$ (A), and a temporal change parameter of the positive electrode potential E (V), in a constant-current (CC) charged region; or the group of parameters consisting of an integrated capacity parameter of the capacitor current $I_C$ (A), a positive electrode potential change parameter of a current capacity Q (mAh) of the capacitor current $I_C$ (A), and a temporal change parameter of the positive electrode potential E (V), in the constant-current (CC) charged region, which parameters are obtained from the doping step of the cell; and the step of inputting, as training data, the thus calculated at least one parameter and performance data of the doped cell to a machine learning model, and thereby allowing the machine learning model to learn the correlations between the at least one parameter and the performance data.

[23]

A cell state determination method of a nonaqueous lithium power storage element, the method using the nonaqueous lithium power storage element according to any one of [1] to [22], and including:

(S1) the doping condition setting step of setting doping conditions including cell temperature and input voltage;

(S2) the measurement step of measuring a positive electrode potential E (V) and a bulk current density i ($A/m^2$) of the cell while applying the input voltage to the cell;

(S3) the current calculation step of calculating a capacitor current $I_C$ of the cell and a current $I_d$ originating from electrode reactions by current separation in accordance with the current separation method according to [1] based on the positive electrode potential E and the bulk current density i of the cell, which are measured in the step (S2), and a positive electrode precursor area ($m^2$), using the following equations:

[Math. 9]

$$I_C = C\frac{dE}{dt}$$

$$I_d = I - I_c$$

$$i_d = i - i_c$$

{wherein, I represents a bulk current (A); i represents a bulk current density ($A/m^2$); $I_d$ represents the current (A) originating from electrode reactions; $i_d$ represents a current density ($A/m^2$) originating from the electrode reactions; $I_C$ represents the capacitor current (A) of the cell; $i_C$ represents a capacitor current density ($A/m^2$) of the cell; C represents a capacitor capacity (F); E represents the positive electrode potential E (V) of the cell; and t represents time (s)}; and (S4) the state determining step of determining the state of the cell from a temporal change ($dI_d/dt$) of the current $I_d$ originating from the electrode reactions.

[24]

The cell state determination method according to [23], wherein, in the state determining step:

the state of the cell is determined based on an integrated capacity value of at least one selected from the capacitor current $I_C$ of the cell and the current $I_d$ originating from electrode reactions, or the state of the cell is determined by extracting sample information approximate to required characteristics from a learning model including an integrated capacity value of at least one selected from the capacitor current $I_C$ of the cell and the current $I_d$ originating from electrode reactions.

[25]

The cell state determination method according to [23] or [24], wherein the current $I_d$ originating from electrode reactions is composed of currents of electrode reactions including the following as main components:

main reaction: decomposition reaction of lithium carbonate;

side reaction 1: water splitting reaction; and side reaction 2: decomposition reaction of an electrolyte solution solvent, and the integrated capacity value of a specific current that serves as a criterion of determination in the state determining step is one of the following:

the integrated capacity value of the current of the main reaction is 5 $Ah/m^2$ to 10 $Ah/m^2$ the integrated capacity value of the current of the side reaction 1 is 0.01 $Ah/m^2$ to 0.3 $Ah/m^2$, and the integrated capacity value of the current of the side reaction 2 is 0.05 $Ah/m^2$ to 0.5 $Ah/m^2$.

[26]

The cell state determination method according to any one of [23] to [25], wherein the current $I_d$ originating from electrode reactions is composed of currents of electrode reactions including the following as main components:

main reaction: decomposition reaction of lithium carbonate;

side reaction 1: water splitting reaction; and side reaction 2: decomposition reaction of an electrolyte solution solvent, the main components are defined by the following procedures:

(SS3) the current density calculation step of assuming the positive electrode potential E (V) at the time of modifying the system time by Δt, calculating the capacitor current density $i_c$ ($A/m^2$) of the cell, and calculating the current of each of the main reaction in which lithium carbonate is decomposed to release lithium ions and electrons, the side reaction 1 which is a water splitting reaction, and the side reaction 2 which is a decomposition reaction of an electrolyte solution solvent, based on the below-described standards;

(SS4) the positive electrode potential correction step of correcting the thus assumed positive electrode potential E such that a total current density of the capacitor current $i_C$ and the current densities $i_{R1}$ to $i_{RN}$ of the respective electrode reactions is equal to the bulk current density i, and thereby obtaining a corrected positive electrode potential E; and (SS5) the current separation step of repeating the steps (SS3) and (SS4) while modifying the system time such that the total current density converges to the bulk current density i, and the standards in the step (SS3) are the following:

(i) in a case where the measured positive electrode potential E is lower than an onset potential of an electrode reaction x (wherein, x corresponds to 1 to N), the current density $i_{Rx}$ of the electrode reaction x is not generated (0 $A/m^2$);

(ii) in a case where the measured positive electrode potential E (V) is equal to or higher than the onset potential of the electrode reaction x, the current density of the electrode reaction x is determined by the Butler-Volmer equation and, when the thus determined current density is lower than a limiting current density of the electrode reaction x, this current density is defined as the current density $i_{Rx}$ of the electrode reaction x; and (iii) in a case where the current density determined based on the above-described (ii) is equal to or higher than the limiting current density of the electrode reaction x, a current density determined by the diffusion equation and the Butler-Volmer equation is defined as the current density $i_{Rx}$ of the electrode reaction x.

[Claim 27]

The cell state determination method according to claim 23, wherein the current $I_d$ originating from electrode reactions is composed of currents of electrode reactions comprising the following as main components:

main reaction: decomposition reaction of lithium carbonate;

side reaction 1: water splitting reaction; and side reaction 2: decomposition reaction of an electrolyte solution solvent, the main components are defined by the following procedures:

(SS3) the current density calculation step of assuming the positive electrode potential E (V) at the time of modifying the system time by Δt, calculating the capacitor current density $i_c$ ($A/m^2$) of the cell, and calculating the current of each of the main reaction in which lithium carbonate is decomposed to release lithium ions and electrons, the side reaction 1 which is a water splitting reaction, and the side reaction 2 which is a decomposition reaction of an electrolyte solution solvent, based on the below-described standards;

(SS4) the positive electrode potential correction step of correcting the thus assumed positive electrode potential E such that a total current density of the capacitor current $i_C$ and the current densities $i_{R1}$ to $i_{RN}$ of the respective electrode reactions is equal to the bulk current density i, and thereby obtaining a corrected positive electrode potential E; and (SS5) the current separation step of repeating the steps (SS3) and (SS4) while modifying the system time such that the total current density converges to the bulk current density i, and the standards in the step (SS3) are the following:

(i) in a case where the measured positive electrode potential E is lower than an onset potential of an electrode reaction x (wherein, x corresponds to 1 to N), the current density $i_{Rx}$ of the electrode reaction x is not generated (0 A/m$^2$);

(ii) in a case where the measured positive electrode potential E (V) is equal to or higher than the onset potential of the electrode reaction x, the current density of the electrode reaction x is determined by the Butler-Volmer equation and, when the thus determined current density is lower than a limiting current density of the electrode reaction x, this current density is defined as the current density $i_{Rx}$ of the electrode reaction x; and (iii) in a case where the current density determined based on the above-described (ii) is equal to or higher than the limiting current density of the electrode reaction x, a current density determined by the diffusion equation and the Butler-Volmer equation is defined as the current density $i_{Rx}$ of the electrode reaction x.

[28]

A method of producing a nonaqueous lithium power storage element, the method including the cell state determination method according to any one of [23] to [27].

Advantageous Effects of Invention

According to the present disclosure, a method, a system, and the like that can predict the performance of a nonaqueous lithium power storage element produced by a lithium carbonate decomposition-type doping method are provided. In addition, according to the present disclosure, a current separation method that can be utilized in the aforementioned method, system, and the like is provided.

BRIEF DESCRIPTION OF DRAWINGS

FIG. 7 is a flow chart describing one example of the step of calculating the current density of each electrode reaction according to the present disclosure.

DESCRIPTION OF EMBODIMENTS

<<Performance Prediction Method of Nonaqueous Lithium Power Storage Element>>

The current separation method, the performance prediction method (including the durability performance prediction method), the cell state determination method, and the like of a nonaqueous lithium power storage element according to the present disclosure pertains to a nonaqueous lithium power storage element produced by a lithium carbonate decomposition-type doping method. In other words, the current separation method, the performance prediction method, the cell state determination method, and the like according to the present disclosure pertain to a nonaqueous lithium power storage element which includes a cell including: a positive electrode precursor that includes a positive electrode active material layer containing lithium carbonate and activated carbon; a negative electrode that includes a negative electrode active material layer containing a negative electrode active material capable of occluding and releasing lithium; a separator arranged between the positive electrode precursor and the negative electrode; and an electrolyte solution. By using a positive electrode precursor that includes a positive electrode active material layer containing lithium carbonate and activated carbon, lithium carbonate is decomposed in the doping step to release lithium ions, and these lithium ions can be occluded by a negative electrode active material. Hereinafter, a positive electrode prior to the completion of the doping step is referred to as "positive electrode precursor" and distinguished from a "positive electrode" on which the doping step has been completed. The performance prediction method of the present disclosure may be performed on a single cell, or may be performed on a cell stack of a nonaqueous lithium power storage element that includes two or more cells. The term "cell" used herein encompasses a single cell and a cell stack.

Figure 1:
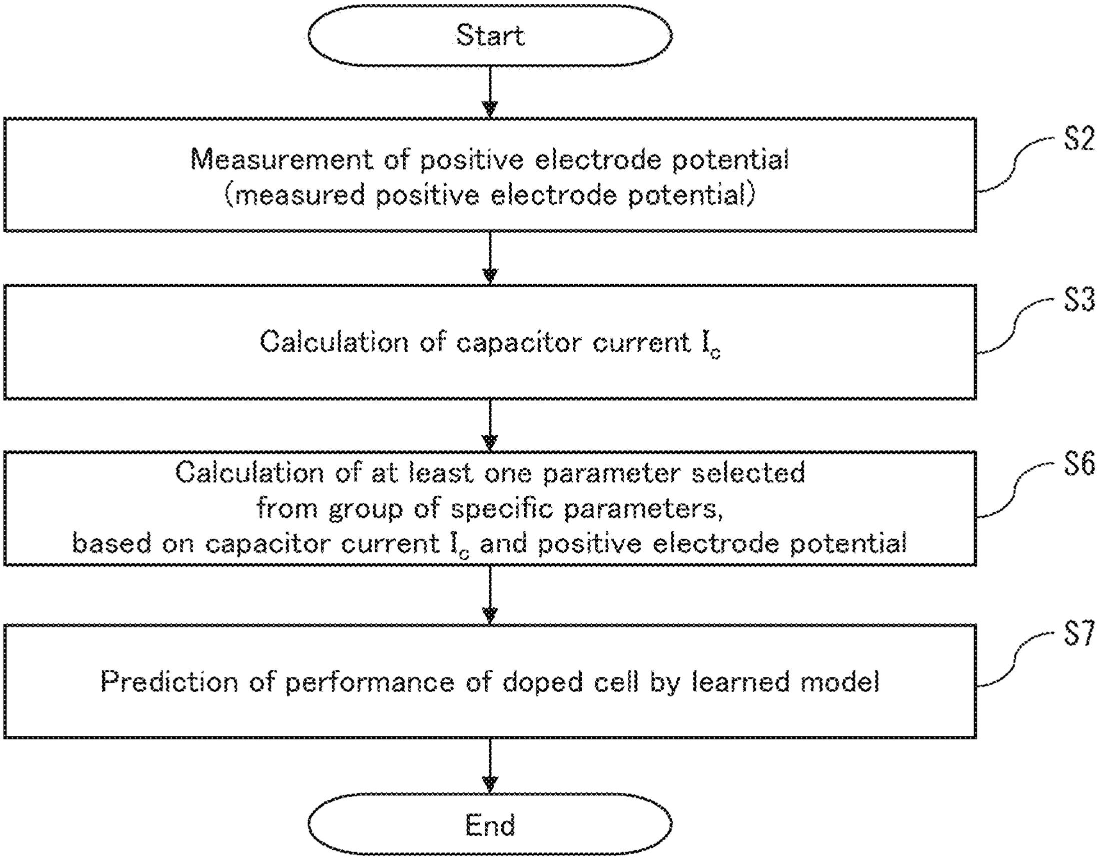
FIG. 1 is a flow chart describing one example of the performance prediction method of a nonaqueous lithium power storage element according to the present disclosure.

The current separation method of the present disclosure includes the step of calculating a capacitor current $I_C$ and an electrode reaction current $I_d$ of a cell based on voltage and current of the cell that are measured during doping of the cell. Particularly, the performance prediction method of the present disclosure includes the step of using parameters calculated from the capacitor current $I_C$ and electrode reaction current $I_d$ that are calculated by above-described current separation method. More particularly, as exemplified in FIG. 1, the prediction method of the present disclosure includes: (S2) the measurement step of measuring a positive electrode potential E (V) of the cell during doping; (S3) the current calculation step of calculating the capacitor current $I_C$ (A) and the electrode reaction current $I_d$ of the cell; (S6) the parameter calculation step of calculating at least one parameter based on the capacitor current $I_C$ (A) and the electrode reaction current $I_d$ or the electrode potential E (V); and (S7) the prediction step of predicting the performance of a nonaqueous lithium power storage element using a learned model which has learned the correlations between the parameter and the performance of the nonaqueous lithium power storage element. The above-described at least one parameter is selected from the group of parameters consisting of an integrated capacity parameter of the capacitor current $I_C$ (A), a positive electrode potential change parameter of a current capacity Q (mAh) of the capacitor current $I_C$ (A), and a temporal change parameter of the positive electrode potential E (V), or the group of parameters consisting of an integrated capacity parameter of the electrode reaction current $I_d$ (A), a positive electrode potential change parameter of a current capacity Q (mAh) of the electrode reaction current $I_d$ (A), and a temporal change parameter of the positive electrode potential E (V). The details of each parameter will be described below. In other words, the performance prediction method of the present disclosure focuses on the side of the positive electrode precursor between the positive electrode precursor and the negative electrode, mathematically separates the capacitor current $I_C$ (A) and the electrode reaction current $I_d$ (A) from the bulk current (electric current of the whole cell) in the doping step, and utilizes at least one parameter of the group of parameters affected by the capacitor current $I_C$ (A) or the electrode reaction current $I_d$ (A). The integrated capacity parameter of the capacitor current $I_C$ (A) and the positive electrode potential change parameter of the current capacity Q (mAh) of the capacitor current $I_C$ (A) are both derived from the capacitor current $I_C$ (A). The positive electrode potential E (V) is affected by the capacitor current $I_C$ (A) and varies with a change in the capacitor current $I_C$ (A); therefore, the temporal change parameter of the positive electrode potential E (V) can also be utilized in the group of parameters affected by the capacitor current $I_C$ (A). The integrated capacity parameter of the electrode reaction current $I_d$ (A) and the positive electrode potential change parameter of the current capacity Q (mAh) of the electrode reaction current $I_d$ (A) are both derived from the electrode reaction current $I_d$ (A). The positive electrode potential E (V) is affected by the electrode reaction current $I_d$ (A) and varies with a change in the electrode reaction current $I_d$ (A); therefore, the temporal change parameter of the positive electrode potential E (V) can also be utilized in the group of parameters affected by the electrode reaction current $I_d$ (A). The present inventors discovered that such a group of specific parameters have correlations with the performance of a nonaqueous lithium power storage element, particularly cell capacity, cell resistance, self-discharge performance, and durability performance. By using a learned model which has learned the correlations between the group of specific parameters and the performance of a nonaqueous lithium power storage element, the performance of the nonaqueous lithium power storage element can be predicted, taking into consideration the status of the progress of electrode reactions in the doping step.

Figure 2:
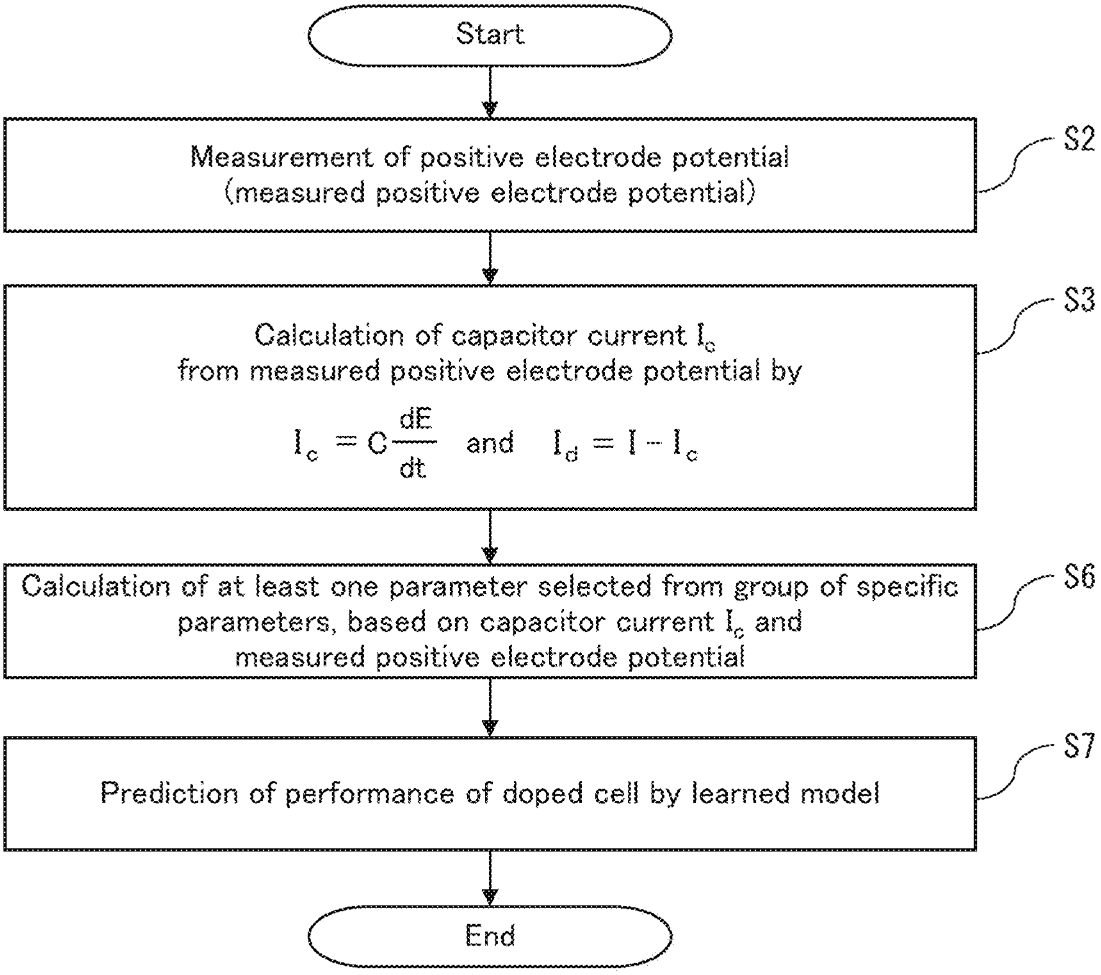
FIG. 2 is a flow chart describing a preferred mode of the performance prediction method of a nonaqueous lithium power storage element according to the present disclosure.

In the performance prediction method of the present disclosure, the capacitor current $I_C$ (A) may be calculated from the positive electrode potential E (V) of the cell measured during doping. FIG. 2 is a flow chart describing the performance prediction method of a nonaqueous lithium power storage element in the case of calculating the capacitor current $I_C$ (A) from the positive electrode potential E (V) of the cell measured during doping. In FIG. 2, the performance prediction method may include: (S2) the measurement step of measuring the positive electrode potential E (V); (S3) the current calculation step of calculating the capacitor current $I_C$ (A) from the thus measured positive electrode potential (hereinafter, also referred to as "measured positive electrode potential") E (V); (S6) the parameter calculation step of calculating at least one parameter based on the capacitor current $I_C$ (A) or the measured positive electrode potential E (V); and (S7) the prediction step of predicting the performance of a nonaqueous lithium power storage element using a learned model which has learned the correlations between the parameter and the performance of the nonaqueous lithium power storage element.

Figure 3:
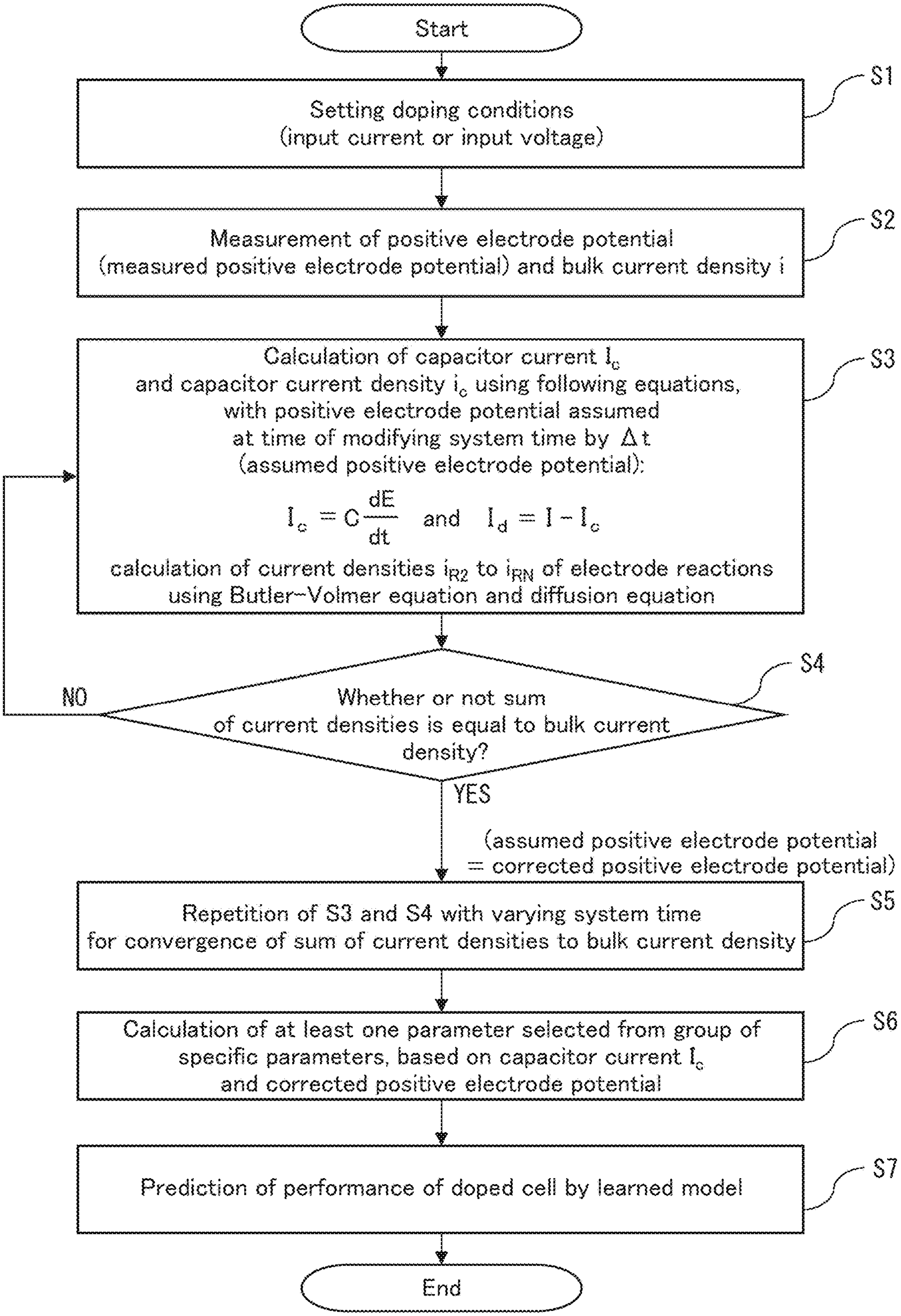
FIG. 3 is a flow chart describing another preferred mode of the performance prediction method of a nonaqueous lithium power storage element according to the present disclosure.

In the performance prediction method of the present disclosure, the capacitor current $I_C$ (A) may be calculated from a positive electrode potential that is assumed based on the positive electrode potential E (V) of the cell measured during doping. FIG. 3 is a flow chart describing the performance prediction method of a nonaqueous lithium power storage element in the case of calculating the capacitor current $I_C$ (A) from an assumed positive electrode potential. In FIG. 3, the performance prediction method may include: (S1) the doping condition setting step; (S2) the measurement step of measuring the positive electrode potential E (V) and the bulk current density i ($A/m^2$); (S3) the current calculation step of, based on a positive electrode potential assumed from the measured positive electrode potential E (V) (hereinafter, also referred to as "assumed positive electrode potential") E (V), calculating the capacitor current $I_C$ (A), the capacitor current density $i_C$ ($A/m^2$), and the current densities $i_{R1}$ to $i_{RN}$ ($A/m^2$) of the respective electrode reactions; (S4) the positive electrode potential correction step of correcting the assumed positive electrode potential based on the bulk current density i ($A/m^2$) to obtain a positive electrode potential that is corrected (hereinafter, also referred to as "corrected positive electrode potential"); (S5) the current separation step of repeating the steps (S3) and (S4) while modifying the system time; (S6) the parameter calculation step of calculating at least one parameter of the group of specific parameters based on the capacitor current $I_C$ (A) calculated by the step (S3) or the corrected positive electrode potential E (V) obtained by the step (S4); and (S7) the prediction step of predicting the performance of a nonaqueous lithium power storage element using a learned model which has learned the correlations between the parameter and the performance of the nonaqueous lithium power storage element.

Modes of the present disclosure will now be described referring to the drawings as required; however, the modes of the present disclosure are not limited to the specific modes of the drawings.

<Doping Condition Setting Step>

The doping condition setting step (S1) is the step of setting doping conditions including input current (A) or input voltage (V). Examples of the doping conditions include cell temperature (° C.), bulk current density ($A/m^2$), and cell pressure ($kgf/cm^2$), in addition to input current (A) and input voltage (V). The doping conditions can be set and adjusted using condition adjustment devices connected to the cell, such as a charge-discharge device, a temperature regulator, and a pressure regulator.

The "cell temperature" refers to the temperature of the system that is measured as the temperature of the cell outer package. The cell temperature is selected to be in a range of preferably 25° C. or higher, 30° C. or higher, or 35° C. or higher, but preferably 80° C. or lower, 75° C. or lower, 70° C. or lower, or 65° C. or lower. When the cell temperature is 25° C. or higher, lithium carbonate contained in the positive electrode precursor is efficiently decomposed, so that doping of lithium ions can be performed quickly. When the cell temperature is 80° C. or lower, decomposition of the electrolyte solution can be inhibited, so that the resistance of the nonaqueous lithium power storage element can be reduced.

The "input voltage" refers to the voltage of an external power supply that is applied to the cell in the doping step. The input voltage is selected to be in a range of preferably 4.0 V or more, 4.2 V or more, or 4.4 V or more, but preferably 5.0 V or less, 4.8 V or less, or 4.6 V or less. When the input voltage is 4.0 V or more, lithium carbonate contained in the positive electrode precursor is efficiently decomposed, so that doping of lithium ions can be performed quickly. When the input voltage is 5.0 V or less, a micro short circuit in the doping step can be inhibited.

The "bulk current" refers to a total amount of electric current flowing in the whole cell in the doping step. The bulk current is selected to be in a range of preferably 0.1 C or more, 1 C or more, or 10 C or more, but 100 C or less, 50 C or less, 40 C or less, or 30 C or less, in terms of C rate. When the bulk current is 1 C or more, lithium carbonate contained in the positive electrode precursor is efficiently decomposed, so that doping of lithium ions can be performed quickly. When the bulk current is 100 C or less, the voltage applied to the positive electrode precursor is not excessively high, so that corrosion of a positive electrode current collector can be inhibited.

The "bulk current density" refers to a value obtained by dividing the bulk current by the positive electrode precursor area (area of positive electrode active material layer). The "positive electrode precursor area" is specifically the area of a positive electrode active material layer facing the negative electrode. The bulk current density is selected to be in a range of preferably 0.04 $A/m^2$ or higher, 0.4 $A/m^2$ or higher, or 1.3 $A/m^2$ or higher, but preferably 45 $A/m^2$ or lower, 40 $A/m^2$ or lower, or 35 $A/m^2$ or lower. When the bulk current density is 0.4 $A/m^2$ or higher, lithium carbonate contained in the positive electrode precursor is efficiently decomposed, so that doping of lithium ions can be performed quickly. When the bulk current density is 45 $A/m^2$ or lower, the voltage applied to the positive electrode precursor is not excessively high, so that corrosion of a positive electrode current collector can be inhibited.

The "cell pressure" refers to a pressure exerted by a force that is optionally applied from the outside of the cell outer package in the direction perpendicular to the electrode surface in the doping step. The cell pressure causes fluctuations in the inter-electrode distance and the liquid retention amount, and this leads to accumulation of Li ions on the electrode surface and an increase or decrease in the local electric field strength caused by electrode deflection, consequently affecting the electrode reaction rate and the electrode reaction species. The cell pressure is selected to be in a range of preferably 0.1 $kgf/cm^2$ or higher, 0.5 $kgf/cm^2$ or higher, or 1 $kgf/cm^2$ or higher, but 1,000 $kgf/cm^2$ or lower, 100 $kgf/cm^2$ or lower, or 10 $kgf/cm^2$ or lower. When the cell pressure is 0.1 $kgf/cm^2$ or higher, distortion of the positive electrode precursor and that of the negative electrode are corrected by the pressure, and the distance between the opposing positive electrode precursor and negative electrode is thereby made uniform in a plane; therefore, doping is uniformly performed and the durability of the resulting nonaqueous lithium power storage element is improved, which is preferred. When the cell pressure is 1,000 $kgf/cm^2$ or lower, damage to the members constituting the cell, such as the positive electrode precursor, the negative electrode, and the separator, is reduced.

Examples of a charging method in the doping step include constant-current charging and constant-voltage charging. For example, the positive electrode voltage can be increased by constant-current charging in the period from the start to an early stage of the doping step and, once the positive electrode voltage reaches an arbitrary value, the charging method can be switched to constant-voltage charging. This prevents the positive electrode voltage of the cell from being increased more than necessary, so that the occurrence of an undesirable side reaction, such as decomposition of the electrolyte solution, can be inhibited. The method of the present disclosure can be employed for both constant-current charging and constant-voltage charging. In the period from the start to an early stage of the doping step, various side reactions are likely to occur with an increase in the positive electrode potential, and it is thus highly necessary to estimate the status of the progress of a main reaction; therefore, it is effective to employ the method of the present disclosure in the stage of constant-current charging, which is a period from the start of the doping step until the switching to constant-voltage charging.

The duration of the doping step is preferably 0.5 hours or longer, 1 hour or longer, or 1.5 hours or longer, but preferably 30 hours or shorter, 10 hours or shorter, or 5 hours or shorter, as measured from the start of applying the input voltage. When the duration of the doping step is 0.5 hours or longer, doping of lithium ions is allowed to proceed sufficiently. When the duration of the doping step is 30 hours or shorter, undesirable side reactions such as decomposition of the electrolyte solution can be inhibited, so that the resistance of the resulting nonaqueous lithium power storage element can be reduced.

When constant-current charging is performed from the start to an early stage of the doping step, the duration of the constant-current charging is preferably 15 minutes or longer, 30 minutes or longer, or 1 hour or longer, but preferably 4 hours or shorter, 3 hours or shorter, or 2 hours or shorter. When the duration of the constant-current charging is in this range, not only can the doping step be performed quickly, but also side reactions can be inhibited without an excessive increase in the positive electrode voltage of the cell. The constant-current charging is switched to constant-voltage charging at a measured positive electrode potential of preferably 4.3 V or more, 4.4 V or more, or 4.5 V or more, but preferably 4.9 V or less, 4.8 V or less, or 4.7 V or less.

<Measurement Step>

The measurement step (S2) is the step of measuring at least the positive electrode potential E (V) of the cell during doping. In the measurement step (S2), the positive electrode potential E (V) and the bulk current density i ($A/m^2$) of the cell may be measured. An input voltage is applied to the cell during doping. By applying the input voltage, lithium carbonate existing in the positive electrode precursor is decomposed to release lithium ions, and the negative electrode active material can be doped with the lithium ions. In the measurement step, for example, the cell temperature (° C.) and the cell pressure ($kgf/cm^2$) can also be measured in addition to the positive electrode potential and the bulk current density of the cell. These physical properties can each be measured using a measurement device connected to the respective measurement spots of the cell as required, such as a voltage line, a reference electrode, a current line, a thermocouple, or a pressure gauge.

The positive electrode potential E (V) of the cell can be determined by, but not limited to, connecting a voltage line to the positive electrode and negative electrode terminal of the cell to measure the cell voltage, and putting a lithium reference electrode into the cell to measure the reference electrode potential. Alternatively, the positive electrode potential E (V) may be estimated by measuring the cell voltage without a reference electrode. The measured positive electrode potential E (V) of the present disclosure encompasses the positive electrode potential that is directly measured using a reference electrode, and the positive electrode potential that is indirectly determined from the measured cell voltage or the like. The bulk current density i ($A/m^2$) of the cell can be determined by connecting a current line to the positive electrode and negative electrode terminal of the cell to measure the bulk current (A) and dividing the thus measured value by the positive electrode precursor area (area of positive electrode active material layer). The positive electrode potential and the bulk current density that are measured in the measurement step are hereinafter referred to as "measured positive electrode potential" and "measured bulk current density", respectively.

<Current Calculation Step>

The current calculation step (S3) is the step of calculating at least the capacitor current $I_C$ (A) based on the measured positive electrode potential. Examples of a method of calculating the capacitor current $I_C$ (A) based on the measured positive electrode potential include (a) a method of calculating the capacitor current $I_C$ (A) directly from the measured positive electrode potential, and (b) a method of calculating the capacitor current $I_C$ (A) based on an assumed positive electrode potential assumed from the measured positive electrode potential. The current calculation step can be performed using an information processing apparatus (computer) connected to external devices such as a cell condition adjustment device and a measurement device.

Calculation of the capacitor current $I_C$ in the case of (a) will now be described. The "capacitor current" refers to an electric current that flows in the positive electrode precursor of the cell at the time of the formation of an electric double layer as a capacitor. Denoting an accumulated charge, a capacitor capacity, and a positive electrode potential as Q (C), C ($F/m^2$ and E (V), respectively, since Q=CE, time differentiation of both sides thereof establishes the following relationship:

[Math. 10]

$$\text{i.e. } \frac{dC}{dt} = C\frac{dE}{dt} \text{ i.e.} \tag{1}$$

[Math. 11]

$$I_C = C\frac{dE}{dt} \tag{2}$$

In the equation (2), $I_C$ represents the capacitor current (A), C represents the capacitor capacity ($F/m^2$) of the cell, E represents the measured positive electrode potential E (V), and t represents time (s). The capacitor capacity C ($F/m^2$) can be set in accordance with the type and the amount of the activated carbon-containing positive electrode active material used in the positive electrode precursor.

Calculation of the capacitor current $I_C$ and the like in the case of (b) will now be described. In the case of (b), based on an assumed positive electrode potential E (V) that is assumed when the system time is modified by Δt at the time of the measurement of the measured positive electrode potential, not only is the capacitor current $I_C$ (A) of the cell calculated, but also the capacitor current density $i_C$ ($A/m^2$) and the current densities $i_{R1}$ ($A/m^2$) to $i_{RN}$ ($A/m^2$) of the respective assumed N kinds of electrode reactions are calculated.

The positive electrode potential can be assumed by assuming the change in the measured positive electrode potential with a change in the system time by Δt, based on the measured positive electrode potential, the input voltage, the measured bulk current density, and the like at a certain time point. The capacitor current $I_C$ (A) can be calculated from the assumed positive electrode potential E (V) by using the assumed positive electrode potential as E in the following reiterated equation (2):

[Math. 12]

$$I_C = C\frac{dE}{dt} \tag{2}$$

The capacitor current density $i_C$ can be calculated by dividing the capacitor current $I_C$ (A), which is determined by the equation (2), by the positive electrode precursor area (area of positive electrode active material layer) ($m^2$).

When a total of N types of electrode reactions 1 to N are assumed as plural electrode reactions, N is preferably 3 or more, or 4 or more, but preferably 10 or less, or 5 or less. When N is 3 or more, the status of the progress of a main reaction can be estimated more accurately, while when N is 10 or less, a sum of calculated current densities is easily converged to a measured bulk current density. N is more preferably 3 or 4.

The electrode reactions occurring on the positive electrode precursor in the doping step can be generalized as the following electrode reaction in which a reductant (Red) is oxidized into an oxidant (Ox), releasing n moles of electrons (e):

$$Red \rightarrow Ox + ne^-$$

The assumed plural electrode reactions include at least an electrode reaction in which lithium carbonate is decomposed to release lithium ions and electrons as a main reaction (electrode reaction 1). This main reaction can be assumed to be, for example, as follows:

$$Li_2CO_3 + solvent \rightarrow 2Li^+ + 2CO_2 + C_xH_yO_z + 2e^-$$

In this formula, "solvent" represents an electrolyte solution solvent; "$C_xH_yO_z$" represents an organic compound generated by abstraction of CO from the electrolyte solution solvent; and x, y, and z are preferably 1 to 5, 2 to 10, and 1 to 3, respectively.

When ethylene carbonate (EC) exists in the system as the electrolyte solution solvent, the main reaction can be assumed to be, for example, as follows:

$$Li_2CO_3 + EC \rightarrow 2Li^+ + 2CO_2 + C_2H_4O_2 + 2e^-$$

In this decomposition reaction of lithium carbonate, the reductant is EC, and the electric charge is 2.

The assumed plural electrode reactions include at least one side reaction in addition to the main reaction. Examples of the side reaction include a water splitting reaction, a decomposition reaction of an electrolyte solution solvent, and a decomposition reaction of a lithium salt. The water splitting reaction is typically derived from water contained in activated carbon, and can be preferably assumed to be as follows:

$$H_2O \rightarrow H^+ + \cdot OH + e^-$$

In this formula, "·OH" represents a hydroxy radical. In this water splitting reaction, the reductant is $H_2O$, and the electric charge is 1.

The decomposition reaction of an electrolyte solution solvent can be assumed to be, for example, as follows:

$$solvent \rightarrow (solvent^{**}) + H^+ + e^-$$

In this formula, "solvent" represents the electrolyte solution solvent, and "(solvent**)" represents an oxidant (radical) generated by hydrogen abstraction from the electrolyte solution solvent. In this decomposition reaction of an electrolyte solution solvent, the reductant is the electrolyte solution solvent, and the electric charge is 1. For example, when the electrolyte solution solvent is ethylene carbonate, the decomposition reaction can be assumed to be as follows

[Chem. 1]

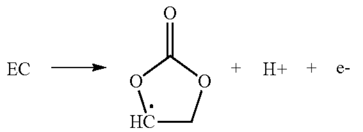

In this decomposition reaction of ethylene carbonate, the reductant is EC, and the electric charge is 1.

Examples of the decomposition reaction of a lithium salt include a decomposition reaction of a lithium salt contained in a nonaqueous electrolyte solution. For example, when the lithium salt is $LiPF_6$, the decomposition reaction can be assumed to be, for example, as follows:

$$H_2O + LiPF_6 \rightarrow LiF + 2HF + POF_3, \text{ or}$$

$$Li_2CO_3 + LiPF_6 \rightarrow 3LiF + CO_2 + POF_3$$

In this decomposition reaction of $LiPF_6$, the reductant is $LiPF_6$.

The current density $i_{Rx}$ (A/m$^2$) of a certain electrode reaction x (wherein, x corresponds to 1 to N) can be determined based on the Butler-Volmer equation when the electrode reaction of interest is judged to be rate-limiting, or based on the diffusion equation when the electrode reaction of interest is judged to be diffusion-limited. More particularly, the current density $i_{Rx}$ (A/m$^2$) can be calculated based on the following standards (i) to (iii):

(i) in a case where the measured positive electrode potential E is lower than an onset potential of an electrode reaction x (wherein, x corresponds to 1 to N), the current density $i_{Rx}$ of the electrode reaction x is not generated (0 A/m$^2$);

(ii) in a case where the measured positive electrode potential E is equal to or higher than the onset potential of the electrode reaction x, the current density of the electrode reaction x is determined by the Butler-Volmer equation and, when the thus determined current density is lower than a limiting current density of the electrode reaction x, this current density is defined as the current density $i_{Rx}$ of the electrode reaction x; and (iii) in a case where the current density determined based on the above-described (ii) is equal to or higher than the limiting current density of the electrode reaction x, a current density determined by the diffusion equation and the Butler-Volmer equation is defined as the current density $i_{Rx}$ of the electrode reaction x.

Regarding Standard (i):

The standard (i) prescribes that the current density $i_{Rx}$ of the electrode reaction x is not generated (0 A/m$^2$) when the measured positive electrode potential is lower than the onset potential of the electrode reaction x. The electrode reactions on the positive electrode precursor are reactions that involve release of electrons, and can proceed when the positive electrode potential E (V) of the cell is equal to or higher than the onset potential $E_x^{eq}$ (V) of the electrode reaction x (i.e. when an overvoltage (V) is generated for the electrode reaction x). In the period from the start to an early stage of the doping step, it is believed that, as the measured positive electrode potential increases, the electrode reactions sequentially occur in the order of ascending onset potential $E_x^{eq}$ (V), generating a current density. Accordingly, in order to more accurately estimate the status of the progress of the main reaction, it is preferred to set a value of the onset potential $E_x^{eq}$ (V) as a parameter for each of the assumed plural electrode reactions. When the measured positive electrode potential E (V) of the cell is lower than the onset potential $E_x^{eq}$ (V), the current density $i_{Rx}$ of the electrode reaction of interest is deemed to be 0 A/m$^2$ and not taken into account, and it can be taken into account at equal to or higher than the onset potential $E_x^{eq}$ (V). More specifically, the current density $i_{Rx}$ can be taken into account based on the following standards (ii) and (iii).

Regarding Standard (ii):

The standard (ii) prescribes that, in a case where the measured positive electrode potential is equal to or higher than the onset potential of the electrode reaction x, the current density of the electrode reaction x is determined by the Butler-Volmer equation and, when the thus determined current density is lower than a limiting current density of the electrode reaction x, this current density is adopted as the current density $i_{Rx}$ of the electrode reaction x. Generally, the progress of an electrode reaction can be explained with a reaction rate-limiting step in which a charge transfer reaction (electron donating-accepting reaction) is rate-limiting, and a diffusion-limited step in which diffusion (mass transfer) is rate-limiting. It is believed that, while the rate of such an electrode reaction is an exponential function of the electrode potential, the rate constant of mass transfer such as diffusion remains constant irrespective of the electrode potential. In the period from the start to an early stage of the electrode reaction where a large amount of reactants exists in the vicinity of the electrode surface, the charge transfer reaction is rate-limiting irrespective of diffusion (mass transfer), and the current exponentially increases with an increase in the electrode potential. Once the amount of the reactants existing in the vicinity of the electrode surface is reduced with the progress of the reaction to a certain extent, diffusion (mass transfer) becomes rate-limiting, creating a situation where the reactants undergo a reaction as soon as they reach the electrode surface. In this diffusion-limited step, the current does not increase even with an increase in the electrode potential, reaching a certain limit value. Generally, this limit value of the current is referred to as "limiting current", and the density thereof is referred to as "limiting current density". In other words, the phrase "when the thus determined current density is lower than a limiting current density of the electrode reaction x" in the standard (ii) means a case where the electrode reaction is judged to be in the reaction rate-limiting step.

In the reaction rate-limiting step, the current density can be estimated based on the Butler-Volmer equation. One example of derivation of the Butler-Volmer equation will now be described. First, the following general electrode reaction on the electrode surface is assumed:

[Math. 13]

$$\mathrm{Red} = Ox + ne^-$$

The current density $i_R$ generated by this electrode reaction is a sum of the partial anode current density $i_a$ (A/m$^2$) corresponding to oxidation of a reductant (Red) and the partial cathode current density $i_C$ (A/m$^2$) corresponding to reduction of an oxidant (Ox), which is represented by the following equation:

[Math. 14]

$$i_R = i_e + i_c \tag{3}$$

Since an electric current is a charge transfer rate, an electric current generated by an electrode reaction is proportional to the rate of the electrode reaction. The rate of the electrode reaction is proportional to the concentration of reactants on the electrode surface; therefore, the partial anode current density $i_a$ (A/m$^2$) and the partial cathode current density $i_C$ (A/m$^2$) can be represented by the following equations in accordance with Faraday's law:

[Math. 15]

$$i_a = nFk_{ox}C_R$$

$$i_c = -nFk_{red}C_O$$

Substitution of these equations into the equation (3) gives:

[Math. 16]

$$i_R = nFk_{ox}C_R - nFk_{red}C_O \tag{4}$$

In this equation (4), n represents the valence of the electrode reaction; F represents the Faraday constant; $k_{ox}$ and $k_{red}$ represent the rate constant in the direction of oxidation and that in the direction of reduction, respectively; and $C_R$ and $C_O$ represent the reductant concentration and the oxidant concentration on the electrode surface, respectively.

The rate constants of the electrode reaction conform to the Arrhenius equation and, considering that the activation energy is affected by the electrode potential, the rate constants $k_{ox}$ and $k_{red}$ of the electrode reaction in the direction of oxidation and the direction of reduction are represented by the following equations, respectively:

[Math. 17]

$$k_{ox} = k^{\circ}_{ox} \cdot \exp\left(\frac{\alpha nFE}{RT}\right) \tag{5}$$

$$k_{red} = k^{\circ}_{red} \cdot \exp\left(-\frac{(1-\alpha)nFE}{RT}\right) \tag{6}$$

In these equations (5) and (6), $k_{ox}^{\circ}$ and $k_{red}^{\circ}$ represent the rate constant in the direction of oxidation and that in the direction of reduction at an electrode potential of 0 (zero), respectively; a represents the symmetry factor which is the transfer coefficient in the direction of oxidation; and $(1-\alpha)$ represents the transfer coefficient in the direction of reduction. Further, F represents the Faraday constant, R represents the gas constant, and T represents the temperature (K). Substitution of the equations (5) and (6) into the equation (4) gives:

[Math. 18]

$$i_R = nFk^{\circ}_{ax} \cdot \exp\left(\frac{\alpha nFE}{RT}\right)C_R - nFk^{\circ}_{red} \cdot \exp\left(-\frac{(1-\alpha)nFE}{RT}\right)C_0 \tag{7}$$

Incidentally, when the rate of the oxidation reaction and the rate of the reduction reaction are the same and the electrode reaction is thus kinetically at equilibrium (current density $i_R=0$), the partial anode current density (A/m$^2$) and the partial cathode current density (A/m$^2$) have the same value. Taking this value as the exchange current density $i_0$, the following relationship is established: $i_0=i_a=-i_c$. $C_R$ and $C_O$ at equilibrium are believed to be equal to the concentrations of reactants (bulk concentrations) $C^e_R$ and $C^e_O$ in an electrolyte solution at a spot sufficiently away from a diffusion layer. Accordingly, the exchange current density $i_0$ can be represented by the following equation:

[Math. 19]

$$i_0 = nFk^{\circ}_{ox} \cdot \exp\left(\frac{\alpha nFE^{eq}}{RT}\right)C^e_R - nFk^{\circ}_{red} \cdot \exp\left(-\frac{(1-\alpha)nFE^{eq}}{RT}\right)C^e_O \quad (8)$$

In this equation (8), $E^{eq}$ represents the equilibrium electrode potential (i.e. onset potential of oxidation reaction), and $C^e{}_R$ and $C^e{}_O$ represent the bulk concentration of the reductant and that of the oxidant, respectively.

When the equation (7) is divided by the equation (8) and organized, the following relational equation is obtained:

[Math. 20]

$$\text{i.e. } \frac{i_R}{i_0} = \frac{C_R}{C^e_R} \cdot \exp\left(\frac{\alpha nF(E-E^{eq})}{RT}\right) - \frac{C_O}{C^e_O} \cdot \exp\left(-\frac{(1-\alpha)nF(E-E^{eq})}{RT}\right)$$

[Math. 21]

$$i_R = i_0\left\{\frac{C_R}{C^e_R} \cdot \exp\left(\frac{\alpha nF}{RT}\eta\right) - \frac{C_O}{C^e_O} \cdot \exp\left(-\frac{(1-\alpha)nF}{RT}\eta\right)\right\} \quad (9)$$

$$\eta = E - E^{eq}$$

In this equation (9), $\eta$ ($=E-E^{eq}$) represents the overvoltage (V) of the electrode reaction.

The equation (9) pertains to an electrode reaction having a reaction order of 1. Denoting the reaction order of the oxidation reaction and that of the reduction reaction as m and l, respectively, the following relational equation is obtained:

[Math. 22]

$$i_R = i_0\left\{\left(\frac{C_R}{C^e_R}\right)^m \exp\left(\frac{\alpha nF}{RT}\eta\right) - \left(\frac{C_O}{C^e_O}\right)^l \exp\left(-\frac{(1-\alpha)nF}{RT}\eta\right)\right\} \quad (10)$$

$$\eta = E - E^{eq}$$

Such an equation that represents an exponential relationship between the overvoltage and the current density in an electrode reaction is generally referred to as a "Butler-Volmer equation".

Thus far, one example of derivation of the Butler-Volmer equation for a general electrode reaction has been described. Next, the equation (10) is applied to the electrode reaction x on the positive electrode precursor in the doping method of a nonaqueous lithium power storage element according to the present disclosure. In the doping step, application of an input voltage causes the electrode reaction x to proceed in the direction of oxidation. In this case, in the early stage of the reaction, the oxidant surface concentration $C_O$ (mol/m$^3$) can be deemed to be equal to the oxidant bulk concentration $C^e{}_O$ (mol/m$^3$). In addition, when the reaction has proceeded to a certain extent and the positive electrode potential is sufficiently high, the second term in parentheses of the equation (10) is sufficiently small with respect to the first term and can thus be ignored; therefore, the oxidant surface concentration $C_O$ (mol/m$^3$) may be assumed to remain equal to the oxidant bulk concentration $C^e{}_O$ (mol/m$^3$). Consequently, the following Butler-Volmer equation can be obtained:

[Math. 23]

$$i_{Rx} = i_{0x}\left\{\left(\frac{C_{Rx}}{C^e_{Rx}}\right)^{mx} \exp\left(\frac{\alpha_x n_x F}{RT}\eta_x\right) - \exp\left(-\frac{(1-\alpha_x)n_x F}{RT}\eta_x\right)\right\} \quad (11)$$

$$\eta_x = E - E^{eq}_x$$

In the equation (11), $i_{Rx}$ represents the current density (A/m$^2$) of the electrode reaction x (wherein, x corresponds to 1 to N); $i_{0x}$ represents the exchange current density (A/m$^2$) of the electrode reaction x; $C_{Rx}$ and $C^e{}_{Rx}$ represent the reductant surface concentration (mol/m$^3$) and the reductant bulk concentration (mol/m$^3$) of the electrode reaction x, respectively; $m_x$ represents the reaction order; ax represents the symmetry factor of the electrode reaction x; $n_x$ represents the valence of the electrode reaction x; F represents the Faraday constant; R represents the gas constant; T represents the temperature (K); $\eta_x$ represents the overvoltage (V) of the electrode reaction x; E represents the assumed positive electrode potential (V); and $E_x{}^{eq}$ represents the onset potential (V) of the electrode reaction x. Since a reaction rate-limiting region is in a reactant-rich state, the reductant surface concentration $C_{Rx}$ (mol/m$^3$) can be deemed to be equal to the reductant bulk concentration $C^e{}_{Rx}$ (mol/m$^3$).

The above-described equation (11), which is one example of the Butler-Volmer equation that can be applied in the present disclosure, may be modified as long as the exponential relationship of the overvoltage and the current density is utilized. For example, the equation (11) describes one-dimensional diffusion (linear diffusion); however, it may be expanded to two-dimensional or three-dimensional diffusion.

In order to more accurately estimate the current density using the Butler-Volmer equation, it is preferred to set required parameters in accordance with electrode reactions. For example, in order to calculate the current density $i_{Rx}$ (A/m$^2$) of an electrode reaction x (wherein, x corresponds to 1 to N) using the equation (11), the exchange current density $i_{0x}$ (A/m$^2$), the reductant surface concentration $C_{Rx}$ (mol/m$^3$), the reductant bulk concentration $C^e{}_{Rx}$ (mol/m$^3$) the reaction order $m_x$, the symmetry factor ax, the valence $n_x$, and the onset potential $E_x{}^{eq}$ (V) of the electrode reaction x can be set as the parameters. The temperature T (K) may also be set as a parameter, or may be a value that is actually measured from the cell outer package.

As the parameters, as long as the electrode reaction is known, known parameters of the electrode reaction can be used. When the electrode reaction itself is unknown or its parameters are unknown, the parameters may each be set in advance within a range that allows a calculated total current density to converge to a measured bulk current density.

With regard to the main reaction (electrode reaction 1) in which lithium carbonate is decomposed to release lithium ions and electrons, the onset potential $E_1{}^{eq}$ (V) is preferably 3.50 V or higher, 3.60 V or higher, or 3.70 V or higher, but preferably 4.40 V or lower, 4.30 V or lower, or 4.20 V or lower. The exchange current density $i_{01}$ of the main reaction is preferably 3.00 E−03 A/m$^2$ or more, 3.50 E−03 A/m$^2$ or more, or 4.00 E−03 A/m$^2$ or more, but preferably 7.00 E−03 A/m$^2$ or less, 6.50 E−03 A/m$^2$ or less, or 6.00 E−03 A/m$^2$ or less. The reductant surface concentration $C_{R1}$ of the main reaction is preferably 50 mol/m$^3$ or higher, 250 mol/m$^3$ or higher, or 450 mol/m$^3$ or higher, but preferably 5,000 mol/m$^3$ or lower, 3,000 mol/m$^3$ or lower, or 1,500 mol/m$^3$ or lower. The reductant bulk concentration $C^e$R1 of the main reaction is preferably 100 mol/m$^3$ or higher, 300 mol/m$^3$ or higher, or 500 mol/m$^3$ or higher, but preferably 5,000 mol/

$m^3$ or lower, 3,000 $mol/m^3$ or lower, or 1,500 $mol/m^3$ or lower. The reaction order $m^1$ of the main reaction is preferably an integer of 1 to 5, more preferably an integer of 1 to 3, still more preferably 1. The symmetry factor $\alpha_1$ of the main reaction is preferably 0.05 or more, 0.06 or more, or 0.07 or more, but preferably 0.15 or less, 0.12 or less, or 0.10 or less. The valence $n_1$ of the main reaction is preferably an integer of 1 to 5, more preferably an integer of 1 to 3.

For example, when the main reaction (electrode reaction 1) is assumed to be as follows, the reaction order $m^1$ is 1, the valence $n_1$ is 2, and the reductant is ethylene carbonate (EC):

$$Li_2CO_3+EC \rightarrow 2Li^++2CO_2+C_2H_4O_2+2e^-$$

Even when a specific electrode reaction is not clear as a side reaction, it is possible to experimentally determine the ranges of parameters in which the result of calculating the total current density by setting the values of the respective parameters can converge to a measured bulk current density. From the thus experimentally determined values of the respective parameters, the type of an ongoing side reaction can be estimated as well.

With regard to side reactions (electrode reactions 2 to N), the onset potential $E_x^{eq}$ (V) is preferably 2.50 V or higher, 2.80 V or higher, or 3.00 V or higher, but preferably 4.00 V or lower, 3.70 V or lower, or 3.50 V or lower. The exchange current density $i_{0x}$ of each side reaction is preferably 0.10 E−03 $A/m^2$ or more, 0.30 E−03 $A/m^2$ or more, or 0.50 E−03 $A/m^2$ or more, but preferably 5.00 E−03 $A/m^2$ or less, 4.00 E−03 $A/m^2$ or less, or 3.00 E−03 $A/m^2$ or less. The reductant surface concentration $C_{Rx}$ of each side reaction is preferably 0.001 $mol/m^3$ or higher, 0.01 $mol/m^3$ or higher, or 0.1 $mol/m^3$ or higher, but preferably 1,000 $mol/m^3$ or lower, 500 $mol/m^3$ or lower, or 100 $mol/m^3$ or lower. The reductant bulk concentration $C^e_{Rx}$ of each side reaction is preferably 0.1 $mol/m^3$ or higher, 1 $mol/m^3$ or higher, or 10 $mol/m^3$ or higher, but preferably 1,000 $mol/m^3$ or lower, 500 $mol/m^3$ or lower, or 100 $mol/m^3$ or lower. The reaction order $m_x$ of each side reaction is preferably an integer of 1 to 5, more preferably an integer of 1 to 3, still more preferably 1. The symmetry factor ax of each side reaction is preferably 0.10 or more, 0.15 or more, or 0.20 or more, but preferably 0.90 or less, 0.80 or less, or 0.70 or less. The valence $n_x$ of each side reaction is preferably an integer of 1 to 5, more preferably an integer of 1 to 3.

For example, when a side reaction 1 (electrode reaction 2) is assumed to be the following water splitting reaction, the reaction order $m_2$ is 1, the valence $n_2$ is 1, and the reductant is water ($H_2O$):

$$H_2O \rightarrow H^+ + \cdot OH + e^-$$

The onset potential $E_2^{eq}$ (V) of this electrode reaction 2 is preferably 3.00 V or higher, 3.10 V or higher, or 3.20 V or higher, but preferably 3.60 V or lower, 3.50 V or lower, or 3.40 V or lower. The exchange current density $i_{02}$ of the electrode reaction 2 is preferably 0.10 E−03 $A/m^2$ or more, 0.30 E−03 $A/m^2$ or more, or 0.50 E−03 $A/m^2$ or more, but preferably 2.50 E−03 $A/m^2$ or less, 2.00 E−03 $A/m^2$ or less, or 1.50 E−03 $A/m^2$ or less. The reductant surface concentration $C_{R2}$ of the electrode reaction 2 is preferably 0.001 $mol/m^3$ or higher, 0.01 $mol/m^3$ or higher, or 0.1 $mol/m^3$ or higher, but preferably 200 $mol/m^3$ or lower, 150 $mol/m^3$ or lower, or 100 $mol/m^3$ or lower. The reductant bulk concentration $C^e_{R2}$ of the electrode reaction 2 is preferably 10 $mol/m^3$ or higher, 15 $mol/m^3$ or higher, or 20 $mol/m^3$ or higher, but preferably 200 $mol/m^3$ or lower, 150 $mol/m^3$ or lower, or 100 $mol/m^3$ or lower. The symmetry factor $\alpha_2$ of the electrode reaction 2 is preferably 0.45 or more, 0.50 or more, or 0.55 or more, but preferably 0.75 or less, 0.70 or less, or 0.65 or less.

For example, when a side reaction 2 (electrode reaction 3) is assumed to be the following decomposition reaction of ethylene carbonate, the reaction order $m^3$ is 1, the valence $n_3$ is 1, and the reductant is ethylene carbonate (EC):

[Chem. 2]

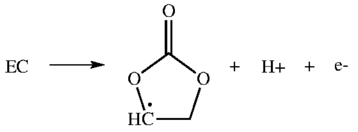

The onset potential $E_3^{eq}$ (V) of this electrode reaction 3 is preferably 3.10 V or higher, 3.20 V or higher, or 3.30 V or higher, but preferably 3.70 V or lower, 3.60 V or lower, or 3.50 V or lower. The exchange current density $i_{03}$ of the electrode reaction 3 is preferably 0.10 E−03 $A/m^2$ or more, 0.30 E−03 $A/m^2$ or more, or 0.50 E−03 $A/m^2$ or more, but preferably 2.50 E−03 $A/m^2$ or less, 2.00 E−03 $A/m^2$ or less, or 1.50 E−03 $A/m^2$ or less. The reductant surface concentration $C_{R3}$ of the electrode reaction 3 is preferably 0.001 $mol/m^3$ or higher, 0.01 $mol/m^3$ or higher, or 0.1 $mol/m^3$ or higher, but preferably 100 $mol/m^3$ or lower, 50 $mol/m^3$ or lower, or 20 $mol/m^3$ or lower. The reductant bulk concentration $C^e_{R3}$ of the electrode reaction 3 is preferably 1 $mol/m^3$ or higher, 3 $mol/m^3$ or higher, or 5 $mol/m^3$ or higher, but preferably 100 $mol/m^3$ or lower, 50 $mol/m^3$ or lower, or 20 $mol/m^3$ or lower. The symmetry factor $\alpha_3$ of the electrode reaction 3 is preferably 0.15 or more, 0.20 or more, or 0.25 or more, but preferably 0.45 or less, 0.40 or less, or 0.35 or less.

Regarding Standard (iii):

The standard (iii) prescribes that, in a case where the current density determined based on the above-described (ii) is equal to or higher than the limiting current density of the electrode reaction x, a current density determined by the diffusion equation and the Butler-Volmer equation is defined as the current density $i_{Rx}$ of the electrode reaction x, the current density calculated from the Butler-Volmer equation using the reductant surface concentration $C_R$ determined by the diffusion equation and the Butler-Volmer equation is adopted as the current density $i_{Rx}$ of the electrode reaction x. Even when the electrode potential increases with the progress of an electrode reaction to a certain extent, the current density of the electrode reaction never increases beyond the limiting current density of the electrode reaction. In such a stage, the rate of the electrode reaction is limited by diffusion (mass transfer), and the current density can be calculated by the diffusion equation.

Since a reactant (reductant) of the electrode reaction x has a concentration gradient in the thickness r direction of a diffusion layer, the mass flux $Q_x$ of the reactant (reductant) is provided by the following equation according to Fick's first law:

[Math. 24]

$$Q_x = -D_x \frac{\partial C_{Rx}}{\partial r} \quad (12)$$

In this equation (12), $Q_x$ represents the mass flux of the reductant, $C_R$ represents the reductant surface concentration (mol/m$^3$), and r represents the diffusion layer thickness (m). $D_x$ represents the diffusion coefficient of the reductant, indicating the transfer rate of the reductant from the electrode surface to the bulk (or from the bulk to the electrode surface). $D_x$ is temperature-dependent, and can be set based on the properties of an electrolyte solution as well as the type and the like of the reductant. When position r=0 (electrode surface), the relationship between the mass flux $Q_x$ of the reactant (reductant) and the current density $i_R$ in a diffusion-limited state is connected by Fick's laws and can be represented by the following equation:

[Math. 25]

$$Q_x = \frac{i_{Rx}}{n_x F} \tag{13}$$

In this equation (13), $n_x$ represents the valence of the electrode reaction, and F represents the Faraday constant. The following relational equation is obtained by combining the equations (12) and (13):

[Math. 26]

$$-D_x \frac{\partial C_{Rx}}{\partial r} = Q_x = \frac{i_{Rx}}{n_x F} \tag{14}$$

The temporal change ($dC_{Rx}/dt$) of the reductant surface concentration $C_{Rx}$ at a position r is provided by the following equation according to Fick's second law:

[Math. 27]

$$\frac{\partial C_{Rx}}{\partial r} = D_x \frac{\partial^2 C_{Rx}}{\partial r^2} \tag{15}$$

In this equation (15), $C_{Rx}$ represents the reductant surface concentration (mol/m$^3$), t represents time (s), r represents the diffusion layer thickness (m), and $D_x$ represents the diffusion coefficient of the reductant. It is noted here that, in the equation (15), $D_x$ is deemed to be constant irrespective of the position r.

Further, in a diffusion-limited state, when position r=$L_0$ (diffusion layer thickness), the reductant surface concentration $C_{Rx}$ (mol/m$^3$) can be deemed to be equal to the reductant bulk concentration $C^e_{Rx}$ (mol/m$^3$), i.e.

[Math. 28]

$$C_{Rx} = C^e_{Rx} \tag{16}$$

The reductant surface concentration $C_{Rx}$ in a diffusion-limited state can be determined by solving the equation (15), taking the equation (16) as the boundary condition at r=$L_0$ (diffusion layer thickness) and the equation (14) as the boundary condition at r=0 (electrode surface). Further, by substituting the thus determined reductant surface concentration $C_{Rx}$ in a diffusion-limited state into the Butler-Volmer equation (11), the current density $i_{Rx}$ (A/m$^2$) of the electrode reaction x (wherein, x corresponds to 1 to N) in a diffusion-limited state can be determined.

The above-described equations (14) to (16), which are examples of the diffusion equation that can be applied in the present disclosure, may be modified as long as the proportional relationship of the mass flux and the concentration gradient based on Fick's first and second laws is utilized. For example, the equations (14) to (16) describe mass transfer from the electrode surface in a Cartesian coordinate-based one-dimensional model; however, they may describe mass transfer from the reductant surface in a spherical coordinate-based one-dimensional model. Moreover, the equations (14) to (16) may be expanded to a two-dimensional model or a three-dimensional model.

In order to more accurately estimate the current density using the diffusion equation and the Butler-Volmer equation, it is preferred to set required parameters in accordance with electrode reactions. For example, in order to calculate the current density $i_{Rx}$ (A/m$^2$) of an electrode reaction x (wherein, x corresponds to 1 to N) using the equations (14) to (16), the reductant diffusion coefficient $D_x$, the diffusion layer thickness $L_0$, the reductant bulk concentration $C^e_{Rx}$ (mol/m$^3$), and the valence $n_x$ of the electrode reaction x can be set as the parameters. When the parameters in the diffusion equation and the parameters in the Butler-Volmer equation are redundant for a certain electrode reaction, these parameters may be different (i.e., may be set independently), or may be the same values.

As the parameters, as long as the electrode reaction is known, known parameters of the electrode reaction can be used. When the electrode reaction itself is unknown or its parameters are unknown, the parameters may each be set in advance within a range that allows a calculated total current density to converge to a measured bulk current density.

With regard to the main reaction (electrode reaction 1) in which lithium carbonate is decomposed to release lithium ions and electrons, the reductant diffusion coefficient $D_1$ is preferably 0.5 E−10 m$^2$/s or more, 1.0 E−10 m$^2$/s or more, or 1.5 E−10 m$^2$/s or more, but preferably 4.0 E−10 m$^2$/s or less, 3.0 E−10 m$^2$/s or less, or 2.0 E−10 m$^2$/s or less. The diffusion layer thickness $L_0$ of the main reaction is preferably 0.10 E−04 m or more, 0.50 E−04 m or more, or 0.80 E−04 m or more, but preferably 2.00 E−04 m or less, 1.50 E−04 m or less, 1.20 E−04 m or less. The reductant bulk concentration $C^e$R1 (mol/m$^3$) of the main reaction is preferably 50 mol/m$^3$ or higher, 250 mol/m$^3$ or higher, or 450 mol/m$^3$ or higher, but preferably 5,000 mol/m$^3$ or lower, 3,000 mol/m$^3$ or lower, or 1,500 mol/m$^3$ or lower. The valence $n_1$ of the main reaction is preferably an integer of 1 to 5, more preferably an integer of 1 to 3.

For example, when the main reaction (electrode reaction 1) is assumed to be as follows, the valence $n_1$ is 2 and the reductant is ethylene carbonate (EC):

$$Li_2CO_3 + EC \rightarrow 2Li^+ + 2CO_2 + C_2H_4O_2 + 2e^-$$

The diffusion coefficient $D_1$ of ethylene carbonate (EC) in this electrode reaction 1 is preferably 1.0 E−12 m$^2$/s or more, 1.0 E−11 m$^2$/s or more, or 1.0 E−10 m$^2$/s or more, but preferably 1.0 E−9 m$^2$/s or less, 1.0 E−8 m$^2$/s or less, or 1.0 E−7 m$^2$/s or less.

Even when a specific electrode reaction is not clear as a side reaction, it is possible to experimentally determine the ranges of parameters in which the result of calculating the total current density by setting the values of the respective parameters can converge to a measured bulk current density. From the thus experimentally determined values of the respective parameters, the type of an ongoing side reaction can be estimated as well.

With regard to side reactions (electrode reactions 2 to N), the diffusion coefficient $D_x$ of a reductant is preferably 1.0 E−16 $m^2/s$ or more, 1.0 E−15 $m^2/s$ or more, or 1.0 E−14 $m^2/s$ or more, but preferably 1.0 E−7 $m^2/s$ or less, 1.0 E−8 $m^2/s$ or less, or 1.0 E−9 $m^2/s$ or less. The diffusion layer thickness $L_0$ of each side reaction is preferably 0.10 E−04 m or more, 0.50 E−04 m or more, or 0.80 E−04 m or more, but preferably 2.00 E−04 m or less, 1.50 E−04 m or less, 1.20 E−04 m or less. The reductant bulk concentration $C^e_{Rx}$ ($mol/m^3$) of each side reaction is preferably 0.1 $mol/m^3$ or higher, 1 $mol/m^3$ or higher, or 10 $mol/m^3$ or higher, but preferably 2,000 $mol/m^3$ or lower, 1,500 $mol/m^3$ or lower, or 1,000 $mol/m^3$ or lower. The reaction order $m_x$ of each side reaction is preferably an integer of 1 to 5, more preferably an integer of 1 to 3, still more preferably 1. The valence $n_x$ of each side reaction is preferably an integer of 1 to 5, more preferably an integer of 1 to 3.

For example, when a side reaction 1 (electrode reaction 2) is assumed to be the following water splitting reaction, the valence $n_2$ is 1 and the reductant is water ($H_2O$):

$$H_2O \rightarrow H^+ \cdot OH + e^-$$

The diffusion coefficient $D_2$ of water ($H_2O$) in this electrode reaction 2 is preferably 1.0 E−13 $m^2/s$ or more, 1.0 E−12 $m^2/s$ or more, or 1.0 E−11 $m^2/s$ or more, but preferably 1.0 E−8 $m^2/s$ or less, 1.0 E−9 $m^2/s$ or less, or 1.0 E−10 $m^2/s$ or less.

For example, when a side reaction 2 (electrode reaction 3) is assumed to be the following decomposition reaction of ethylene carbonate, the valence $n_3$ is 1 and the reductant is ethylene carbonate (EC):

[Chem. 3]

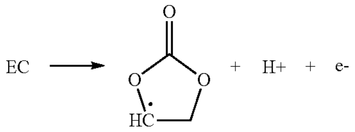

The diffusion coefficient $D_3$ of ethylene carbonate (EC) in this electrode reaction 3 is preferably 1.0 E−16 $m^2/s$ or more, 1.0 E−15 $m^2/s$ or more, or 1.0 E−14 $m^2/s$ or more, but preferably 1.0 E−11 $m^2/s$ or less, 1.0 E−12 $m^2/s$ or less, or 1.0 E−13 $m^2/s$ or less.

<Positive Electrode Potential Correction Step>

The positive electrode potential correction step (S4) is the step of correcting the assumed positive electrode potential E (V) such that a total current density of the capacitor current density $i_c$ and the current densities $i_R$ ($A/m^2$) is equal to the bulk current density, and thereby obtaining a corrected positive electrode potential E (V) (hereinafter, also simply referred to as "corrected positive electrode potential"). The bulk current density at the time of its measurement can be separated into the capacitor current density $i_C$ and the respective current density $i_R$ ($A/m^2$) components. This enables to estimate the extent of the progress of the main reaction and side reactions at the time of the measurement. The positive electrode potential correction step can be performed using an information processing apparatus in the same manner as the current density calculation step.

When there is no corrected positive electrode potential at which the total current density is equal to the bulk current density, the parameter values of the Butler-Volmer equation and the diffusion equation can be modified. In the method of the present disclosure, it is preferred to use parameters that are set in advance such that such a corrected positive electrode potential exists.

<Current Separation Step>

The current separation step (S5) is the step of repeating the current calculation step and the positive electrode potential correction step while modifying the system time such that the total current density converges to the bulk current density i ($A/m^2$). In other words, not only can the bulk current density be separated into the capacitor current density $i_C$ and the respective current density $i_R$ ($A/m^2$) components over a certain time range, but also information regarding the behavior (change) of the corrected positive electrode potential in the time range can be obtained. This enables to estimate the timing and the extent of the progress of the main reaction and side reactions in the time range. The current separation step can be performed using an information processing apparatus in the same manner as the current calculation step and the positive electrode potential correction step.

When the total current density does not converge to the bulk current density, the parameter values of the Butler-Volmer equation and the diffusion equation can be modified. In the method of the present disclosure, it is preferred to use parameters that are set in advance such that the total current density converges to the bulk current density over the period from the start of doping to the completion of doping in which the method of the present disclosure is applied (target period). For example, when constant-current charging is initially performed and followed by low-voltage charging in the doping step, it is more preferred that the parameters of the Butler-Volmer equation and the diffusion equation be set in advance such that the total current density converges to the bulk current density throughout the constant-current charging process.

Parameter Calculation Step Based on Capacitor Current

The parameter calculation step (S6) is the step of calculating at least one parameter selected from the group of specific parameters based on the capacitor current $I_C$ (A) or the positive electrode potential E (V). The capacitor current $I_C$ (A) can be (a) a capacitor current $I_C$ (A) directly calculated from the measured positive electrode potential, or (b) a capacitor current $I_C$ (A) calculated from the assumed positive electrode potential assumed from the measured positive electrode potential. The positive electrode potential E (V) can be the measured positive electrode potential, or the corrected positive electrode potential corrected from the assumed positive electrode potential. This parameter calculation step can also be performed using an information processing apparatus in the same manner as the current calculation step and the like.

Examples of the group of parameters include an integrated capacity parameter of the capacitor current $I_C$ (A), a positive electrode potential change parameter of a current capacity Q (mAh) of the capacitor current $I_C$ (A), and a temporal change parameter of the positive electrode potential E (V) in a constant-current (CC) charged region.

The integrated capacity parameter of the capacitor current $I_C$ (A) is the current capacity Q (mAh) derived from ion adsorption and desorption, which is obtained by time integration of a model function of the temporal change of the capacitor current $I_C$ (A). The integrated capacity parameter is preferably calculated in a positive electrode potential E (V) range of an onset potential of a side reaction or higher but an onset potential of a main reaction or lower, more preferably in a positive electrode potential E (V) range of x (V) to y (V) {wherein, x and y are each independently 3.3

V to 3.8 V and satisfy x<y} in a constant-current (CC) charged region. When the positive electrode potential E (V) is in a range of 3.3 V to 3.8 V, the ratio of the capacitor current $I_C$ (A) with respect to a side reaction is relatively high in the bulk current, and the capacitor current $I_C$ (A) is likely to increase or decrease due to the side reaction and other external factors; therefore, the state of the cell, such as current leakage, is likely to be reflected. Calculation of the integrated capacity parameter in this potential range enables to take into consideration the status of the progress of the capacitor current $I_C$ (A). The integrated capacity parameter is more specifically represented by the following equation:

[Math. 29]

$$\int_{t=t_1}^{t=t_2} I_c dt$$

{wherein, $t_1$ represents the time at which the positive electrode potential E (V) becomes equal to or higher than an onset potential of a side reaction, preferably 3.3 V or higher, in a constant-current (CC) charged region; and $t_2$ represents the time at which the positive electrode potential E (V) reaches an onset potential of a main reaction, preferably 3.8 V or higher, in a constant-current (CC) charged region}.

The positive electrode potential change parameter of the current capacity Q (mAh) of the capacitor current $I_C$ (A) is a parameter calculated from a model function of the positive electrode potential change of the current capacity Q (mAh), which is obtained by time integration of the capacitor current $I_C$ (A). The positive electrode potential change parameter is preferably calculated in a positive electrode potential range of an onset potential of a side reaction or higher but an onset potential of a main reaction or lower. As for a method of calculating the parameter onset potential E (V), it can be calculated from current separation, or by single-electrode cyclic voltammetry (CV) using a positive electrode having the same design as that of the cell of interest. The positive electrode potential change parameter is preferably calculated in a positive electrode potential E (V) range of x (V) to y (V) {wherein, x and y are each independently 3.3 V to 3.8 V and satisfy x<y} in a constant-current (CC) charged region. The positive electrode potential change parameter is more specifically positive electrode potential differentiation (dQ/dE) of the current capacity Q (mAh) of the capacitor current $I_C$ (A).

The temporal change parameter of the positive electrode potential E (V) is a parameter that relates to temporal change in the positive electrode potential E (V). In order to take into consideration the effect of the capacitor current $I_C$ (A), the temporal change parameter is preferably calculated in a positive electrode potential E (V) range of x (V) to y (V) {wherein, x and y are each independently 3.3 V to 3.8 V and satisfy x<y} in a constant-current (CC) charged region. The temporal change parameter is more specifically, for example, time differentiation of a time-positive electrode potential model function (dE/dt).

Parameter Calculation Step Based on Electrode Reaction Current

The parameter calculation step (S6) is the step of calculating at least one parameter selected from the group of specific parameters based on the electrode reaction current $I_d$ (A) or the positive electrode potential E (V). The electrode reaction current $I_d$ (A) can be (a) an electrode reaction current $I_d$ (A) directly calculated from the measured positive electrode potential, or (b) an electrode reaction current $I_d$ (A) calculated from the assumed positive electrode potential assumed from the measured positive electrode potential. The positive electrode potential E (V) can be the measured positive electrode potential, or the corrected positive electrode potential corrected from the assumed positive electrode potential. This parameter calculation step can also be performed using an information processing apparatus in the same manner as the current calculation step and the like.

Examples of the group of parameters include an integrated capacity parameter of the electrode reaction current $I_d$ (A), a positive electrode potential change parameter of a current capacity Q (mAh) of the electrode reaction current $I_d$ (A), and a temporal change parameter of the positive electrode potential E (V) in a constant-current (CC) charged region. The group of parameters may also include a parameter obtained from fitting of the positive electrode potential E (V) by the current separation step.

The integrated capacity parameter of the electrode reaction current $I_d$ (A) is the current capacity Q (mAh) of the electrode reaction current $I_d$ (A), which is obtained by time integration of a model function of the temporal change of the electrode reaction current $I_d$ (A). The integrated capacity parameter is preferably calculated in a positive electrode potential E (V) range of higher than an onset potential of a main reaction, more preferably in a positive electrode potential E (V) range of x (V) to y (V) {wherein, x and y are each independently larger than 3.8 V and satisfy x<y} in a constant-current (CC) charged region. The main reaction often takes place at a positive electrode potential E (V) of higher than 3.8 V; therefore, calculation of the integrated capacity parameter in this potential range enables to mainly take into consideration the status of the progress of the main reaction. The integrated capacity parameter is more specifically represented by the following equation:

[Math. 30]

$$\int_{t=t_1}^{t=t_2} I_d dt$$

{wherein, $t_1$ represents the time at which the positive electrode potential E (V) becomes higher than an onset potential of a main reaction, preferably 3.8 V or higher, in a constant-current (CC) charged region; and $t_2$ represents the time at which constant-current (CC) charging is terminated}.

The positive electrode potential change parameter of the current capacity Q (mAh) of the electrode reaction current $I_d$ (A) is a parameter calculated from a model function of the positive electrode potential change of the current capacity Q (mAh), which is obtained by time integration of the electrode reaction current $I_d$ (A). The positive electrode potential change parameter is preferably calculated in a positive electrode potential range of higher than an onset potential of a main reaction. As for a method of calculating the onset potential E (V), it can be calculated from current separation, or by single-electrode cyclic voltammetry (CV) using a positive electrode having the same design as that of the cell of interest. The positive electrode potential change parameter is preferably calculated in a positive electrode potential E (V) range of x (V) to y (V) {wherein, x and y are each independently larger than 3.8 V and satisfy x<y} in a constant-current (CC) charged region. The positive electrode potential change parameter is more specifically positive electrode potential differentiation (dQ/dE) of the current capacity Q (mAh) of the electrode reaction current $I_d$ (A).

The temporal change parameter of the positive electrode potential E (V) is a parameter that relates to temporal change in the positive electrode potential E (V). In order to take into consideration the effect of a main reaction, the temporal change parameter is preferably calculated in a positive electrode potential E (V) range of x (V) to y (V) {wherein, x and y are each independently larger than 3.8 V and satisfy x<y} in a constant-current (CC) charged region. The temporal change parameter is more specifically, for example, time differentiation of a time-positive electrode potential model function (dE/dt).

Examples of the parameter obtained from fitting of the positive electrode potential E (V) by the current separation step include at least one selected from the group consisting of the diffusion coefficient D ($m^2/s$), the exchange current density $i_0$ ($A/m^2$), the symmetry factor α, the reductant bulk concentration $C^e$ ($mol/m^3$), and the onset potential $E^{eq}$ (V) of a main reaction and/or a side reaction.

<Prediction Step>

The prediction step is the step of inputting the thus calculated parameter to a learned model which has learned the correlations between the above-described group of parameters and the performance of a nonaqueous lithium power storage element, and outputting the performance of the nonaqueous lithium power storage element (S7). This prediction step can also be performed using an information processing apparatus in the same manner as the current calculation step and the like.

The performance of the nonaqueous lithium power storage element includes at least one selected from the group consisting of cell capacity (mAh), cell resistance (mΩ), and self-discharge performance. The performance of the nonaqueous lithium power storage element may also include the durability performance of the nonaqueous lithium power storage element. The self-discharge performance can be represented by a self-discharge coefficient. The present inventors allowed a machine learning model to learn the correlations between various parameters in the doping step and the performance of a nonaqueous lithium power storage element, and thereby discovered that the above-described group of specific parameters in particular are highly correlated with the performance of the nonaqueous lithium power storage element. The technical reason for this is not necessarily clear at the time of the filing of the present application; however, the behavior of the capacitor current $I_C$ (A) determined by current separation indicates the amount of ion adsorption and desorption on the positive electrode surface, and the capacitor current $I_C$ (A) is affected by side reactions and other external factors to increase or decrease. In other words, it is presumed that the capacitor current $I_C$ (A) reflects the amount of current leakage and the coating film state of the cell.

The durability performance of the nonaqueous lithium power storage element preferably includes at least one selected from the group consisting of capacity retention rate, resistance increase rate, and gas generation amount. Examples of predicted durability performance of the nonaqueous lithium power storage element include, in addition to the above, cell thickness increase rate and Li deactivation rate. The present inventors allowed a machine learning model to learn the correlations between various parameters in the doping step and the performance of a nonaqueous lithium power storage element, and thereby discovered that the above-described group of specific parameters in particular are highly correlated with the durability performance of the nonaqueous lithium power storage element. The technical reason for this is not necessarily clear at the time of the filing of the present application; however, it is presumed that a coating film derived from an electrode reaction during doping is decomposed during a durability test, and this causes a decrease in the capacity, an increase in the resistance, and generation of a gas.

The "capacity retention rate" refers to a retention rate of the capacity (mAh) of a nonaqueous lithium power storage element in, for example, a cycle test in which charging and discharging of the nonaqueous lithium power storage element are repeated, a float test in which a certain voltage is maintained using an external direct-current power supply, or a storage test in which the nonaqueous lithium power storage element is maintained under certain conditions for a certain period. The "resistance increase rate" refers to a rate of increase in the resistance (mΩ) of a nonaqueous lithium power storage element in, for example, the cycle test, the float test, or the storage test. The "gas generation amount" refers to the amount (cc) of gas generated by a nonaqueous lithium power storage element in, for example, the float test or the storage test. The details of these tests are described below in the section of Examples.

<Treatment after Prediction Step>

After the completion of the performance prediction according to the present disclosure, the doping of the nonaqueous lithium power storage element may be continued further as required. After the completion of the doping, treatments such as the charge-discharge cycle step, the high-temperature aging step, and the degassing and sealing step may be performed as required, whereby a nonaqueous lithium power storage element can be produced.

<<Learned Model and Production Method Thereof>>

The learned model according to the present disclosure is a learned model which has learned the correlations between the above-described group of specific parameters and the performance of a nonaqueous lithium power storage element. This learned model, by inputting thereto at least one parameter selected from the group of parameters consisting of an integrated capacity parameter of a capacitor current $I_C$ (A), a positive electrode potential change parameter of a current capacity Q (mAh) of the capacitor current $I_C$ (A), and a temporal change parameter of the positive electrode potential E (V) in the constant-current (CC) charged region, or the group consisting an integrated capacity parameter of an electrode reaction current $I_d$ (A), a positive electrode potential change parameter of a current capacity (mAh) of the electrode reaction current $I_d$ (A), and a temporal change parameter of the positive electrode potential E (V) in a constant-current (CC) charged region, which parameters are obtained from the doping step of the cell, can make an information processing apparatus execute outputting a predicted performance of the cell.

A method of producing the learned model according to the present disclosure includes: the doping step of doping a nonaqueous lithium power storage element used for training (hereinafter, also referred to as "training cell"); the step of calculating at least one parameter selected from the group of parameters in a constant-current (CC) charged region of the doping step, which group consists of an integrated capacity parameter of a capacitor current $I_C$ (A), a positive electrode potential change parameter of a current capacity Q (mAh) of the capacitor current $I_C$ (A), and a temporal change parameter of a positive electrode potential E (V), or an integrated capacity parameter of an electrode reaction current $I_d$ (A), a positive electrode potential change parameter of a current capacity (mAh) of the electrode reaction current $I_d$ (A), and a temporal change parameter of the positive electrode potential E (V); and the step of inputting, as training data, the thus calculated at least one parameter and performance data of the doped training cell to a machine learning model, and thereby allowing the machine learning model to learn the correlations between the at least one parameter and the performance data. A prediction can be made with a higher accuracy by allowing the machine learning model to learn the correlations from plural sets of training data.

The learned model is preferably one which has learned the correlations of the above-described group of parameters with electrode production conditions, doping conditions, aging conditions, cell design, and cell durability performance, and this learned model can, by inputting thereto the performance required for a nonaqueous lithium power storage element, make an information processing apparatus execute outputting at least one production condition selected from the group consisting of the electrode production conditions, the doping conditions, the aging conditions, and the cell design. This enables to, for example, produce a nonaqueous lithium power storage element under the production conditions appropriate for realizing the durability performance demanded by the customers of the nonaqueous lithium power storage element (e.g., automobile manufacturers and mobile device manufacturers) or propose production conditions to nonaqueous lithium power storage element manufacturers, which can lead to acquisition of new customers.

Examples of the electrode production conditions learned by the learned model include positive electrode production conditions and negative electrode production conditions. Examples of the positive electrode production conditions include the basis weight (g/m$^2$), the thickness (μm), and the bulk density (g/cc) of a positive electrode active material layer, the type and the amount (% by mass) of a positive electrode active material in the positive electrode active material layer, the amount (% by mass) of lithium carbonate in the positive electrode active material layer in a positive electrode precursor, the type and the amount (% by mass) of a binder in the positive electrode active material layer, the type and the amount (% by mass) of a conductive material in the positive electrode active material layer, and the type and the amount (% by mass) of a dispersant in the positive electrode active material layer. Examples of the negative electrode production conditions include the basis weight (g/m$^2$), the thickness (μm), and the bulk density (g/cc) of a negative electrode active material layer, the type and the amount (% by mass) of a negative electrode active material in the negative electrode active material layer, the type and the amount (% by mass) of a binder in the negative electrode active material layer, the type and the amount (% by mass) of a conductive material in the negative electrode active material layer, and the type and the amount (% by mass) of a dispersant in the negative electrode active material layer.

Examples of the doping conditions learned by the learned model include the cell temperature (° C.), the input voltage (V), the bulk current (A), the bulk current density (A/m$^2$), the cell restraining pressure (kgf/cm$^2$), the charging method (e.g., CC, CV, and switching condition thereof), and the doping time.

Examples of the aging conditions learned by the learned model include the cell temperature (° C.) at the time of discharging, the bulk current (A), the bulk current density (A/m$^2$), the cell restraining pressure (kgf/cm$^2$), the discharging method (e.g., CC, CV, and switching condition thereof), the aging temperature, and the aging time.

Examples of the cell design learned by the learned model include the lamination form (e.g., flat type or wound type), the reaction area (m$^2$) (electrode area contributing to a reaction; varies depending on the number of opposing electrodes and the footprint of the electrodes), the cell thickness (mm), the separator thickness (μm), the separator resistance (mΩ·m$^2$), the type and the concentration (M) of a salt of an electrolyte solution, the amount (g) of the electrolyte solution, and the excess amount (g) of the electrolyte solution. The "reaction area (m$^2$)" refers to the electrode area contributing to a reaction, and varies depending on the number of opposing electrodes and the footprint of the electrodes. The "excess amount (g) of the electrolyte solution" refers to the amount of the electrolyte solution that is not retained on an electrode body.

In the method of producing the learned model, doping of a training cell is preferably performed by a method that includes:

(1) the doping condition setting step of setting doping conditions including input current or input voltage;

(2) the measurement step of measuring the positive electrode potential E (V) and the bulk current density i (A/m$^2$) of the training cell while applying the input current or the input voltage to the training cell;

(3) the current calculation step of, with an assumed positive electrode E (V) assumed at the time of modifying the system time by Δt based on the measured positive electrode potential E (V) of the training cell, calculating the capacitor current $I_C$ (A) of the training cell by the following equation, calculating a capacitor current density $i_C$ (A/m$^2$) of the training cell by dividing the capacitor current $I_C$ (A) by a positive electrode precursor area (m$^2$), and calculating, based on the Butler-Volmer equation and the diffusion equation, a current density $i_{R1}$ (A/m$^2$) of an electrode reaction 1 which is a main reaction in which lithium carbonate is decomposed to release lithium ions and electrons, as well as current densities $i_{R2}$ (A/m$^2$) to $i_{RN}$ (A/m$^2$) of electrode reactions 2 to N (wherein, N represents an integer of 3 or larger) which are side reactions:

[Math. 31]

$$I_C = C\frac{dE}{dt}$$

{wherein, $I_C$ represents the capacitor current (A); C represents a capacitor capacity (F/m$^2$) of the training cell; E represents the assumed positive electrode potential E (V); and t represents time (s)};

(4) the positive electrode potential correction step of correcting the assumed positive electrode potential E (V) such that a total current density of the capacitor current density $i_C$ and the current densities $i_{R1}$ to $i_{RN}$ of the respective electrode reactions is equal to the bulk current density i, and thereby obtaining a corrected positive electrode potential E (V); and (5) the current separation step of repeating the steps (3) and (4) while modifying the system time such that the total current density converges to the bulk current density i.

Based on the capacitor current $I_C$ (A) calculated from the assumed positive electrode potential E (V) or based on the corrected positive electrode potential E (V), at least one parameter selected from the group of parameters consisting of an integrated capacity parameter of the capacitor current $I_C$ (A), a positive electrode potential change parameter of the current capacity Q (mAh) of the capacitor current $I_C$ (A), and a temporal change parameter of the positive electrode potential E (V) in a constant-current (CC) charged region can be calculated. Further, by inputting, as training data, the thus calculated at least one parameter and performance data of the doped training cell to a machine learning model, the machine learning model is allowed to learn the correlations thereof. Plural training cells can be doped and plural sets of training data can be input to the machine learning model to allow the machine learning model to learn the correlations.

The training data may further include charge-discharge data for the actual use of the doped training cell. By this, a learned model which has learned the correlations of the above-described group of parameters with the charge-discharge data for the use of the nonaqueous lithium power storage element, and the durability performance of the nonaqueous lithium power storage element in the state of use can be produced.

The training data may further include at least one production condition selected from the group consisting of electrode production conditions, doping conditions, aging conditions, and cell design of the training cell. By this, a learned model which has learned the correlations of the above-described group of parameters with the electrode production conditions, the doping conditions, the aging conditions, the cell design, and the cell durability performance can be produced.

<<Durability Performance Prediction System of Nonaqueous Lithium Power Storage Element>>

The durability performance prediction system according to the present disclosure includes: a measurement device which measures the positive electrode potential E (V) and the bulk current I (A) of a cell; an arithmetic device which performs calculation of electrode reaction current $I_d$ (A), calculation of parameters, and prediction using a learned model; a memory device which stores programs, parameters, and learned model for allowing the arithmetic device to execute the calculations and prediction; and an output device which outputs the results of the prediction. More specifically, the arithmetic device can perform an arithmetic processing of calculating the electrode reaction current $I_d$ (A) of a cell based on the positive electrode potential E (V) measured by the measurement device during doping of the cell, calculating at least one parameter selected from the group of parameters consisting of an integrated capacity parameter of the electrode reaction current $I_d$ (A), a positive electrode potential change parameter of the current capacity Q (mAh) of the electrode reaction current $I_d$ (A), and a temporal change parameter of the positive electrode potential E (V) in a constant-current (CC) charged region, inputting the thus calculated parameter to a learned model which has learned the correlations between the group of parameters and the durability performance of a nonaqueous lithium power storage element, and outputting the durability performance of the nonaqueous lithium power storage element.

The durability performance prediction system may further include condition adjustment devices connected to the cell, such as a charge-discharge device, a temperature regulator, and a pressure regulator, for the purpose of setting and adjusting the doping conditions. The measurement device can include a voltage line, a reference electrode, a current line, a thermocouple, a pressure gauge, and the like that are connected to the respective measurement spots of the cell as required. The information processing apparatus may further include a control device that controls the condition adjustment device, the measurement device, and the like.

<<Performance Prediction System of Nonaqueous Lithium Power Storage Element

The performance prediction system according to the present disclosure includes: a measurement device which measures the positive electrode potential E (V) of a cell; an arithmetic device which performs calculation of capacitor current $I_C$ (A), calculation of parameters, and prediction using a learned model; a memory device which stores programs, parameters, and learned model for allowing the arithmetic device to execute the calculations and prediction; and an output device which outputs the results of the prediction. More specifically, the arithmetic device can perform an arithmetic processing of calculating the capacitor current $I_C$ (A) of a cell based on the positive electrode potential E (V) measured by the measurement device during doping of the cell, calculating at least one parameter selected from the group of parameters consisting of an integrated capacity parameter of the capacitor current $I_C$ (A), a positive electrode potential change parameter of the current capacity Q (mAh) of the capacitor current $I_C$ (A), and a temporal change parameter of the positive electrode potential E (V) in a constant-current (CC) charged region, inputting the thus calculated parameter to a learned model which has learned the correlations between the group of parameters and the performance of a nonaqueous lithium power storage element, and outputting the performance of the nonaqueous lithium power storage element.

The performance prediction system may further include condition adjustment devices connected to the cell, such as a charge-discharge device, a temperature regulator, and a pressure regulator, for the purpose of setting and adjusting the doping conditions. The measurement device can include a voltage line, a reference electrode, a current line, a thermocouple, a pressure gauge, and the like that are connected to the respective measurement spots of the cell as required. The information processing apparatus may further include a control device that controls the condition adjustment device, the measurement device, and the like.

<<Utilization of Performance Prediction Method and System

The performance prediction method and system according to the present disclosure can be utilized for the production of a nonaqueous lithium power storage element. More specifically, at the time of doping a nonaqueous lithium power storage element, by predicting at least one performance selected from the group consisting of cell capacity, cell resistance, and self-discharge performance in accordance with the prediction method of the present disclosure, a nonaqueous lithium power storage element can be produced without performing an inspection of the predicted performance. Conventionally, in the production of a nonaqueous lithium power storage element, it is required to perform an inspection regarding whether or not the resulting nonaqueous lithium power storage element satisfies prescribed performance; however, the performance prediction method and system according to the present disclosure can simplify such an inspection step.

<<Utilization of Performance Prediction Method and System

The performance prediction method and system according to the present disclosure can be utilized for the production of a nonaqueous lithium power storage element. More specifically, at the time of doping a nonaqueous lithium power storage element, by predicting the above-described performance (e.g., durability performance) in accordance with the prediction method of the present disclosure, a nonaqueous lithium power storage element can be produced without performing an inspection of the predicted durability performance. Conventionally, in the production of a nonaqueous lithium power storage element, it is required to perform an inspection regarding whether or not the resulting nonaqueous lithium power storage element satisfies a prescribed durability performance; however, the durability performance prediction method and system according to the present disclosure can simplify such an inspection step.

By predicting the performance including self-discharge performance in accordance with the prediction method of the present disclosure at the time of doping a nonaqueous lithium power storage element, the thus predicted self-discharge performance can be utilized for designing a nonaqueous lithium power storage element module. Specifically, based on the predicted self-discharge performance, it can be selected whether nonaqueous lithium power storage elements should be connected in series or in parallel. More specifically, when the predicted self-discharge performance is less than 0.030 V/√h, the nonaqueous lithium power storage elements may be connected either in series or in parallel, while when the predicted self-discharge performance is 0.030 V/h or more, it is preferred that the nonaqueous lithium power storage elements be connected in parallel. By this, the design of a nonaqueous lithium power storage element module can be easily optimized.

<<Nonaqueous Lithium Power Storage Element>>

The nonaqueous lithium power storage element, which is the subject of the doping method of the present disclosure, is a nonaqueous lithium power storage element that includes a cell including: a positive electrode precursor that includes a positive electrode active material layer containing lithium carbonate and activated carbon; a negative electrode that includes a negative electrode active material layer containing a negative electrode active material capable of occluding and releasing lithium; a separator arranged between the positive electrode precursor and the negative electrode; and an electrolyte solution.

<Positive Electrode Precursor>

The positive electrode precursor includes a positive electrode active material layer containing lithium carbonate and activated carbon. The term "positive electrode precursor" used herein refers to a positive electrode on which the doping step has not been completed. The positive electrode active material layer may also contain a positive electrode active material other than lithium carbonate and activated carbon, for example, carbon nanotubes, graphene, graphene oxide, a conductive polymer, a porous carbon material (excluding activated carbon), or a composite oxide of lithium (Li) and a transition metal (lithium-transition metal oxide). The positive electrode active material layer may further contain, as required, optional components such as a conductive filler, a binder, a dispersion stabilizer, and a pH modifier.

The positive electrode active material layer is typically formed on a positive electrode current collector. The positive electrode current collector is preferably a metal foil which has a high electron conductivity and is unlikely to be deteriorated due to, for example, elution into an electrolyte solution or reaction with an electrolyte or ion, more preferably an aluminum foil.

<Negative Electrode>

The negative electrode includes a negative electrode active material layer containing a negative electrode active material capable of occluding and releasing lithium. Examples of the negative electrode active material include carbon materials, titanium oxide, silicon, silicon oxide, silicon alloys, silicon compounds, tin, and tin compounds, and the negative electrode active material is preferably a carbon material, more preferably activated carbon. The negative electrode active material layer may also contain, as required, optional components such as a conductive filler, a binder, and a dispersant.

The negative electrode active material layer is typically formed on a negative electrode current collector. The negative electrode current collector is preferably a metal foil which has a high electron conductivity and is unlikely to be deteriorated due to, for example, elution into an electrolyte solution or reaction with an electrolyte or ion, more preferably a copper foil.

<Separator>

The separator is arranged between the positive electrode precursor and the negative electrode. Examples of a material of the separator include polyolefins, celluloses, and aramid resins. The separator is preferably one which includes a polyolefin microporous membrane. Examples of the polyolefin contained in the polyolefin microporous membrane include polyethylene and polypropylene.

<Electrolyte Solution>

The electrolyte solution is preferably a nonaqueous electrolyte solution which contains an electrolyte and a nonaqueous solvent. From the standpoint of obtaining a high conductivity, the electrolyte is preferably an alkali metal salt, more preferably a lithium salt.

From the standpoint of obtaining a high conductivity, the lithium salt is, for example, $(LiN(SO_2F)_2)$, $LiN(SO_2CF_3)_2$, $LiN(SO_2C_2F_5)_2$, $LiN(SO_2CF_3)(SO_2C_2F_5)$, $LiN(SO_2CF_3)(SO_2C_2F_4H)$, $LiC(SO_2F)_3$, $LiC(SO_2CF_3)_3$, $LiC(SO_2C_2F_5)_3$, $LiCF_3SO_3$, $LiC_4F_9SO_3$, $LiPF_6$, or $LiBF_4$. The lithium salt is more preferably at least one selected from the group consisting of $LiPF_6$, $LiN(SO_2F)_2$, and $LiBF_4$. These lithium salts may be used singly, or in combination of two or more thereof.

The nonaqueous solvent is, for example, a chain carbonate or a cyclic carbonate. Examples of the chain carbonate include dialkyl carbonates, such as dimethyl carbonate (DMC), ethyl methyl carbonate (EMC), diethyl carbonate (DEC), dipropyl carbonate, and dibutyl carbonate. Examples of the cyclic carbonate include alkylene carbonates, such as ethylene carbonate (EC), propylene carbonate (PC), butylene carbonate, vinylene carbonate, and fluoroethylene carbonate. From the standpoint of dissolving the electrolyte in a desired amount and allowing a high lithium ion conductivity to be exerted, the nonaqueous solvent is preferably a cyclic carbonate, more preferably ethylene carbonate (EC).

The electrolyte solution may also contain, as required, additives such as a sulfur-containing compound, a phosphoric acid ester compound, an acyclic fluorine-containing ether, a cyclic phosphazene, a fluorine-containing cyclic carbonate, a cyclic carbonic acid ester, a cyclic carboxylic acid ester, and a cyclic acid anhydride.

<Outer Package>

The nonaqueous lithium power storage element is typically housed in an outer package typified by a metal can or a laminated packaging material. As a method of sealing the outer package, for example, heat sealing or impulse sealing may be employed when a laminated packaging material is used.

<<Method of Producing Nonaqueous Lithium Power Storage Element>>

Figure 4:
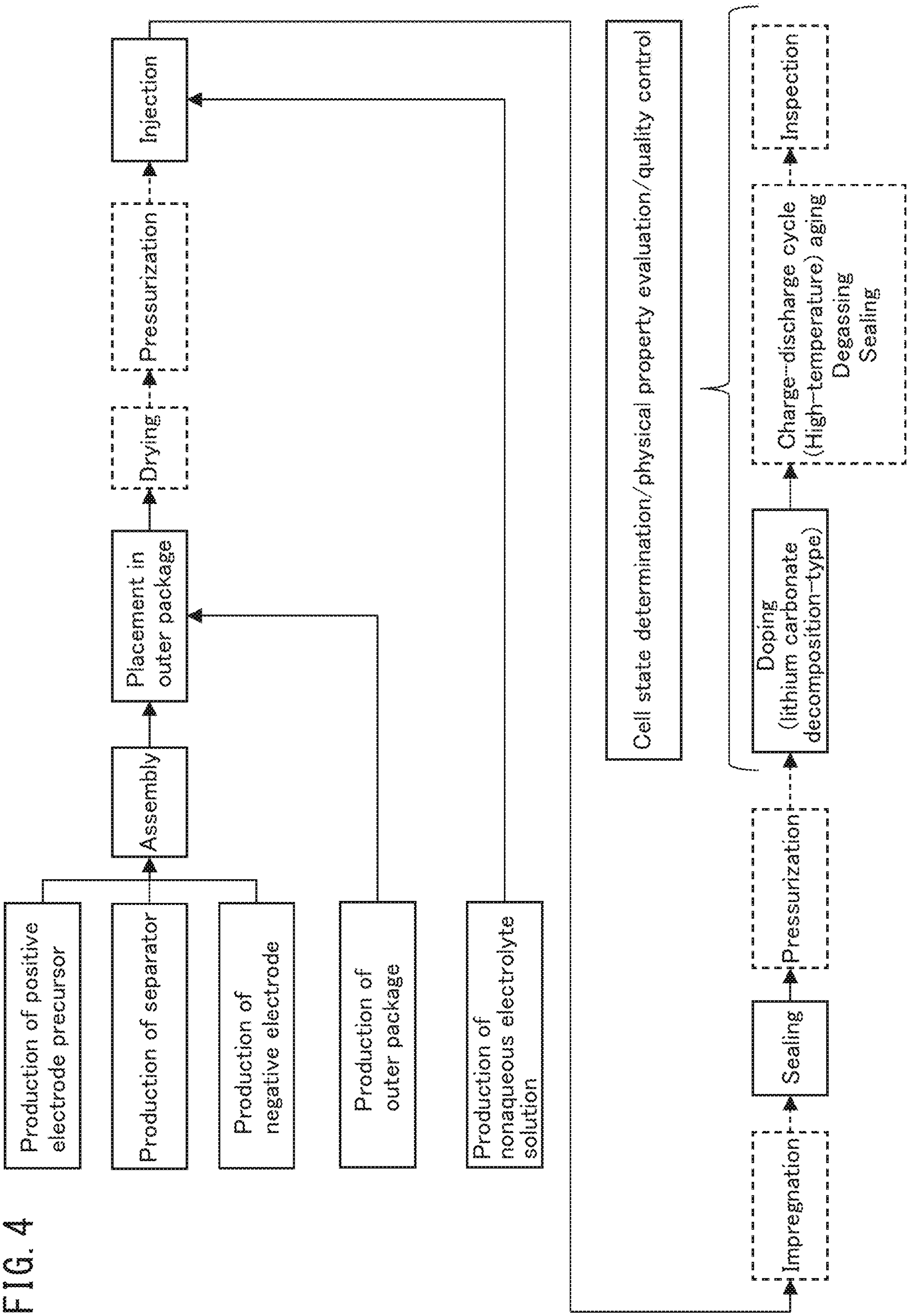
FIG. 4 is a flow chart describing one example of the method of producing a nonaqueous lithium power storage element according to the present disclosure.

FIG. 4 is a flow chart describing one example of the method of producing a nonaqueous lithium power storage element according to the present disclosure. The method of producing a nonaqueous alkali metal power storage element according to the present disclosure relates to constructing a nonaqueous alkali metal power storage element by housing the below-described electrode laminate or wound electrode body along with a nonaqueous electrolyte solution in an outer package. As illustrated in FIG. 4, the method of producing a nonaqueous lithium power storage element according to the present disclosure includes: the step of producing a positive electrode precursor; the step of producing a separator; the step of producing a negative electrode; the step of producing an outer package; the step of producing a nonaqueous electrolyte solution; the assembly step; the step of housing an electrode laminate or a wound electrode body in the outer package; the solution injection step; the sealing step; and the doping step. As desired, the method of producing a nonaqueous lithium power storage element according to the present disclosure may include, for example: the drying step; the pressurization step before the solution injection step; the impregnation step after the solution injection step; the pressurization step before the doping step; the charge-discharge cycle, (high-temperature) aging, degassing, and sealing steps after the doping step; and the inspection step of the resulting nonaqueous lithium power storage element.

In the method of producing a nonaqueous lithium power storage element, as illustrated in FIG. 4, the cell state determination method of the present disclosure can be performed in at least one selected from the group consisting of the doping step, the aging step, and the inspection step and, particularly, it is preferably performed in the doping step.

The positive electrode precursor, the separator, the negative electrode, the outer package, and the nonaqueous electrolyte solution may be as described below as constituents of a nonaqueous lithium power storage element, and can each be produced by a known method or obtained from the market.

<Assembly Step>

In the assembly step, typically, a positive electrode precursor and a negative electrode, which are cut into the form of sheets, are laminated with a separator interposed therebetween to obtain an electrode laminate, and a positive electrode terminal and a negative electrode terminal are connected to the electrode laminate. Alternatively, a positive electrode precursor and a negative electrode are laminated and wound with a separator interposed therebetween to obtain a wound electrode body, and a positive electrode terminal and a negative electrode terminal are connected to the wound electrode body. The shape of the wound electrode body may be a cylindrical shape or a flat shape.

The positive electrode terminal and the negative electrode terminal are connected by a method such as resistance welding or ultrasonic welding.

<Step of Housing in Outer Package>

The electrode laminate or wound electrode body is preferably housed in an outer package typified by a metal can or a laminated packaging material, and sealed with an opening being left only on one side. As a method of sealing the outer package, for example, heat sealing or impulse sealing may be employed when a laminated packaging material is used.

<Drying Step>

The electrode laminate or wound electrode body housed in the outer package is preferably dried to remove residual solvent. One example of a drying method is vacuum drying. The amount of the residual solvent is preferably 1.5% by mass or less per the mass of a positive electrode active material layer or a negative electrode active material layer. As long as the amount of the residual solvent is 1.5% by mass or less, the self-discharge characteristics or the cycle characteristics are hardly deteriorated, which is preferred.

<Pressurization Step>

A pressure is preferably applied from the outside of the outer package, in which the thus dried electrode laminate or wound electrode body is housed, on both sides in the direction perpendicular to the surface of the electrode surface. The pressure is preferably 0.01 kgf/cm$^2$ to 1,000 kgf/cm$^2$. A lower limit value of the pressure is more preferably 0.05 kgf/cm$^2$. An upper limit value of the pressure is more preferably 500 kgf/cm$^2$, still more preferably 100 kgf/cm$^2$, yet still more preferably 30 kgf/cm$^2$, particularly preferably 10 kgf/cm$^2$. When the pressure is 0.01 kgf/cm$^2$ or higher, distortion of the positive electrode precursor and that of the negative electrode are corrected by the pressure, and the distance between the opposing positive electrode precursor and negative electrode is thereby made uniform in a plane; therefore, in the alkali metal doping step, doping is uniformly performed in the plane and the durability is improved, which is preferred. In addition, the below-described reactions in the charge-discharge cycle step and the high-temperature aging step proceed uniformly and the durability is thus improved, which is also preferred. When the pressure is 1,000 kgf/cm$^2$ or lower, a space for the nonaqueous electrolyte solution to permeate into the electrode laminate or wound electrode body is secured, and the permeation rate of the nonaqueous electrolyte solution into the electrode laminate or wound electrode body is improved, which is preferred.

This pressurization step can be performed using a pressurizing jig, and may be continuously performed during the below-described solution injection step.

As means for applying a pressure from the outside of the outer package in which the dried electrode laminate or wound electrode body is housed, any jig may be used as long as it is capable of applying a pressure. For example, a pair of flat metal plates is prepared, the electrode laminate is sandwiched therebetween with its surface being aligned with the metal plates, and the four corners of the metal plates are fixed by screws, whereby a pressure can be applied.

[Pressure Measurement Method]

For the measurement of the pressure, a surface pressure distribution measurement system I-SCAN (manufactured by NITTA Corporation) is used. A sensor sheet used for measuring the surface pressure preferably has an area that covers the entire pressurized surface. For example, when the pressurized surface has an area of 60 mm in length×100 mm in width, an I-SCAN100 sensor (measurement surface dimensions: 112 mm×112 mm) can be used.

The sensor sheet is arranged between the main surface of the outer package and a pressurizing surface of the pair of jigs.

A maximum measurement pressure of the sensor sheet is preferably equal to or greater than a maximum pressurization force applied to the outer package but not greater than three times the maximum pressurization force. For example, when the maximum pressurization force applied to the outer package is 5 kgf/cm$^2$, the maximum measurement pressure of the sensor sheet is preferably 5 kgf/cm$^2$ to 15 kgf/cm$^2$; therefore, as the sensor sheet, for example, I-SCAN100 (R) (maximum measurement pressure: 13 kgf/cm$^2$) is preferably used. As long as the maximum measurement pressure of the sensor sheet is equal to or greater than a maximum pressurization force applied to the outer package but not greater than three times the maximum pressurization force, the in-plane pressurization force applied to the outer package can be accurately measured, which is preferred.

The number of sensor points on the sensor sheet is preferably not less than 400 (longitudinal 20 points×transverse 20 point), more preferably not less than 900 (longitudinal 30 points×transverse 30 points). For example, when a pressurized area $S_1$ is 60 mm in length×100 mm in width (60 $cm^2$), by applying the I-SCAN100 sensor (measurement area $S_s$: 112 mm×112 mm=125.44 $cm^2$, number of sensor points: 1,936), the number of sensor points used on the entire pressurized surface is made to be $(S_1/S_s)\times 1{,}936$ points=926 points, which is preferred.

In the present specification, kgf/$cm^2$ is used as an example of the unit of pressure; however, any unit may be used as long as it indicates pressure, and the unit may be, for example, Pa, mmHg, Bar, atm, or the like.

The data acquired by the above-described I-SCAN are not utilized for evaluating the in-plane pressure irregularities since an excess pressure, which is unrelated to the actual pressurization force, is likely to be detected at the edge or corner of the jig due to the effect of a burr or the like of the jig. Specifically, with regard to all of the pressure data measured in the pressurized plane, the data obtained at the first and last three points on each of the four sides are not utilized as data. For example, when the data in the pressurized plane consist of longitudinal 44 points×transverse 30 points, the columns of the first 3 points and the columns of the last 3 points among the longitudinal 44 points are deleted, the rows of the first 3 points and the rows of the last 3 points among the transverse 30 points are deleted, and the resulting data are used to determine the in-plane pressure distribution. An average value of the thus obtained pressure distribution, $P_{avg}$, is calculated by the following equation and recorded as the pressure applied to the outer package:

[Math. 32]

$$P_{avg.}=\sum_{x=1,y=1}^{m,n}P(x,y)/(m\times n)$$

{wherein, x and y mean the coordinates of the pressure distribution; and m and n indicate a maximum number of points for x and y, respectively}.

<Solution Injection Step, Impregnation Step, and Sealing Step>

After the completion of the assembly step, a nonaqueous electrolyte solution is injected into the electrode laminate or wound electrode body housed in the outer package. One example of a method of injecting the nonaqueous electrolyte solution is a method of injecting the solution into the electrode laminate or wound electrode body under the atmospheric pressure or a reduced pressure, and it is preferred to inject the solution under a reduced pressure. In one embodiment, the internal pressure of the outer package can be reduced to be −5 kPa to −101.32 kPa based on the atmospheric pressure. By performing the injection under a reduced pressure, the time of the solution injection step can be shortened, so that the production efficiency is improved. In addition, the nonaqueous electrolyte solution can be uniformly impregnated into the positive electrode precursor, the negative electrode, and the separator.

In a state where at least a portion of the positive electrode precursor, the negative electrode, and the separator is not impregnated with the nonaqueous electrolyte solution, a lithium compound, which exists in a portion of the positive electrode precursor that is not impregnated with the nonaqueous electrolyte solution or in a portion of the positive electrode precursor facing the negative electrode and the separator that are not impregnated with the nonaqueous electrolyte solution, remains undecomposed in the below-described alkali metal doping step. As a result, when a power storage element in which the nonaqueous electrolyte solution has sufficiently permeated to the inside of the fine pores of the positive electrode, the negative electrode, and the separator, is exposed to a high temperature and a high voltage, a decomposition reaction of the lithium compound takes place, and a gas is generated. In addition, since the doping proceeds heterogeneously, in-plane doping irregularities are generated or local precipitation of lithium (Li) occurs, and this may lead to an increased resistance, a reduced durability, a reduced yield, and the like of the resulting nonaqueous alkali metal power storage element. Therefore, it is preferred to allow the nonaqueous electrolyte solution to uniformly permeate to the inside of the fine pores of the positive electrode precursor, the negative electrode, and the separator. The "power storage element in which the nonaqueous electrolyte solution has sufficiently permeated to the inside of the fine pores of the positive electrode, the negative electrode, and the separator" is, for example, a completed nonaqueous alkali metal power storage element defined above, or a nonaqueous alkali metal power storage element that has been used for an extended period.

In the solution injection step, the nonaqueous electrolyte solution is preferably injected into the outer package in a state where the pressure inside the outer package is reduced to −5 kPa to −101.32 kPa based on the atmospheric pressure (normal pressure), and the nonaqueous electrolyte solution is more preferably injected at −10 kPa to −101.32 kPa, or −10 kPa to −101.30 kPa, still more preferably at −30 kPa to −101.10 kPa, −50 kPa to −101.00 kPa, or −50 kPa to −100.00 kPa. By performing the injection in an environment of −5 kPa or lower based on normal pressure, the nonaqueous electrolyte solution can be uniformly impregnated into the positive electrode precursor, the negative electrode, and the separator. Meanwhile, in an environment of −101.32 kPa or higher based on normal pressure, vaporization of the nonaqueous solvent contained in the nonaqueous electrolyte solution during the injection is inhibited, and a change in the composition of the nonaqueous electrolyte solution is thus prevented, so that the properties of the resulting nonaqueous alkali metal power storage element can be stabilized.

The temperature of the nonaqueous electrolyte solution at the time of the injection is preferably 5° C. to 60° C., more preferably 15° C. to 45° C. When the temperature of the nonaqueous electrolyte solution at the time of the injection is 5° C. or higher, an increase in the viscosity of the nonaqueous electrolyte solution is inhibited, so that the nonaqueous electrolyte solution can be uniformly impregnated into the positive electrode precursor, the negative electrode, and the separator. Meanwhile, when the temperature of the nonaqueous electrolyte solution at the time of the injection is 60° C. or lower, vaporization of the nonaqueous solvent contained in the nonaqueous electrolyte solution during the injection is inhibited, and a change in the composition of the nonaqueous electrolyte solution is thus prevented, so that the properties of the resulting nonaqueous alkali metal power storage element can be stabilized.

After the completion of the solution injection step, it is desired to further perform the impregnation step to sufficiently impregnate the positive electrode precursor, the negative electrode, and the separator with the nonaqueous electrolyte solution. As an impregnation method, for example, a method in which the electrode laminate or wound electrode body after the injection is placed in a decompression chamber with the outer package being in an open state, and the inside of the chamber is brought into a decompressed state using a vacuum pump and subsequently brought back to the atmospheric pressure may be employed. From this standpoint, in the present embodiment, it is preferred to further perform the following steps after the solution injection step:

(a1) the re-decompression step of adjusting the internal pressure of the outer package in an opened state to −50 kPa to −100.00 kPa based on the atmospheric pressure; and (a2) the restoration step of bringing the internal pressure of the outer package in an opened state back to the atmospheric pressure.

In the re-decompression step (a1), the internal pressure of the outer package is more preferably adjusted to −60.00 kPa to −100.00 kPa based on the atmospheric pressure. The sealing step can be performed after the completion of the solution injection step and the impregnation step. In the sealing step, when a laminated packaging material is used, the outer package in an open state is tightly sealed while decompressing the electrode laminate or wound electrode body. When a metal can is used, a sealing means such as welding or caulking is employed.

<Improvement in Micro Short Circuit Ratio by Solution Injection Step>

An alkali metal power storage element which includes, as an alkali metal power storage element precursor, a positive electrode precursor containing a positive electrode active material and an alkali metal compound other than the positive electrode active material, has a problem in that it has a high micro short circuit ratio and a low product yield; however, this problem is solved by injecting a nonaqueous electrolyte solution in the solution injection step while maintaining the inside of an outer package at the atmospheric pressure or lower.

The reason for this is not clear; however, when the positive electrode precursor contains an alkali metal compound other than the positive electrode active material, the oxidative decomposition reaction of the alkali metal compound in the doping step does not proceed in a state where at least a portion of the positive electrode, the negative electrode, and the separator is not impregnated with the nonaqueous electrolyte solution, and doping of the negative electrode active material layer is thus likely to be uneven. It is believed that, consequently, irregularities occur in the negative electrode potential and, as a result of an excessive decrease in the potential in some parts of the negative electrode, lithium is precipitated, and this leads to a micro short circuit between the positive electrode and the negative electrode. It is also believed that, by injecting the nonaqueous electrolyte solution in the solution injection step while maintaining the inside of the outer package at the atmospheric pressure or lower, the nonaqueous electrolyte solution is allowed to permeate even to the inside of the fine pores of the positive electrode, the negative electrode, and the separator and, therefore, the doping irregularities are eliminated and the precipitation of lithium on the negative electrode is inhibited, whereby the micro short circuit ratio is reduced.

On the other hand, the factor causing a micro short circuit in an alkali metal power storage element in which a positive electrode precursor not containing any alkali metal compound other than a positive electrode active material is used as an alkali metal power storage element precursor is different from the factor causing a micro short circuit in the above-described case of using a positive electrode precursor containing an alkali metal compound, and the factor is believed to be attributable to, for example, short-circuiting between the positive electrode and the negative electrode caused by collapse of the active material of the positive electrode or the negative electrode. Therefore, even if the solution injection step is introduced, a micro short circuit ratio improving effect is not exerted.

<Repressurization Step>

The pressure applied from the outside of the outer package is preferably increased after the solution injection step. Hereinafter, the step of pressurizing from the outside of the outer package after the solution injection step is referred to as "repressurization step" when the above-described pressurization step has been performed at least once after the housing step and before the solution injection step, or simply referred to as "pressurization step" when the above-described pressurization step has not been performed after the housing step and before the solution injection step. The pressure is preferably 0.1 kgf/cm$^2$ to 1,000 kgf/cm$^2$, more preferably 0.5 kgf/cm$^2$ to 100 kgf/cm$^2$, still more preferably 1 kgf/cm$^2$ to 10 kgf/cm$^2$. When the pressure is 0.1 kgf/cm$^2$ or higher, distortion of the positive electrode precursor and that of the negative electrode are corrected by the pressure, and the distance between the opposing positive electrode precursor and negative electrode is thereby made uniform in a plane; therefore, in the alkali metal doping step, doping is uniformly performed in the plane and the durability is improved, which is preferred. When the pressure is 1,000 kgf/cm$^2$ or lower, an excessive pressure is not applied to the electrode laminate or the wound electrode body, and the positive electrode precursor, the negative electrode, and the separator, which are constituent materials, are not damaged, which is preferred. The pressurization step or the repressurization step can be continuously performed during the below-described doping step. The pressurization step or the repressurization step can be performed using a pressurizing jig.

<Doping Step of Nonaqueous Lithium Power Storage Element>

The doping step of a nonaqueous lithium power storage element according to the present disclosure pertains to a lithium carbonate decomposition-type doping method. In other words, the doping step of the present disclosure is performed on a nonaqueous lithium power storage element which includes a cell including: a positive electrode precursor that includes a positive electrode active material layer containing lithium carbonate and activated carbon; a negative electrode that includes a negative electrode active material layer containing a negative electrode active material capable of occluding and releasing lithium; a separator arranged between the positive electrode precursor and the negative electrode; and an electrolyte solution.

One example of a preferred operation of lithium carbonate decomposition-type lithium ion doping includes is a method of applying a voltage between the positive electrode precursor and the negative electrode to cause lithium carbonate in the positive electrode precursor to be decomposed and release lithium ions, reducing the lithium ions on the negative electrode, and thereby pre-doping the negative electrode active material layer with the lithium ions. Hereinafter, the step of applying a voltage to a cell that includes a positive electrode precursor, a negative electrode, a separator, a nonaqueous electrolyte solution, and an outer package, and thereby doping the negative electrode with lithium ions may be referred to as "doping step", "pre-doping step" or "voltage application step".

<Cell State Determination Method>

As illustrated in FIG. 4, the cell state determination method of the present disclosure can be performed during the doping step; after the doping step, for example, in at least one step selected from the group consisting of the charge-discharge cycle step, the (high-temperature) aging step, the degassing step, the sealing step after the degassing step, and the inspection step; or both during and after the doping step. Particularly, from the standpoint of determination of the status of the progress of electrode reactions in the doping step as well as physical property evaluation and quality control of the resulting nonaqueous lithium power storage element, it is preferred to perform the cell state determination method of the present disclosure in at least the doping step. As one example of the present disclosure, the cell state determination method performed during the doping step will now be described.

The cell state determination method of the present disclosure includes: (S1) the doping condition setting step; (S2) the step of measuring the positive electrode potential and the bulk current (density); (S3) the step of calculating the capacitor current (density) and the current (density) originating from electrode reactions; and (S4) the step of determining the cell state based on the relationship between the current and the time.

The cell state determination method of the present disclosure can be performed using an information processing apparatus (computer) connected to external devices such as a cell condition adjustment device and a measurement device, along with a doping apparatus or a doping/aging apparatus. The information processing apparatus includes: a memory device which stores, for example, programs for executing current density calculation and the like, parameters, measurement data, and calculation results; an arithmetic device which performs current density calculation and the like; and a control device which can control the operations of external devices such as a charge-discharge device. The programs allow the information processing apparatus to execute information processing for the cell state determination of the present disclosure, such as current density calculation, positive electrode potential correction, current separation, time differentiation of the current, and time integration of the current.

Figure 5:
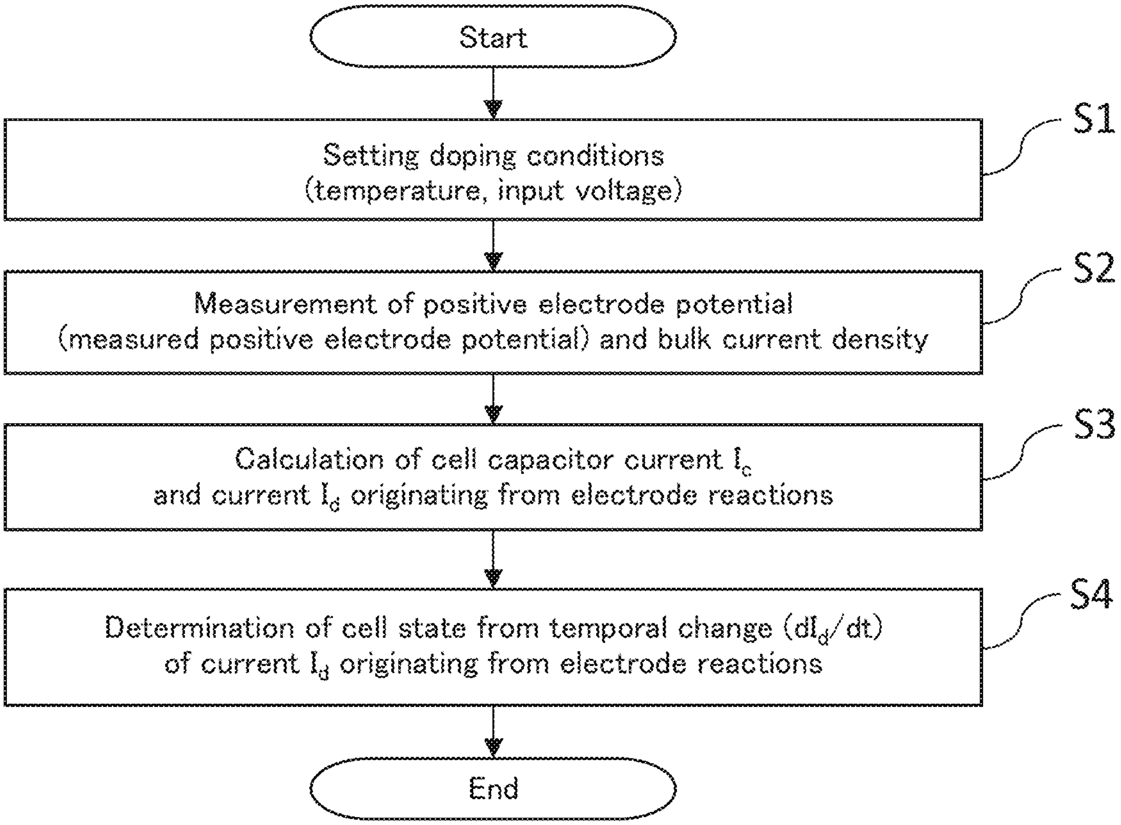
FIG. 5 is a flow chart describing one example of the cell state determination method of a nonaqueous lithium power storage element according to the present disclosure.

FIG. 5 is a flow chart describing the cell state determination method of a nonaqueous lithium power storage element according to the present disclosure. Each step thereof will now be described referring to the symbols used in FIG. 5; however, the cell state determination method of the present disclosure is not limited to the mode of FIG. 5.

<Doping Condition Setting Step>

The doping condition setting step (S1) is the step of setting doping conditions including cell temperature (° C.) and input voltage (V). Examples of the doping conditions include bulk current (A), bulk current density (A/m$^2$), and cell pressure (kgf/cm$^2$), in addition to cell temperature (° C.) and input voltage (V). The doping conditions can be set and adjusted using condition adjustment devices connected to the cell, such as a charge-discharge device, a temperature regulator, and a pressure regulator.

The "cell temperature" refers to the temperature of the system that is measured as the temperature of the cell outer package. The cell temperature is selected to be in a range of preferably 25° C. or higher, 30° C. or higher, or 35° C. or higher, but preferably 80° C. or lower, 75° C. or lower, 70° C. or lower, or 65° C. or lower. When the cell temperature is 25° C. or higher, lithium carbonate contained in the positive electrode precursor is efficiently decomposed, so that doping of lithium ions can be performed quickly. When the cell temperature is 80° C. or lower, decomposition of the electrolyte solution can be inhibited, so that the resistance of the nonaqueous lithium power storage element can be reduced.

The "input voltage" refers to the voltage of an external power supply that is applied to the cell in the doping step. The input voltage is selected to be in a range of preferably 4.0 V or more, 4.2 V or more, or 4.4 V or more, but preferably 5.0 V or less, 4.8 V or less, or 4.6 V or less. When the input voltage is 4.0 V or more, lithium carbonate contained in the positive electrode precursor is efficiently decomposed, so that doping of lithium ions can be performed quickly. When the input voltage is 5.0 V or less, a micro short circuit in the doping step can be inhibited.

The "bulk current" refers to a total amount of electric current flowing in the whole cell in the doping step. The bulk current is selected to be in a range of preferably 0.1 C or more, 1 C or more, or 10 C or more, but 100 C or less, 50 C or less, 40 C or less, or 30 C or less, in terms of C rate. When the bulk current is 0.1 C or more, lithium carbonate contained in the positive electrode precursor is efficiently decomposed, so that doping of lithium ions can be performed quickly. When the bulk current is 100 C or less, the voltage applied to the positive electrode precursor is not excessively high, so that corrosion of a positive electrode current collector can be inhibited.

The "bulk current density" refers to a value obtained by dividing the bulk current by the positive electrode precursor area (area of positive electrode active material layer). The "positive electrode precursor area" is specifically the area of the positive electrode active material layer facing the negative electrode. The bulk current density is selected to be in a range of preferably 0.04 A/m$^2$ or higher, 0.4 A/m$^2$ or higher, or 1.3 A/m$^2$ or higher, but preferably 45 A/m$^2$ or lower, 40 A/m$^2$ or lower, or 35 A/m$^2$ or lower. When the bulk current density is 0.4 A/m$^2$ or higher, lithium carbonate contained in the positive electrode precursor is efficiently decomposed, so that doping of lithium ions can be performed quickly. When the bulk current density is 45 A/m$^2$ or lower, the voltage applied to the positive electrode precursor is not excessively high, so that corrosion of a positive electrode current collector can be inhibited.

The "cell pressure" refers to a pressure exerted by a force that is optionally applied from the outside of the cell outer package in the direction perpendicular to the electrode surface in the doping step. The cell pressure causes fluctuations in the inter-electrode distance and the liquid retention amount, and this leads to accumulation of Li ions on the electrode surface and an increase or decrease in the local electric field strength caused by electrode deflection, consequently affecting the electrode reaction rate and the electrode reaction species. The cell pressure is selected to be in a range of preferably 0.1 kgf/cm$^2$ or higher, 0.5 kgf/cm$^2$ or higher, or 1 kgf/cm$^2$ or higher, but 1,000 kgf/cm$^2$ or lower, 100 kgf/cm$^2$ or lower, or 10 kgf/cm$^2$ or lower. When the cell pressure is 0.1 kgf/cm$^2$ or higher, distortion of the positive electrode precursor and that of the negative electrode are corrected by the pressure, and the distance between the opposing positive electrode precursor and negative electrode is thereby made uniform in a plane; therefore, doping is uniformly performed and the durability of the resulting nonaqueous lithium power storage element is improved, which is preferred. When the cell pressure is 1,000 kgf/cm$^2$ or lower, damage to the members constituting the cell, such as the positive electrode precursor, the negative electrode, and the separator, is reduced.

Examples of a charging method in the doping step include constant-current charging and constant-voltage charging. For example, the positive electrode voltage can be increased by constant-current charging in the period from the start to an early stage of the doping step and, once the positive electrode voltage reaches an arbitrary value, the charging method can be switched to constant-voltage charging. This prevents the positive electrode voltage of the cell from being increased more than necessary, so that the occurrence of an undesirable side reaction, such as decomposition of the electrolyte solution, can be inhibited. The method of the present disclosure can be employed for both constant-current charging and constant-voltage charging. In the period from the start to an early stage of the doping step, various side reactions are likely to occur with an increase in the positive electrode potential, and it is thus highly necessary to estimate the status of the progress of main reaction; therefore, it is effective to employ the method of the present disclosure in the stage of constant-current charging, which is a period from the start of the doping step until the switching to constant-voltage charging.

The duration of the doping step is preferably 0.5 hours or longer, 1 hour or longer, or 1.5 hours or longer, but preferably 30 hours or shorter, 10 hours or shorter, or 5 hours or shorter, as measured from the start of applying the input voltage. When the duration of the doping step is 0.5 hours or longer, doping of lithium ions is allowed to proceed sufficiently. When the duration of the doping step is 30 hours or shorter, undesirable side reactions such as decomposition of the electrolyte solution can be inhibited, so that the resistance of the resulting nonaqueous lithium power storage element can be reduced.

When constant-current charging is performed from the start to an early stage of the doping step, the duration of the constant-current charging is preferably 15 minutes or longer, 30 minutes or longer, or 1 hour or longer, but preferably 4 hours or shorter, 3 hours or shorter, or 2 hours or shorter. When the duration of the constant-current charging is in this range, not only can the doping step be performed quickly, but also side reactions can be inhibited without an excessive increase in the positive electrode voltage of the cell. The constant-current charging is switched to constant-voltage charging at a measured positive electrode potential of preferably 4.3 V or more, 4.4 V or more, or 4.5 V or more, but preferably 4.9 V or less, 4.8 V or less, or 4.7 V or less.

<Measurement Step>

The measurement step (S2) is the step of measuring the positive electrode potential E (V) and the bulk current density i (A/m$^2$) of the cell while applying the input voltage to the cell. By applying the input voltage, lithium carbonate existing in the positive electrode precursor is decomposed to release lithium ions, and the negative electrode active material can be doped with the lithium ions. In the measurement step, for example, the cell temperature (° C.) and the cell pressure (kgf/cm$^2$) can also be measured in addition to the positive electrode potential and the bulk current density of the cell. These physical properties can each be measured using a measurement device connected to the respective measurement spots of the cell as required, such as a voltage line, a reference electrode, a current line, a thermocouple, or a pressure gauge.

The positive electrode potential E (V) of the cell can be determined by, but not limited to, connecting a voltage line to the positive electrode and negative electrode terminal of the cell to measure the cell voltage, and putting a lithium reference electrode into the cell to measure the reference electrode potential. Alternatively, the positive electrode potential E (V) may be estimated by measuring the cell voltage without a reference electrode. The measured positive electrode potential E (V) of the present disclosure encompasses the positive electrode potential that is directly measured using a reference electrode, and the positive electrode potential that is indirectly determined from the measured cell voltage or the like. The bulk current density i (A/m$^2$) of the cell can be determined by connecting a current line to the positive electrode and negative electrode terminal of the cell to measure the bulk current (A) and dividing the thus measured value by the positive electrode precursor area (area of positive electrode active material layer). The positive electrode potential and the bulk current density that are measured in the measurement step are hereinafter referred to as "measured positive electrode potential" and "measured bulk current density", respectively.

<Current (Density) Calculation Step>

The current (density) calculation step (S3) is the step of calculating the capacitor current $I_C$ (A) and the capacitor current density $i_C$ (A/m$^2$) of the cell as well as the current $I_d$ (A) and the current density $i_d$ (A/m$^2$), which originate from electrode reactions, based on the positive electrode potential E, the bulk current density i, and the positive electrode precursor area (m$^2$) of the cell, which are measured in the step (S2), using the following equations:

[Math. 33]

$$I_C = C\frac{dE}{dt}$$

$$I_d = I - I_c$$

$$i_d = i - i_c$$

{wherein, I represents a bulk current (A); i represents a bulk current density (A/m$^2$); $I_d$ represents the current (A) originating from electrode reactions; $i_d$ represents a current density (A/m$^2$) originating from the electrode reactions; $I_C$ represents the capacitor current (A) of the cell; $i_C$ represents a capacitor current density (A/m$^2$) of the cell; C represents a capacitor capacity (F); E represents the positive electrode potential E (V) of the cell; and t represents time (s)};

In the current (density) calculation step (S3), the capacitor current $I_C$ (A) and the capacitor current density $i_C$ (A/m$^2$) of the cell as well as the current $I_d$ (A) and the current density $i_d$ (A/m$^2$) which originating from electrode reactions may be calculated with a measurement or assumption of the positive electrode potential E (V) at the time of modifying the system time by Δt from a specific measurement time point in the step (S2).

<State Determining Step>

The state determining step (S4) is the step of determining the state of the cell from a temporal change ($dI_d/dt$) of the current $I_d$ originating from electrode reactions. A reference value or an acceptable numerical range of ($dI_d/dt$) is not limited, and may be set in advance based on the physical properties of the nonaqueous lithium power storage element, examples of which include: initial properties such as the discharge capacity, the capacitance, and the normal-temperature discharge internal resistance; the micro short circuit ratio; cycle characteristics such as the charge-discharge cycle characteristics and the high-load change-discharge cycle characteristics; and safety such as the safety in a nail penetration test and the gas generation amount in a high-temperature high-voltage float test, or may be set continuously or sequentially by applying a learning model.

Specifically, in the state determining step (S4), a time differentiation value of the current $I_d$ originating from electrode reactions is calculated, and the cell state can be determined from a comparison between the thus calculated value of ($dI_d/dt$) and a reference value set in advance, or whether or not the calculated value of ($dI_d/dt$) is in a numerical range set in advance, or based on a learning model produced through the cell state determination method of the present disclosure.

<Preferred Example of Current (Density) Calculation Step and State Determining Step>

Figure 6:
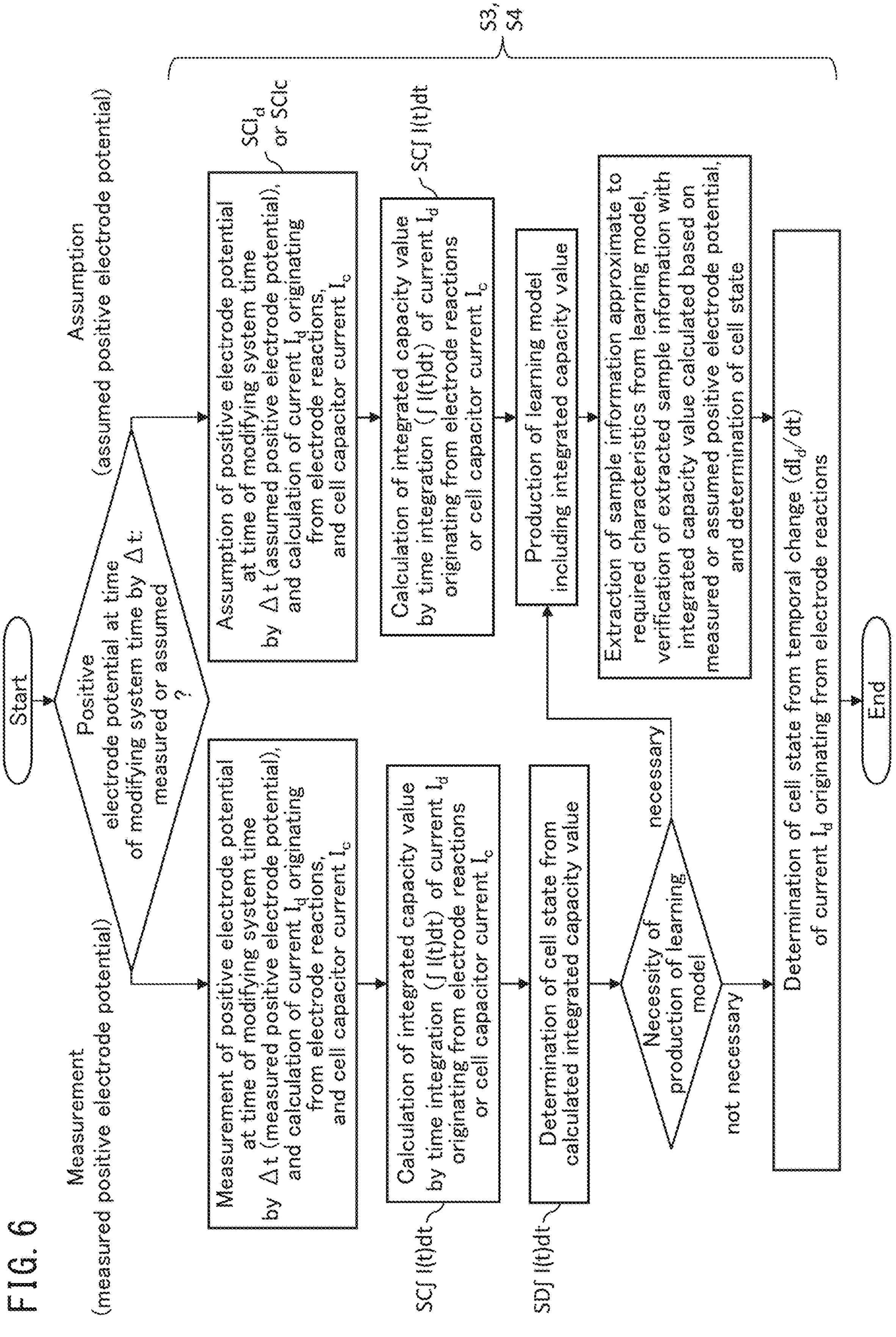
FIG. 6 is a flow chart describing one example of the cell state determining step according to the present disclosure based on a relationship between current and time.
Figure 8:
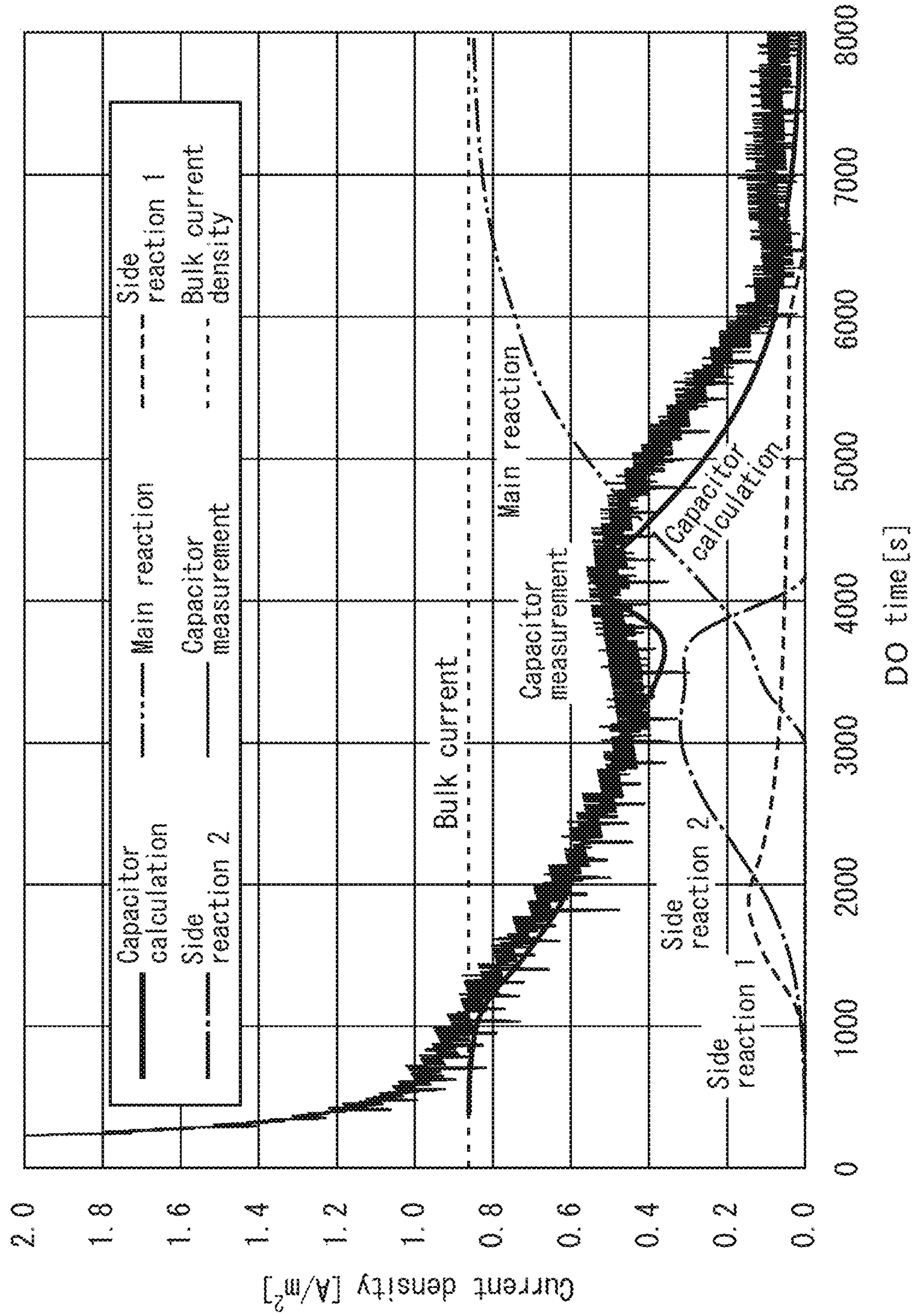
FIG. 8 is a graph showing the relationship between the doping time (s) and the current density (A/m$^2$) in the doping step of cell 1 in one Example.
Figure 9:
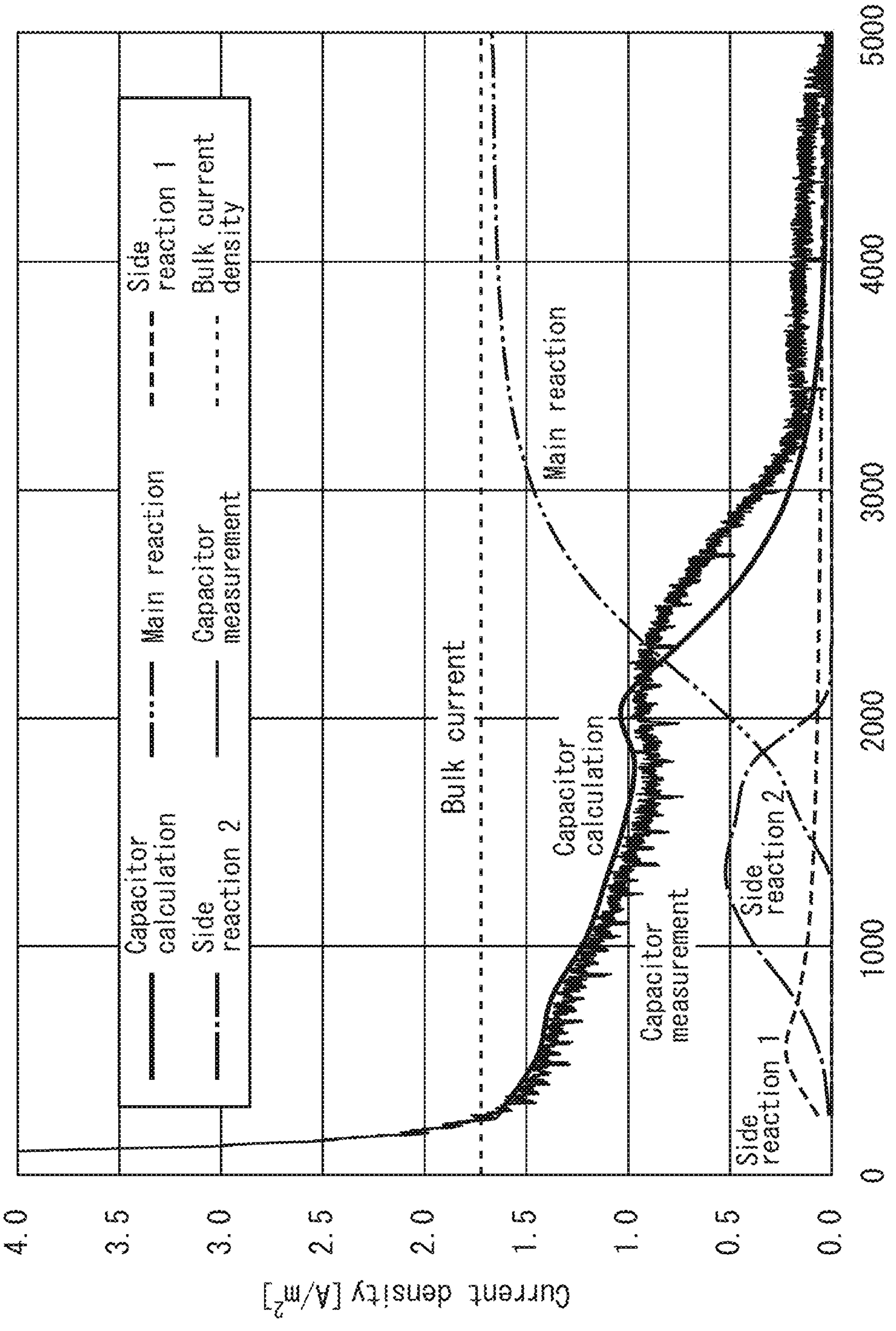
FIG. 9 is a graph showing the relationship between the doping time (s) and the current density (A/m$^2$) in the doping step of cell 2 in one Example.
Figure 10:
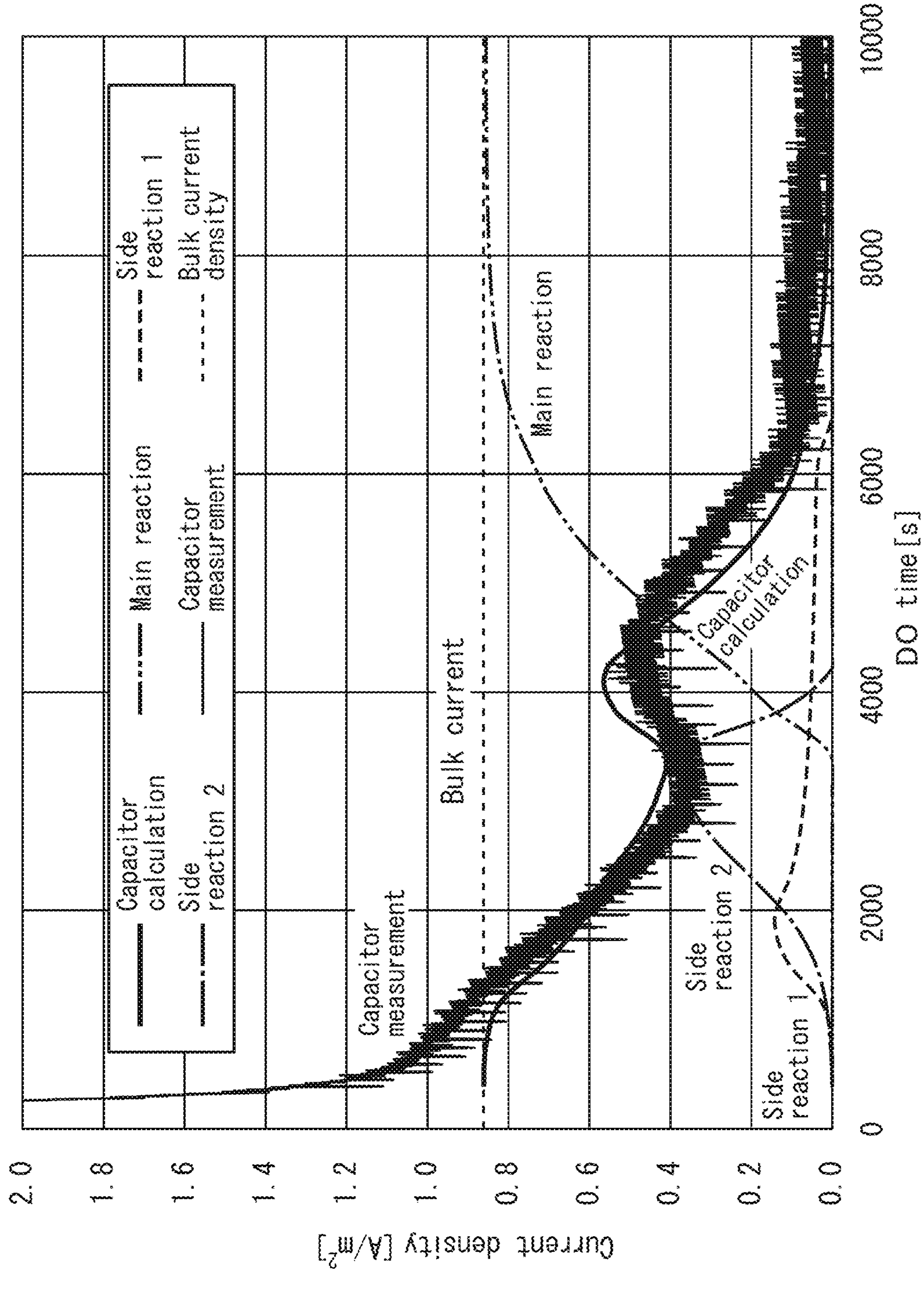
FIG. 10 is a graph showing the relationship between the doping time (s) and the current density (A/m$^2$) in the doping step of cell 3 in one Example.
Figure 11:
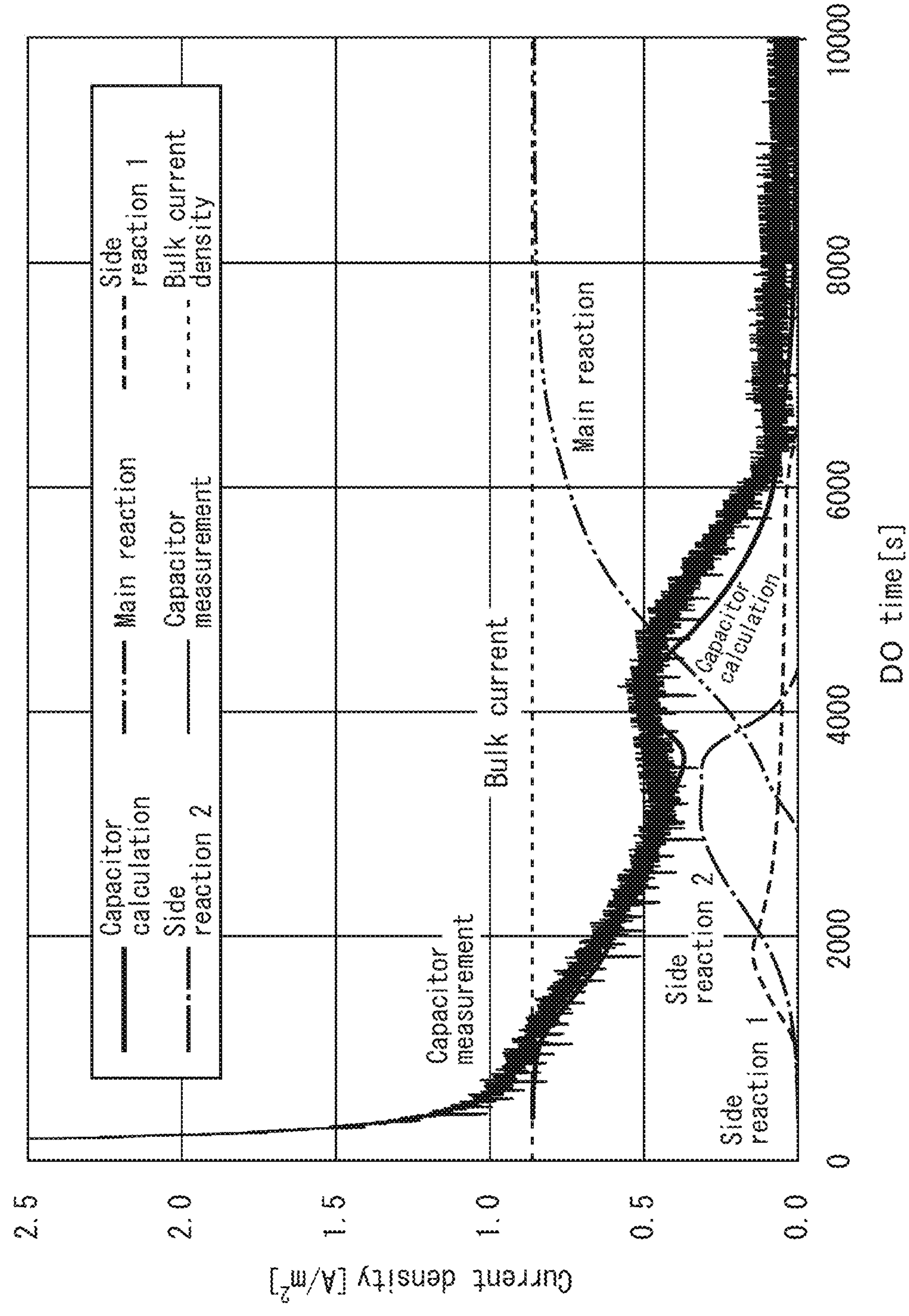
FIG. 11 is a graph showing the relationship between the doping time (s) and the current density (A/m$^2$) in the doping step of cell 4 in one Example.
Figure 12:
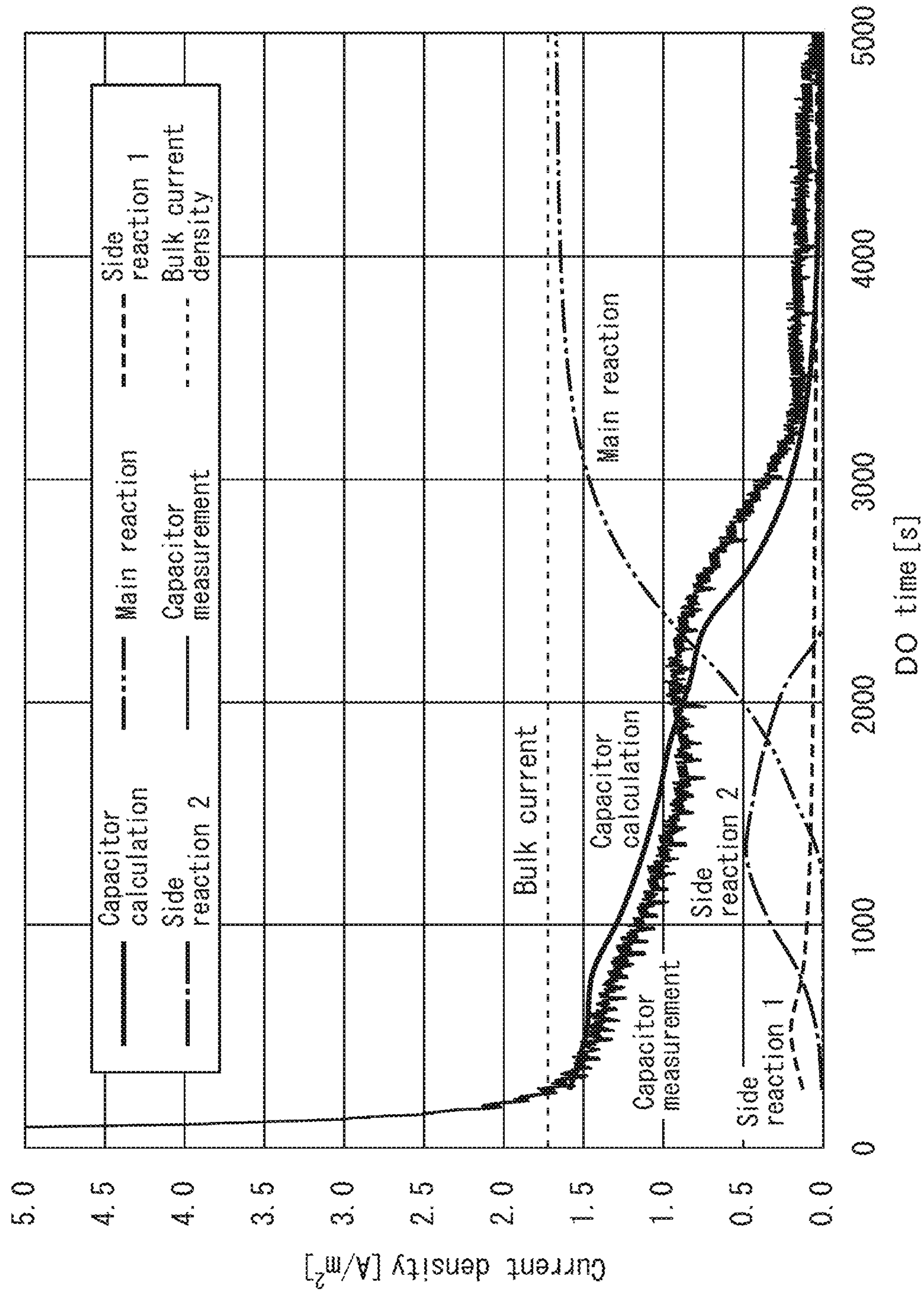
FIG. 12 is a graph showing the relationship between the doping time (s) and the current density (A/m$^2$) in the doping step of cell 5 in one Example.
Figure 13:
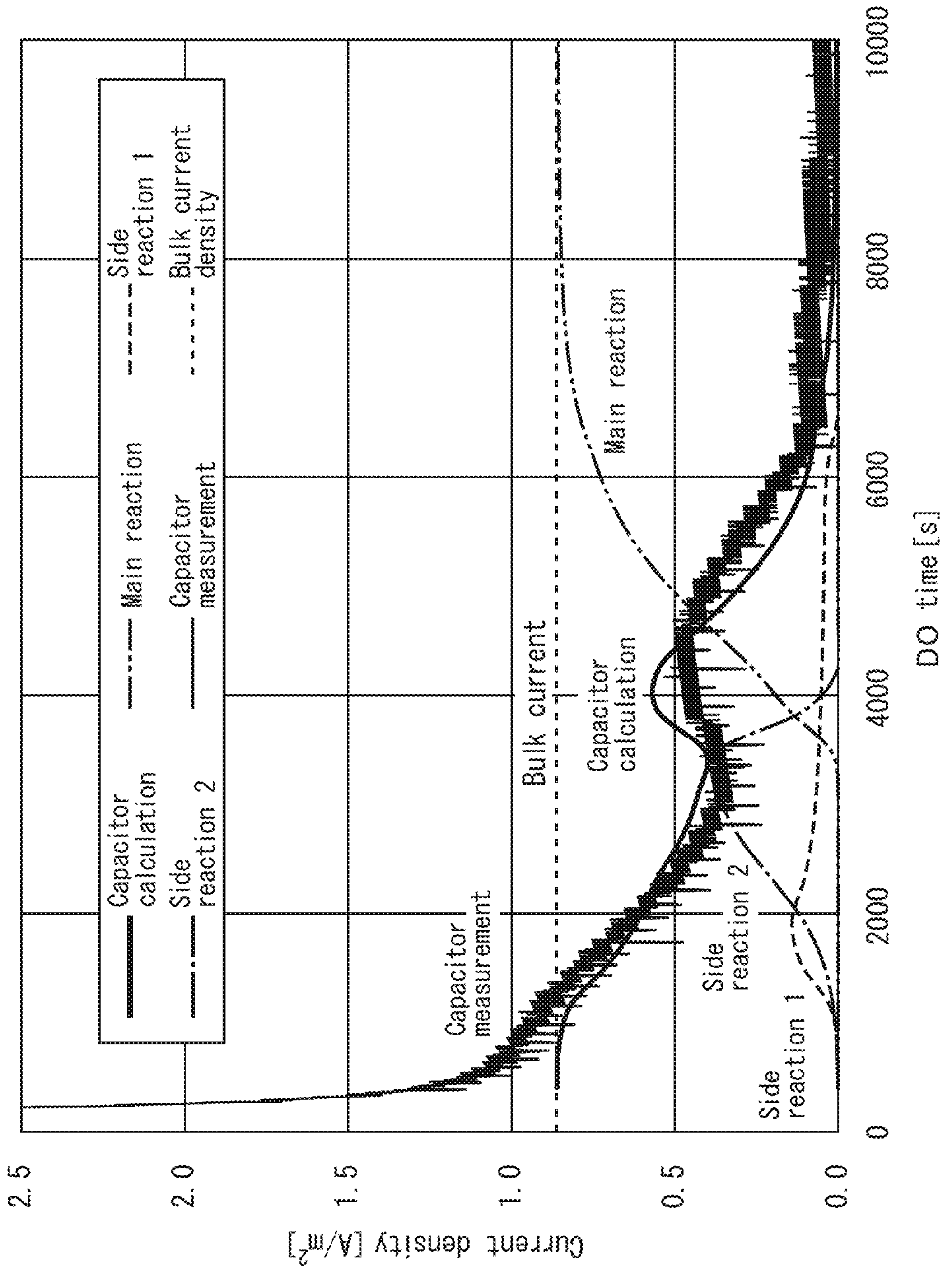
FIG. 13 is a graph showing the relationship between the doping time (s) and the current density (A/m$^2$) in the doping step of cell 6 in one Example.
Figure 14:
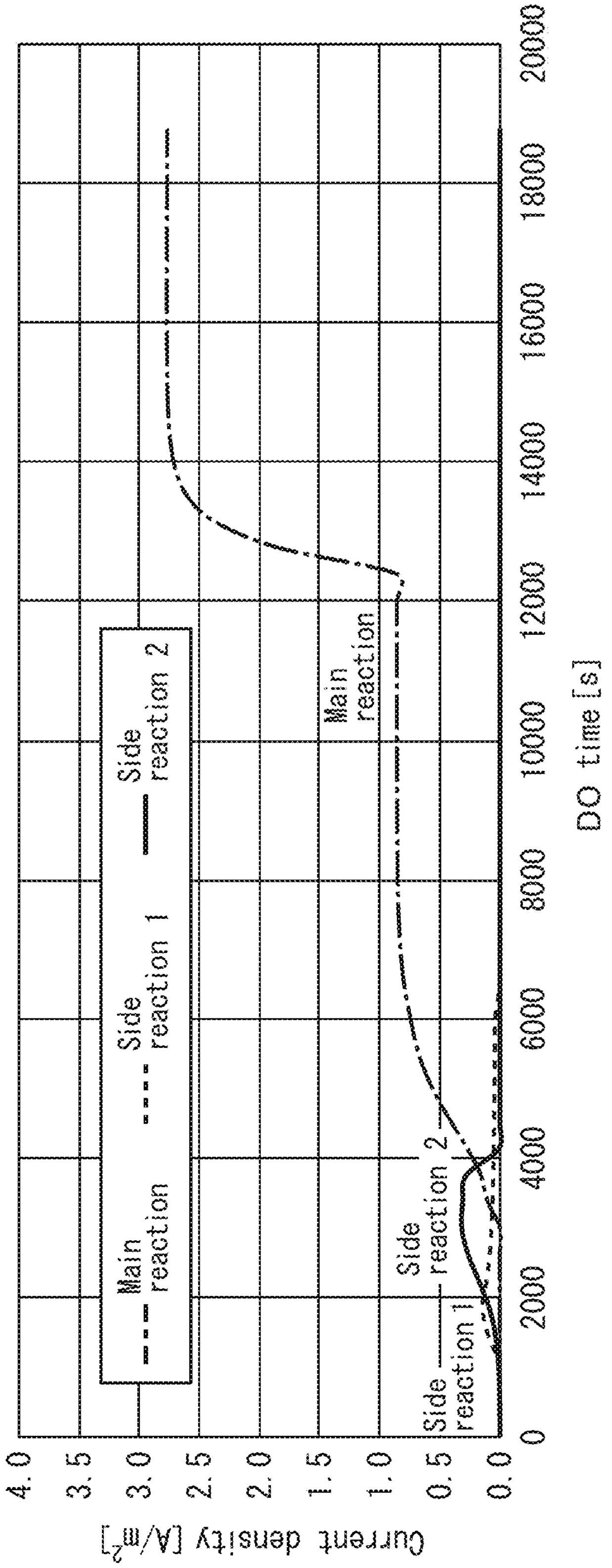
FIG. 14 is a graph showing the temporal change of the current density in each reaction during the doping step of the cell 1 produced in one Example.
Figure 15:
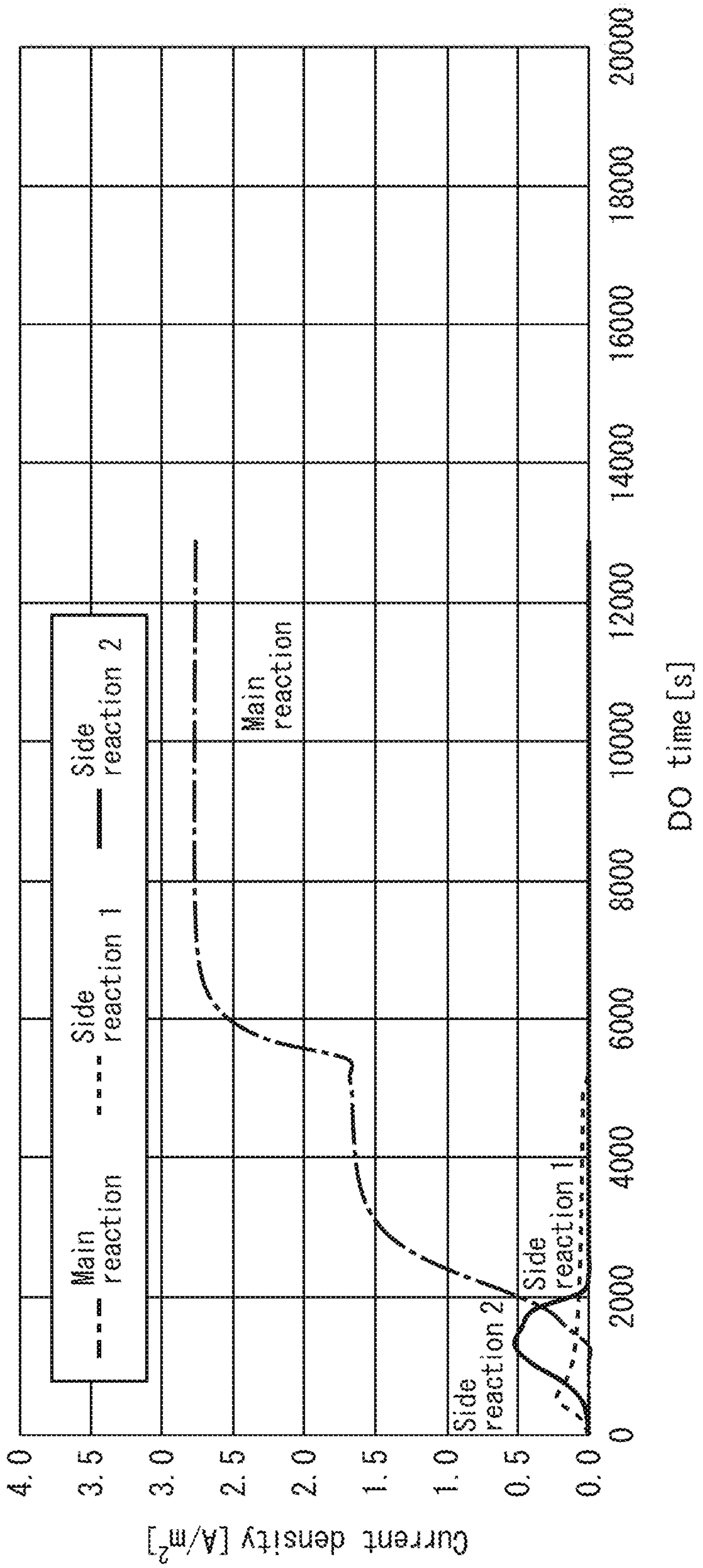
FIG. 15 is a graph showing the temporal change of the current density in each reaction during the doping step of the cell 2 produced in one Example.
Figure 16:
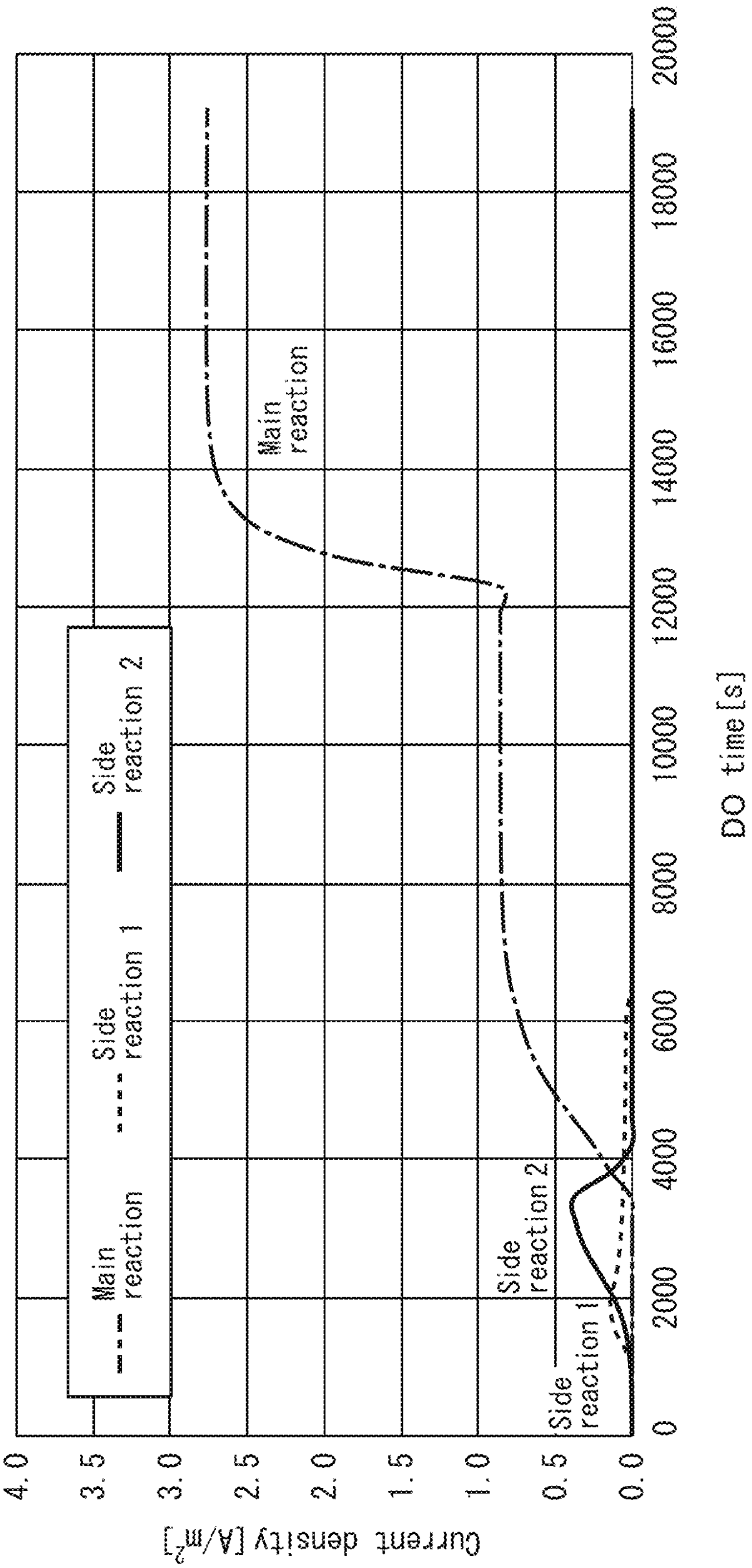
FIG. 16 is a graph showing the temporal change of the current density in each reaction during the doping step of the cell 3 produced in one Example.
Figure 17:
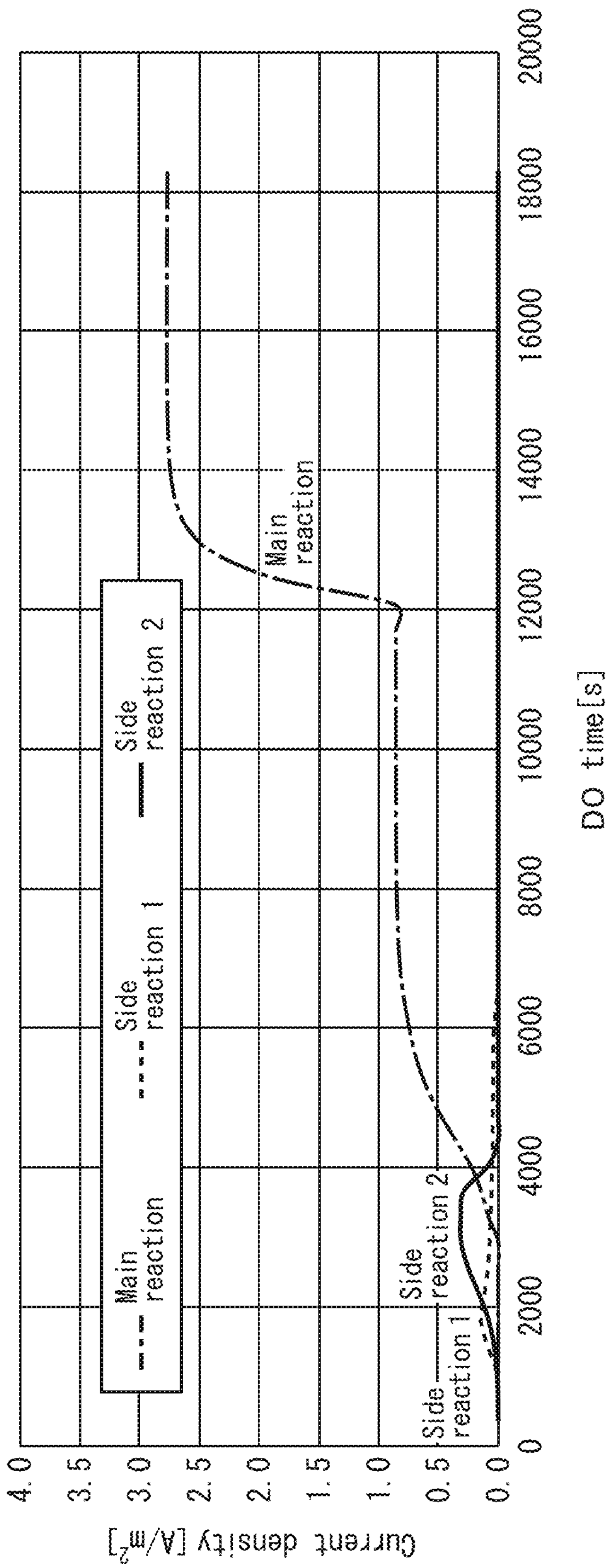
FIG. 17 is a graph showing the temporal change of the current density in each reaction during the doping step of the cell 4 produced in one Example.
Figure 18:
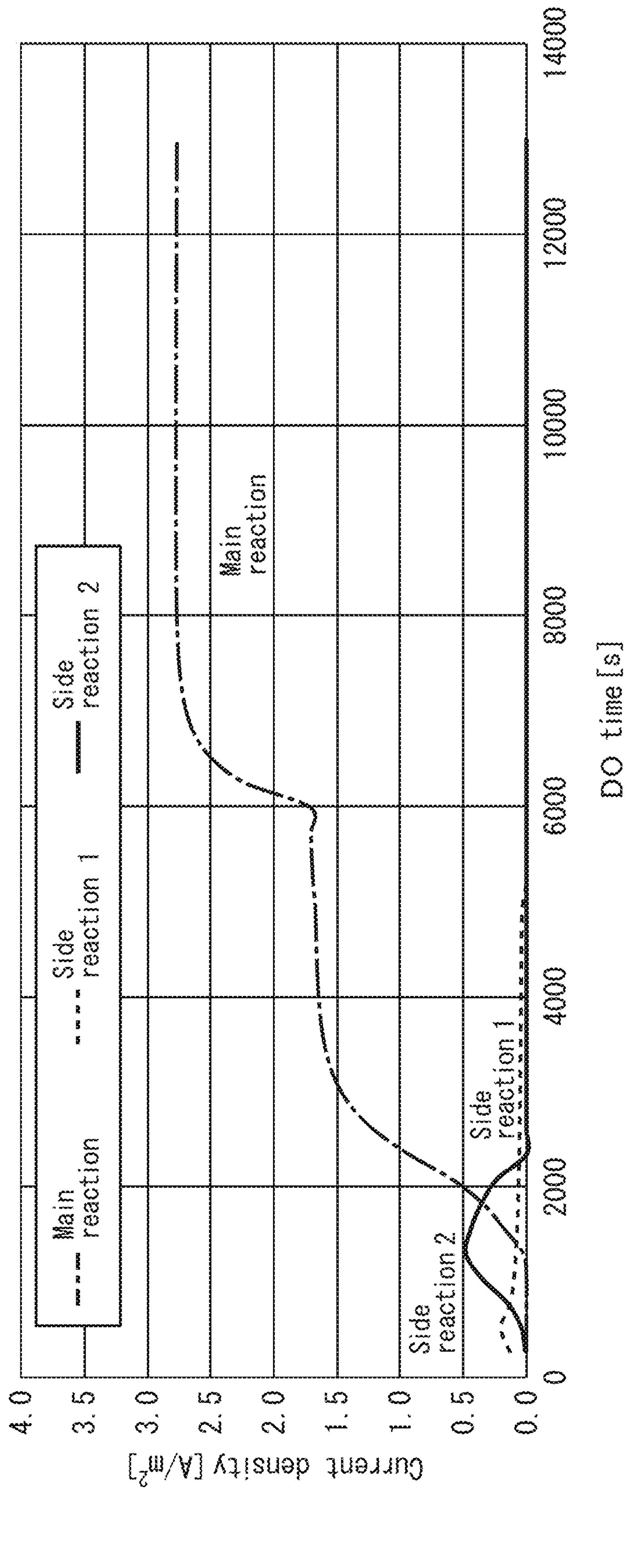
FIG. 18 is a graph showing the temporal change of the current density in each reaction during the doping step of the cell 5 produced in one Example.
Figure 19:
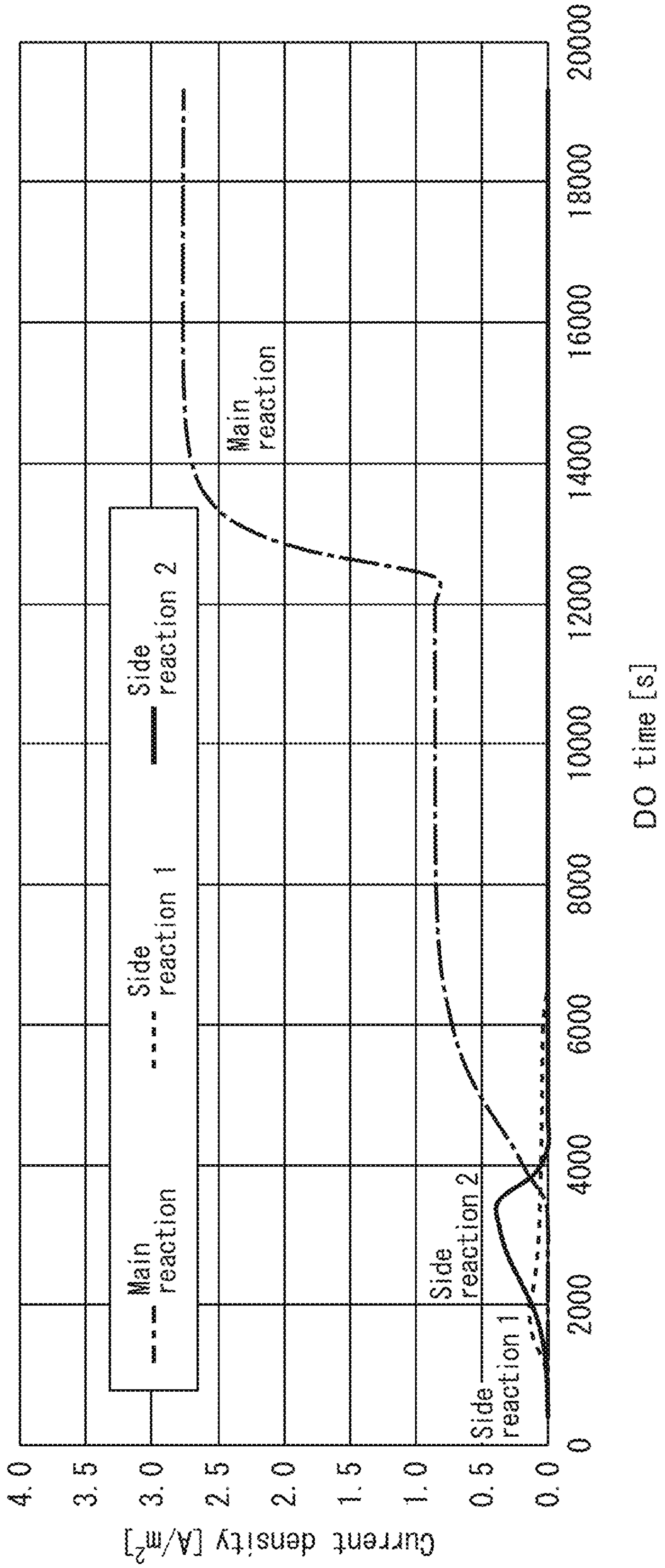
FIG. 19 is a graph showing the temporal change of the current density in each reaction during the doping step of the cell 6 produced in one Example.

FIG. 6 is a flow chart describing one example of the cell state determining step according to the present disclosure based on a relationship between current and time. Referring to FIG. 6, a preferred example of the current (density) calculation step (S3) and the state determining step (S4) will now be described for separate cases of using a measured positive electrode potential and an assumed positive electrode potential.

Case of Using Measured Positive Electrode Potential

In the current (density) calculation step (S3), when the positive electrode potential E (V) is measured at the time of modifying the system time by Δt from a specific measurement time point in the step (S2) (measured positive electrode potential) and the current $I_d$ originating from electrode reactions and the capacitor current $I_C$ of the cell are calculated, it is preferred to perform the step (SCIntegral I(t)dt) of calculating an integrated capacity value by time integration (Integral I(t)dt) of the current $I_d$ originating from electrode reactions or the capacitor current $I_C$ of the cell.

After the step (SCIntegral I(t)dt), it is preferred to perform the step (SDIntegral I(t)dt) of determining the cell state from the thus calculated integrated capacity value.

After the step (SDIntegral I(t)dt), a learning model that includes the integrated capacity value may be produced as required when, for example, the conditions conform to the learning model production conditions that have been set in advance in a doping apparatus or a control device communicating data therewith, or an online control system. When such a learning model is produced, the cell state may be determined by extracting sample information approximate to required characteristics, such as the coating film generation amount after the completion of the cell; the decomposition rate of lithium carbonate; the amount of lithium ions doped into the negative electrode; the initial cell capacity, the resistance, and the cell performance after a durability test (e.g., capacity retention rate, resistance increase rate, and gas generation amount); or the water content of the cell before doping, from the learning model, and verifying the thus extracted sample information with the integrated capacity value calculated based on the measured or assumed positive electrode potential.

The step (S4) may be performed before, during, or after the step (SDIntegral I(t)dt).

Case of Using Assumed Positive Electrode Potential

In the current (density) calculation step (S3), it is preferred to assume the positive electrode potential E (V) at the time of modifying the system time by Δt from a specific measurement time point in the step (S2) (assumed positive electrode potential), and to perform the step ($SCI_d$ or $SCI_c$) of calculating the current $I_d$ originating from electrode reactions or the capacitor current $I_c$ of the cell and the step (SCIntegral I(t)dt) of calculating an integrated capacity value by time integration (Integral I(t)dt) of the current $I_d$ originating from electrode reactions or the capacitor current $I_C$ of the cell.

After the step (SCIntegral I(t)dt) performed based on the assumed positive electrode potential, a learning model that includes the integrated capacity value calculated based on the measured or assumed positive electrode potential is produced. From the thus produced learning model, sample information approximate to required characteristics, such as the coating film generation amount after the completion of the cell; the decomposition rate of lithium carbonate; the amount of lithium ions doped into the negative electrode; the initial cell capacity, the resistance, and the cell performance after a durability test (e.g., capacity retention rate, resistance increase rate, and gas generation amount); or the water content of the cell before doping is extracted, and the cell state is determined by verifying the thus extracted sample information with the integrated capacity value calculated based on the measured or assumed positive electrode potential.

The step (S4) may be performed during the determination of the cell state using the learning model, or before and after the determination of the cell state using the learning model.

FIG. 7 is a flow chart describing one example of the step of calculating the current density of each electrode reaction according to the present disclosure. Referring to FIG. 7, a preferred example of the step ($SCI_d$) of assuming the positive electrode potential E (V) at the time of modifying the system time by Δt from a specific measurement time point in the step (S2) (assumed positive electrode potential) and calculating the current density $I_d$ originating from electrode reactions will now be described. As illustrated in FIG. 7, the step ($SCI_d$) preferably includes the steps (SS3) to (SS5).

In the step ($SCI_d$), it is preferred to perform the current density calculation step (SS3) of assuming the positive electrode potential E (V) when the system time is modified by Δt at the above-described measurement time point and, based on this assumption, calculating the capacitor current density $i_C$ (A/m$^2$) of the cell and the current densities $i_{R1}$ (A/m$^2$) to $i_{RN}$ (A/m$^2$) of the respective assumed N kinds of electrode reactions. Hereinafter, the positive electrode potential assumed in the step ($SCI_d$) or the current density calculation step (SS3) is referred to as "assumed positive electrode potential". The current density calculation step can be performed using an information processing apparatus (computer) connected to external devices such as a cell condition adjustment device and a measurement device. The information processing apparatus includes: a memory device which stores, for example, programs for executing current density calculation and the like, parameters, measurement data, and calculation results; an arithmetic device which performs current density calculation and the like; and a control device which can control the operations of external devices such as a charge-discharge device. The programs allow the information processing apparatus to execute information processing in the doping step and the cell state determination method of the present disclosure, such as current density calculation, positive electrode potential correction, and current separation.

The positive electrode potential can be assumed by assuming the change in the measured positive electrode potential with a change in the system time by Δt, based on the measured positive electrode potential, the input voltage, the measured bulk current density, and the like at a certain time point.

One example of the calculation of the capacitor current density $i_C$ will now be described. The "capacitor current"

refers to the electric current that flows at the time of the formation of an electric double layer as a capacitor on the positive electrode precursor of the cell. Denoting an accumulated charge, a capacitor capacity, and a positive electrode potential as Q (C), C (F/m$^2$ and E (V), respectively, since Q=CE, time differentiation of both sides thereof establishes the following relationship:

[Math. 34]

$$\frac{dQ}{dt} = C\frac{dE}{dt} \quad (1)$$

i.e.

[Math. 35]

$$I_C = C\frac{dE}{dt} \quad (2)$$

In the equation (1), $I_C$ represents the capacitor current (A), C represents the capacitor capacity (F/m$^2$) of the cell, E represents the assumed positive electrode potential E (V), and t represents time (s). The capacitor capacity C (F/m$^2$) can be set in accordance with the type and the amount of the activated carbon-containing positive electrode active material used in the positive electrode precursor. Accordingly, the capacitor current density $i_C$ can be calculated by dividing the capacitor current $I_C$ (A), which is determined by the equation (2), by the positive electrode precursor area (area of positive electrode active material layer) (m$^2$).

The three standards that are employed in the concept of separating the capacitor current determined in the above-described manner into assumed electrode reactions, and the Butler-Volmer equation used in the process are as described above.

Determination Criteria Based on Integrated Capacity Value

The cell state can be determined from a comparison between an integrated capacity value calculated based on the measured or assumed positive electrode potential and a reference value set in advance, or whether or not the calculated value of ($dI_d$/dt) is in a numerical range set in advance, or based on a learning model produced through the cell state determination method of the present disclosure. One example of preferred determination criteria will now be described.

When the current $I_d$ originating from electrode reactions is separated into currents of the following reactions in the current density calculation step (SS3), the positive electrode potential correction step (SS4), and the current separation step (SS5):

- main reaction: decomposition reaction of lithium carbonate;
- side reaction 1: water splitting reaction; and
- side reaction 2: decomposition reaction of electrolyte solution solvent, and the current $I_d$ originating from electrode reactions is composed of currents of electrode reactions including the main reaction and the side reactions 1 and 2 as main components, the integrated capacity value of a specific current that serves as a criterion of determination in the current (density) calculation step (S3) and the state determining step (S4) is preferably one of the following:
- the integrated capacity value of the current of the main reaction is 5 Ah/m$^2$ to 10 Ah/m$^2$.
- the integrated capacity value of the current of the side reaction 1 is 0.01 Ah/m$^2$ to 0.30 Ah/m$^2$, or 0.01 Ah/m$^2$ to 0.3 Ah/m$^2$; and
- the integrated capacity value of the current of the side reaction 2 is 0.05 Ah/m$^2$ to 0.50 Ah/m$^2$, or 0.05 Ah/m$^2$ to 0.5 Ah/m$^2$.

The above-described specific current may be at least one selected from the capacitor current $I_c$ of the cell and the current $I_d$ originating from the electrode reactions and, particularly, it is preferably the current $I_d$ originating from the electrode reactions.

<Doping Condition Modification Step>

The doping method of the present disclosure may further include the doping condition modification step (S6) as desired. The doping condition modification step (S6) is the step of modifying the doping conditions set in the doping condition setting step such that a difference between the behavior of the corrected positive electrode potential E (V) obtained in the current separation step and the behavior of the measured positive electrode potential E (V) is small. The thus modified doping conditions can be utilized in the subsequent doping of a nonaqueous lithium power storage element. This enables to more accurately estimate the status of the progress of the main reaction and side reactions. The doping condition modification step can be performed by feeding back the results of calculation performed by the information processing apparatus to the condition adjustment devices such as a cell charge-discharge device, a temperature regulator, and a pressure regulator. The doping conditions do not have to be modified as long as the difference between the behavior of the corrected positive electrode potential E (V) obtained in the current separation step and the behavior of the measured positive electrode potential E (V) is within a threshold value.

As described above, examples of the doping conditions include cell temperature (° C.), input voltage (V), bulk current (A), bulk current density (A/m$^2$), and cell pressure (kgf/cm$^2$). Preferred ranges in which these doping conditions can be modified are the same as the preferred ranges relating to the corresponding conditions in the doping condition setting step. In other words, the cell temperature is modified within a range of preferably 25° C. or higher, 30° C. or higher, or 35° C. or higher, but preferably 70° C. or lower, 65° C. or lower, 60° C. or lower, or 55° C. or lower. The input voltage is modified within a range of preferably 4.0 V or more, 4.2 V or more, or 4.4 V or more, but preferably 5.0 V or less, 4.8 V or less, or 4.6 V or less. The bulk current is modified within a range of preferably 1 C or more, 5 C or more, or 10 C or more, but 100 C or less, 50 C or less, 40 C or less, or 30 C or less. The bulk current density is modified within a range of preferably 2.5 A/m$^2$ or higher, 3.0 A/m$^2$ or higher, or 3.5 A/m$^2$ or higher, but 5.0 A/m$^2$ or lower, 4.5 A/m$^2$ or lower, or 4.0 A/m$^2$ or lower. Further, the cell pressure is modified within a range of preferably 0.1 kgf/cm$^2$ or higher, 0.5 kgf/cm$^2$ or higher, or 1 kgf/cm$^2$ or higher, but 1,000 kgf/cm$^2$ or lower, 100 kgf/cm$^2$ or lower, or 10 kgf/cm$^2$ or lower.

The "behavior" of positive electrode potential refers to temporal change of the positive electrode potential, and examples thereof include time differentiation of a time-positive electrode potential model function (dE/dt) and positive electrode potential differentiation of an integrated current value Q (Ah) of the bulk current density applied to the cell (dQ/dE). As a more specific method of modifying the doping conditions, for example, when the behavior of the corrected positive electrode potential deviates from the behavior of the measured positive electrode potential in the positive direction, their difference tends to be reduced by raising the cell temperature, increasing the cell-restraining pressure, or reducing the bulk current density. When the behavior of the corrected positive electrode potential deviates from the behavior of the measured positive electrode potential in the negative direction, their difference tends to be reduced by lowering the cell temperature, reducing the cell-restraining pressure, or increasing the bulk current density. However, in the case of increasing or reducing the bulk current density, it is preferred to compare the positive electrode potential differentiation of the integrated current value (dQ/dE).

<Termination of Doping Step>

Once current separation is completed over a period in which the method of the present disclosure is applied (target period), the current separation by the doping method of the present disclosure can be terminated. The current separation by the doping method of the present disclosure may be performed, for example, over the entire period from the start of doping to the completion of doping, over the entire period from the start of doping to the constant-current charging, or over a portion of the period from the start of doping to the constant-current charging. It is noted here that the doping of nonaqueous lithium power storage element may be continued further even after the end of the target period.

<Processing after Doping Step>

After the completion of the doping step, as required, the charge-discharge cycle step, the high-temperature aging step, the degassing and sealing step, and the like are performed, whereby a nonaqueous lithium power storage element can be produced.

<Charge-Discharge Cycle Step>

It is preferred to perform the cycle step of repeating charging and discharging (hereinafter, also referred to as "charge-discharge cycle step") on the electrode laminate or wound electrode body. The effects of this cycle step include: (1) an effect that, since the repeated charging and discharging cause the cations, the anions, and the solvent coordinated with the anions in the nonaqueous electrolyte solution to flow in and out of the fine pores of activated carbon, particularly the unstable functional groups on the surface of activated carbon that is a positive electrode active material are stabilized, and the cycle durability is thereby improved; (2) an effect that the alkali metal compound which has not been completely decomposed in the doping step is completely decomposed by exposing the positive electrode to a high potential, and the high-temperature durability is thereby improved; (3) an effect that the high-temperature durability is improved through consumption of a by-product of the oxidative decomposition reaction of the alkali metal compound generated in the doping step. When the cycle step is performed with an unnecessarily high load, the resistance of the nonaqueous alkali metal power storage element is increased; therefore, the charge-discharge cycle step needs to be performed under appropriate conditions (e.g., temperature, voltage, number of charging-discharging operations).

One example of a method of the charge-discharge cycle step is a method of repeatedly performing charging and discharging within a target voltage range of the nonaqueous alkali metal power storage element precursor by a charging method typified by constant-current charging, constant-current constant-voltage charging, pulse charging or the like, and a discharging method typified by constant-current discharging, constant-current constant-voltage discharging, or pulse discharging.

The current rate in the constant-current charging/discharging or pulse charging/discharging is preferably 0.2 C to 50 C based on the below-described capacity at 4.2 V. When the current rate is 0.2 C or more, the time required for charging and discharging can be shortened, so that the equipment load can be reduced, and the production efficiency is improved. When the current rate is 50 C or less, since the current distribution is uniform, the above-described effects of the cycle step are prominently exerted.

The retention time of a constant voltage in the constant-current constant-voltage charging/discharging is preferably 0.5 minutes to 120 minutes. When the retention time is 0.5 minutes or longer, the above-described effects of the cycle step are prominently exerted. When the retention time is 120 minutes or shorter, the time required for charging and discharging can be shortened, so that the equipment load can be reduced, and the production efficiency is improved.

In the charge-discharge cycle step, charging and discharging are preferably performed within a range of the below-described upper limit voltage and lower limit voltage. The upper limit voltage is preferably 3.8 V to 4.8 V, more preferably 4.0 V to 4.7 V, particularly preferably 4.1 V to 4.6 V. When the upper limit voltage is 3.8 V or more, the alkali metal compound that has not been completely decomposed in the doping step is decomposed, so that the high-temperature durability can be improved. When the upper limit voltage is 4.8 V or less, the nonaqueous alkali metal power storage element can be maintained to have a low resistance. The lower limit voltage is preferably 1.5 V to 3.5 V, more preferably 1.6 V to 3.4 V, particularly preferably 1.7 V to 3.3 V, most preferably 1.75 V to 3.0 V. When the lower limit voltage is 1.5 V or more, elution of copper that is a current collector of the negative electrode can be inhibited, so that the nonaqueous alkali metal power storage element can be maintained to have a low resistance. When the lower limit voltage is 3.5 V or less, not only can the nonaqueous alkali metal power storage element be maintained to have a low resistance, but also the resistance increase rate after a high-temperature high-load cycle test can be reduced.

The temperature of the charge-discharge cycle step is preferably 30° C. to 100° C., more preferably 35° C. to 85° C., particularly preferably 35° C. to 75° C. When this temperature is 30° C. or higher, a durability-improving effect is obtained. When the temperature is 100° C. or lower, the nonaqueous alkali metal power storage element can be maintained to have a low resistance, and the equipment load required for raising the temperature can be reduced, so that the production efficiency is improved. By controlling the temperature of the charge-discharge cycle step, the nonaqueous alkali metal power storage element precursor can be temperature-controlled (e.g., heated). The temperature of the nonaqueous alkali metal power storage element precursor can be adjusted (raised) by, for example, a heating means. Specific examples of the heating means include a heat exchanger utilizing a heater, hot water, hot air, or the like.

In cases where the temperature of the nonaqueous alkali metal power storage element precursor is already in a desired temperature range (e.g., 30° C. to 100° C.) prior to the adjustment of the temperature of the charge-discharge cycle step, it can be deemed that the step of raising the temperature of the nonaqueous alkali metal power storage element precursor has already been performed.

The number of cycles in the charge-discharge cycle step is preferably 1 to 10, more preferably 2 to 8, taking a set of charging and discharging as one cycle. By performing the charge-discharge cycle at least once, an effect of reducing the resistance increase rate after a high-temperature high-load cycle test is obtained. When the number of cycles is 10 or less, the nonaqueous alkali metal power storage element can be maintained to have a low resistance. In addition, when the number of cycles is 10 or less, the required load of charge-discharge equipment can be reduced, which is preferred from the standpoint of production efficiency.

In the charge-discharge cycle step, it is preferred to apply a pressure from the outside of the outer package. This pressure is preferably 0.1 $kgf/cm^2$ to 1,000 $kgf/cm^2$, more preferably 0.5 $kgf/cm^2$ to 100 $kgf/cm^2$, still more preferably 1 $kgf/cm^2$ to 10 $kgf/cm^2$.

When the pressure is 0.1 $kgf/cm^2$ or higher, distortion of the positive electrode precursor and that of the negative electrode are corrected by the pressure, and the distance between the opposing positive electrode precursor and negative electrode is thereby made uniform in a plane; therefore, the reactions in the charge-discharge cycle step proceed uniformly, so that the high-temperature high-load cycle durability is improved, which is preferred. When the pressure is 1,000 $kgf/cm^2$ or lower, a space for the nonaqueous electrolyte solution to permeate into the electrode laminate or wound electrode body is secured, so that the high-temperature high-load cycle durability is improved, which is also preferred.

As means for applying a pressure to the nonaqueous alkali metal power storage element precursor, a pressure measurement method, and the like, the same ones as those described above in <Pressurization Step> can be employed.

Effects of Charge-Discharge Cycle Step

1. Micro Short Circuit Ratio Reducing Effect

Conventionally, alkali metal power storage element precursors which contain a positive electrode precursor containing an alkali metal compound other than a positive electrode active material have been recognized to have a problem in that alkali metal power storage elements obtained therefrom have a high micro short circuit ratio and a low product yield. In this respect, the present inventors discovered that a micro short circuit ratio reducing effect is exerted by introducing the charge-discharge cycle step to the production process.

In other words, although the reason for this is not clear, it is believed that when the positive electrode precursor contains an alkali metal compound other than a positive electrode active material, in-plane irregularities of oxidative decomposition reaction are likely to occur in a plane of the positive electrode precursor due to oxidative decomposition of the alkali metal compound in the doping step, and this leads to heterogeneous doping reaction of alkali metal ions in a negative electrode plane and consequently, irregularities of the negative electrode potential occur in the negative electrode plane and the potential is excessively reduced in some parts of the negative electrode plane, as a result of which the alkali metal (e.g., lithium) is precipitated, causing a micro short circuit between the positive electrode and the negative electrode. In the present embodiment, however, it is believed that, by introducing the charge-discharge cycle step, such irregularities of the potential in the negative electrode are eliminated and the precipitation of the alkali metal on the negative electrode is inhibited, whereby the micro short circuit ratio is reduced.

On the other hand, with regard to an alkali metal power storage element precursor which contains a positive electrode precursor not containing any alkali metal compound other than a positive electrode active material, the factor causing a micro short circuit in an alkali metal power storage element obtained therefrom is different from the factor causing a micro short circuit in the above-described case of using a positive electrode precursor containing an alkali metal compound, and the factor is believed to be attributable to, for example, short-circuiting between the positive electrode and the negative electrode caused by collapse of the active material of the positive electrode or the negative electrode. Therefore, even if the charge-discharge cycle step is introduced, a micro short circuit ratio improving effect is not exerted.

2. Effect of Inhibiting Gas Generation During High-Temperature High-Voltage Float Conventionally, alkali metal power storage element precursors which contain a positive electrode precursor containing an alkali metal compound other than a positive electrode active material have been recognized to have a problem in that alkali metal power storage elements obtained therefrom generate a gas during high-temperature high-voltage float. In this respect, the present inventors discovered that an effect of inhibiting gas generation during high-temperature high-voltage float is exerted by introducing the charge-discharge cycle step to the production process.

In other words, although the reason for this is not clear, it is believed that when the positive electrode precursor contains an alkali metal compound other than a positive electrode active material, a by-product of the decomposition reaction of the alkali metal compound is generated in the doping step, and this by-product has an adverse effect particularly in a high-temperature high-voltage float test, causing gas generation. In the present embodiment, however, it is believed that, by introducing the charge-discharge cycle step, the remaining by-product is consumed in association with the ion adsorption-desorption reaction on the positive electrode and/or the insertion-desorption reaction of the alkali metal (e.g., lithium) on the negative electrode during charge-discharge cycles, whereby the gas generation by a completed nonaqueous alkali metal power storage element in a high-temperature high-voltage float test is inhibited.

On the other hand, with regard to an alkali metal power storage element precursor which contains a positive electrode precursor not containing any alkali metal compound other than a positive electrode active material, the factor causing an alkali metal power storage element obtained therefrom to generate a gas in a high-temperature high-voltage float test is different from the factor causing such gas generation in the above-described case of using a positive electrode precursor containing an alkali metal compound, and the factor is believed to be attributable to, for example, an oxidation reaction of an electrolyte solution solvent on the positive electrode or a reduction reaction of an electrolyte solution solvent on the negative electrode. Therefore, even if the charge-discharge cycle step is introduced, an effect of inhibiting gas generation during high-temperature high-voltage float is not exerted. In other words, only because of the use of a positive electrode precursor containing an alkali metal compound other than a positive electrode active material, the above-described effects 1. and 2. of the charge-discharge cycle step can be exhibited by the present embodiment.

3. Conditions for Exhibition of Effects

The present embodiment including the charge-discharge cycle step exhibits the above-described effects 1. and 2. of the charge-discharge cycle step when, in the charge-discharge cycle step:

the temperature of the nonaqueous alkali metal power storage element precursor is raised to 30° C. to 100° C., charging and discharging are performed within a range of an upper limit voltage and a lower limit voltage, the upper limit voltage is 3.8 V to 4.8 V, and the lower limit voltage is 1.5 V to 3.5 V.

<High-Temperature Aging Step>

The high-temperature aging step of heating the electrode laminate or wound electrode body (hereinafter, also referred to as "aging step") is performed. The effects of this high-temperature aging step include: (1) an effect of improving the durability through formation of an organic film or an inorganic film on the surface of the positive electrode or the negative electrode as a result of decomposition of the solvent or additive contained in the nonaqueous electrolyte solution; and (2) an effect of improving the cycle durability through chemical reactions and stabilization of the unstable functional groups on the surface of activated carbon that is a positive electrode active material, and impurities contained in the positive electrode, the negative electrode, the separator, and the electrolyte solution. The organic film or the inorganic film has an effect of improving the high-temperature durability; however, when the film is formed more than necessary, the resistance of the nonaqueous alkali metal power storage element is increased and, therefore, the high-temperature aging step needs to be performed under appropriate conditions (e.g., temperature, voltage, and time).

One example of a method of the high-temperature aging step is a method of adjusting the voltage of the nonaqueous alkali metal power storage element precursor to be a target voltage by a charging method typified by constant-current charging, constant-current constant-voltage charging, pulse charging or the like, or a discharging method typified by constant-current discharging, constant-current constant-voltage discharging, or pulse discharging, subsequently terminating the charging/discharging, and storing the nonaqueous alkali metal power storage element precursor in a high-temperature environment for a certain period.

The High-Temperature Aging Step Includes:

(1) High-voltage storage step: the step of adjusting the nonaqueous alkali metal power storage element precursor to have a high voltage, and subsequently storing this nonaqueous alkali metal power storage element precursor at 45° C. to 100° C.

The voltage is preferably 4.03 V to 5.0 V, more preferably 4.05 V to 4.8 V, particularly preferably 4.1 V to 4.5 V. When the voltage is 4.03 V or more, the resistance increase rate after a high-temperature high-load cycle test can be reduced. When the voltage is 5.0 V or less, a film can be prevented from being formed more than necessary, so that the nonaqueous alkali metal power storage element can be maintained to have a low resistance.

The high-temperature aging step may further include (2) the low-voltage storage step in addition to (1) the high-voltage storage step:

(2) Low-voltage storage step: the step of adjusting the nonaqueous alkali metal power storage element precursor to have a low voltage, and subsequently storing this nonaqueous alkali metal power storage element precursor at 45° C. to 100° C.

The voltage is preferably 1.5 V to 2.8 V, more preferably 1.6 V to 2.7 V, particularly preferably 1.7 V to 2.5 V. When the voltage is 2.8 V or less, the capacity retention rate after a high-temperature high-load cycle test can be improved. When the voltage is 1.5 V or more, elution of copper that is a current collector of the negative electrode can be inhibited, so that a low resistance can be maintained.

The order of the high-voltage storage step and the low-voltage storage step is not particularly limited.

In the high-voltage storage step and the low-voltage storage step, the temperature of the nonaqueous alkali metal power storage element precursor is 45° C. to 100° C., preferably 50° C. to 85° C., more preferably 55° C. to 75° C. When the temperature is 45° C. or higher, an effect of reducing the resistance increase rate after a high-temperature high-load cycle test or an effect of improving the capacity retention rate after a high-temperature high-load cycle test is obtained. When the temperature is 100° C. or lower, the nonaqueous alkali metal power storage element can be maintained to have a low resistance, and the equipment load required for raising the temperature can be reduced, so that the production efficiency is improved. The temperature may be constant during the aging step, or may be varied in multiple steps to form a coating film in a stepwise manner or uniformly.

The temperature of the nonaqueous alkali metal power storage element precursor can be controlled by, for example, a heat exchanger utilizing a heater, hot water, hot air, or the like.

The duration of the aging step is preferably 0.25 hours to 340 hours, more preferably 0.5 hours to 100 hours, still more preferably 1 hour to 50 hours. When the duration is 0.25 hours or longer, an effect of reducing the resistance increase rate after a high-temperature high-load cycle test or an effect of improving the capacity retention rate after a high-temperature high-load cycle test is obtained. When the duration is 340 hours or shorter, the nonaqueous alkali metal power storage element can be maintained to have a low resistance, and the time and the number of facilities required for aging can be reduced, so that the production efficiency is improved.

In the high-voltage storage step and/or low-voltage storage step, after adjusting the voltage applied to the nonaqueous alkali metal power storage element precursor, the application of the voltage may be terminated, or the temperature of the nonaqueous alkali metal power storage element precursor may be controlled while continuing the application of the voltage.

In the high-temperature aging step, the nonaqueous alkali metal power storage element precursor is preferably pressurized from the outside in advance with a pressure of 0.1 $kgf/cm^2$ to 1,000 $kgf/cm^2$. The pressure can be applied from the outside of the outer package, in which the nonaqueous alkali metal power storage element precursor is housed, on both sides in the direction perpendicular to the surface of the electrode surface. When the pressure is 0.1 $kgf/cm^2$ or higher, distortion of the nonaqueous alkali metal power storage element precursor is corrected by the pressure; therefore, the reactions in the high-temperature aging step are likely to proceed uniformly and the durability is thereby improved, which is preferred. When the pressure is 1,000 $kgf/cm^2$ or lower, a space for the nonaqueous electrolyte solution to permeate into the electrode laminate or wound electrode body is secured, so that the permeation rate of the nonaqueous electrolyte solution into the electrode laminate or wound electrode body is improved, which is also preferred.

As means for applying a pressure to the nonaqueous alkali metal power storage element precursor, a pressure measurement method, and the like, the same ones as those described above in <Pressurization Step> can be employed.

In the aging step, a pressure is preferably applied from the outside of the outer package. This pressure is preferably 0.1 $kgf/cm^2$ to 1,000 $kgf/cm^2$, more preferably 0.5 $kgf/cm^2$ to 100 $kgf/cm^2$, still more preferably 1 $kgf/cm^2$ to 10 $kgf/cm^2$.

When the pressure is 0.1 $kgf/cm^2$ or higher, distortion of the positive electrode precursor and that of the negative electrode are corrected by the pressure, and the distance between the opposing positive electrode precursor and negative electrode is thereby made uniform in a plane; therefore, the reactions in the high-temperature aging step proceed uniformly, so that the high-temperature high-load cycle durability is improved, which is preferred. When the pressure is 1,000 $kgf/cm^2$ or lower, a space for the nonaqueous electrolyte solution to permeate into the electrode laminate or wound electrode body is secured, so that the high-temperature high-load cycle durability is improved, which is also preferred.

Effects of High-Temperature Aging Step

1. Micro Short Circuit Ratio Reducing Effect

Conventionally, alkali metal power storage element precursors which contain a positive electrode precursor containing an alkali metal compound other than a positive electrode active material have been recognized to have a problem in that alkali metal power storage elements obtained therefrom have a high micro short circuit ratio and a low product yield. In this respect, the present inventors discovered that a micro short circuit ratio reducing effect is exerted by introducing the high-temperature aging step to the production process.

In other words, although the reason for this is not clear, it is believed that when the positive electrode precursor contains an alkali metal compound other than a positive electrode active material, in-plane irregularities of oxidative decomposition reaction are likely to occur in a plane of the positive electrode precursor due to oxidative decomposition of the alkali metal compound in the doping step, and this leads to heterogeneous doping reaction of alkali metal ions in a negative electrode plane and consequently, irregularities of the negative electrode potential occur in the negative electrode plane and the potential is excessively reduced in some parts of the negative electrode plane, as a result of which the alkali metal (e.g., lithium) is precipitated, causing a micro short circuit between the positive electrode and the negative electrode. In the present embodiment, however, it is believed that, by introducing the high-temperature aging step, such in-plane irregularities of the potential in the negative electrode are eliminated and the precipitation of the alkali metal on the negative electrode is inhibited, whereby the micro short circuit ratio is reduced.

On the other hand, with regard to an alkali metal power storage element precursor which contains a positive electrode precursor not containing any alkali metal compound other than a positive electrode active material, the factor causing a micro short circuit in an alkali metal power storage element obtained therefrom is different from the factor causing a micro short circuit in the above-described case of using a positive electrode precursor containing an alkali metal compound, and the factor is believed to be attributable to, for example, short-circuiting between the positive electrode and the negative electrode caused by collapse of the active material of the positive electrode or the negative electrode. Therefore, even if the high-temperature aging step is introduced, a micro short circuit ratio improving effect is not exerted.

2. Effect of Inhibiting Gas Generation During High-Temperature High-Voltage Float Conventionally, alkali metal power storage element precursors which contain a positive electrode precursor containing an alkali metal compound other than a positive electrode active material have been recognized to have a problem in that alkali metal power storage elements obtained therefrom generate a gas during high-temperature high-voltage float. In this respect, the present inventors discovered that an effect of inhibiting gas generation during high-temperature high-voltage float is exerted by introducing the high-temperature aging step to the production process.

In other words, although the reason for this is not clear, it is believed that when the positive electrode precursor contains an alkali metal compound other than a positive electrode active material, a by-product of the decomposition reaction of the alkali metal compound is generated in the doping step, and this by-product has an adverse effect particularly in a high-temperature high-voltage float test, causing gas generation. In the present embodiment, however, it is believed that, by introducing the high-temperature aging step, the remaining by-product is decomposed and consumed on the positive electrode that is placed under a high-temperature high-potential condition, whereby the gas generation by a completed nonaqueous alkali metal power storage element in a high-temperature high-voltage float test is inhibited.

On the other hand, with regard to an alkali metal power storage element precursor which contains a positive electrode precursor not containing any alkali metal compound other than a positive electrode active material, the factor causing an alkali metal power storage element obtained therefrom to generate a gas in a high-temperature high-voltage float test is different from the factor causing such gas generation in the above-described case of using a positive electrode precursor containing an alkali metal compound, and the factor is believed to be attributable to, for example, an oxidation reaction of an electrolyte solution solvent on the positive electrode or a reduction reaction of an electrolyte solution solvent on the negative electrode. Therefore, even if the high-temperature aging step is introduced, an effect of inhibiting gas generation during high-temperature high-voltage float is not exerted. In other words, only because of the use of a positive electrode precursor containing an alkali metal compound other than a positive electrode active material, the above-described effects 1. and 2. of the high-temperature aging step can be exhibited by the present embodiment.

3. Conditions for Exhibition of Effects

The present embodiment including the high-temperature aging step exhibits the above-described effects 1. and 2. of the high-temperature aging step when the high-temperature aging step includes the high-voltage storage step: the step of adjusting the voltage of the nonaqueous alkali metal power storage element precursor to be 4.03 V to 5.0 V, and subsequently storing this nonaqueous alkali metal power storage element precursor at 45° C. to 100° C.

It is noted here that the above-described effects 1. and 2. of the high-temperature aging step are not exerted when a method of maintaining the nonaqueous alkali metal power storage element precursor at a high temperature and a high voltage, for example, a method of continuously charging the nonaqueous alkali metal power storage element precursor by constant-voltage charging, is employed rather than the high-voltage storage. Continuous constant-voltage charging is likely to facilitate the precipitation of alkali metal (e.g., lithium) and cause a micro short circuit; therefore, a micro short circuit inhibiting effect is not exerted. When such constant-voltage charging is continued at a high temperature, the residual alkali metal compound which has not been completely decomposed in the doping step undergoes an oxidative decomposition reaction to regenerate a by-product; therefore, the gas generation by a completed nonaqueous alkali metal power storage element in a high-temperature high-voltage float test is not inhibited.

<Order of Doping Step, Cycle Step, and Aging Step>

As for the order of performing the doping step, the cycle step, and the aging step, it is desired to perform the doping step first. The order and the number of times of performing the subsequent cycle step or aging step are not particularly limited. The doping step may be performed multiple times.

<Degassing Step and Sealing Step>

After the completion of the doping step, the cycle step, and the aging step, the degassing step may be performed to surely remove the gas remaining in the nonaqueous electrolyte solution, the positive electrode, and the negative electrode. The durability is improved by performing the degassing step. As a degassing method, for example, a method of placing the electrode laminate or wound electrode body in a decompression chamber with the outer package being in an open state, and bringing the inside of the chamber into a decompressed state using a vacuum pump may be employed. After the degassing step, the open part of the outer package is sealed.

<Inspection Step>

For the nonaqueous lithium power storage element obtained by the production method of the present disclosure, physical property evaluation and/or quality control may be performed by the above-described cell state determination method.

EXAMPLES

<Evaluation of Cell Performance>

Specific examples of cell performance evaluation are described below.

[Cell Capacity (mAh)]

The cell capacity can be measured in terms of the capacity (mAh) when a cell of interest is discharged from a cell voltage of 4 V to 2 V at a current rate of 1 C. More specifically, using a charge-discharge device (5 V, 360 A) manufactured by Fujitsu Telecom Networks Ltd. in an incubator set at 25° C., a power storage element obtained was constant-current charged up to 4.0 V at a current value of 20 C and then constant-voltage charged with application of a constant voltage of 4.0 V for a total of 30 minutes. Subsequently, the power storage element was constant-current discharged to 2.0 V at a current value of 1 C, and the capacity (mAh) was measured at this point.

[Cell Resistance (mΩ)]

The cell resistance can be measured in terms of the resistance value (mΩ) when a cell of interest is discharged from a cell voltage of 4 V at a current rate of 50 C. More specifically, using a charge-discharge device (5 V, 360 A) manufactured by Fujitsu Telecom Networks Ltd. in an incubator set at 25° C., a power storage element obtained was constant-current charged up to 4.0 V at a current value of 20 C and then constant-voltage charged with application of a constant voltage of 4.0 V for a total of 30 minutes. Subsequently, the power storage element was constant-current discharged to 2.0 V at a current value of 20 C to obtain a discharge curve (time-voltage). In this discharge curve, the voltage at a discharge time=0 second, which was extrapolated by linear approximation from the voltage values at discharge times of 1 second and 2 seconds, was defined as $E_o$, and the normal-temperature discharge internal resistance R (mΩ) was calculated using the following equations: Voltage drop ΔE=4.0−Eo, and R=ΔE/(20 C (current value A)).

[Self-Discharge Characteristics]

The self-discharge characteristics of a cell can be represented by the self-discharge coefficient measured when the cell is left to stand for 96 hours under a restraining pressure of 1 kgf/cm$^2$ in a 25° C. environment, starting from a cell voltage of 4 V. Defining the cell voltage as $V_1$, this self-discharge coefficient is represented by $(4-V_1)/\sqrt{96}$ [V/√h]. More specifically, a power storage element obtained was adjusted to have a voltage of 4.0 V by a method in which the power storage element was constant-current discharged to 2.5 V at a current value of 1 C and then constant-current charged up to a voltage of 4.0 V at a current value of 1 C, followed by constant-voltage charging at 4.0 V continued for 1 hour. Thereafter, in an incubator set at 45° C., the power storage element was left to stand for 96 hours with its electrode body being pressurized with a restraining pressure of 1.0 kgf/cm$^2$, and the cell voltage $V_1$ was measured to calculate the self-discharge coefficient in this process.

<Evaluation of Cell Durability Performance>

Specific examples of cell durability performance evaluation are described below.

[Cycle Test (Capacity Retention Rate and Resistance Increase Rate)]

In a cycle test, the capacity retention rate and the resistance increase rate are measured when a cell of interest is repeatedly charged and discharged at 25° C., whereby the slope (first half) 1/√CY of the capacity retention rate and that of the resistance increase rate in the period from the start to 10,000th cycle (CY) as well as the slope (second half) 1/√CY of the capacity retention rate and that of the resistance increase rate in the period from 10,000th CY to 200,000th CY can be determined and evaluated. More specifically, for a power storage element obtained, the charge-discharge step of performing constant-current charging up to 3.8 V at a current value of 100 C and then constant-current discharging to 2.2 V at a current value of 100 C was repeated 200,000 times in an incubator set at 25° C. using a charge-discharge device (5 V, 360 A) manufactured by Fujitsu Telecom Networks Ltd.

The capacity was measured by performing constant-current charging up to 3.8 V at a current value of 20 C and then constant-voltage charging with application of a constant voltage of 3.8 V for a total of 30 minutes, and subsequently performing constant-current discharging to 2.2 V at a current value of 2 C. This capacity measurement was performed at least prior to the start of the cycle test, after 10,000 cycles, and after 200,000 cycles. Defining the capacity measured at these time points as Qa, Qb, and Qc, respectively, the slope in the first half of the cycles was calculated by (Qa−Qb)/√10,000, and the slope in the second half of the cycles was calculated by (Qb−Qc)/(√200,000-√10,000).

The resistance was measured by performing constant-current charging up to 3.8 V at a current value of 20 C and then constant-voltage charging with application of a constant voltage of 3.8 V for a total of 30 minutes, and subsequently performing constant-current discharging to 2.2 V at a current value of 20 C, and a discharge curve (time-voltage) was obtained. In this discharge curve, the voltage at a discharge time=0 second, which was extrapolated by linear approximation from the voltage values at discharge times of 1 second and 2 seconds, was defined as Eo, and the resistance was calculated using the following equations: Voltage drop ΔE=3.8−Eo, and R=ΔE/(20 C (current value A)). This resistance measurement was performed at least prior to the start of the cycle test, after 10,000 cycles, and after 200,000 cycles. Defining the resistance measured at these time points as Ra, Rb, and Rc, respectively, the slope in the first half of the cycles was calculated by (Ra−Rb)/

$\sqrt{10,000}$, and the slope in the second half of the cycles was calculated by $(Rb-Rc)/(\sqrt{200,000}-\sqrt{10,000})$.

[Float Test (Capacity Retention Rate, Resistance Increase Rate, and Gas Generation Amount)]

In a float test, when a cell of interest is maintained under the conditions of 70° C. and 3.8 V for 500 hours, the slope of the capacity retention rate, the slope of the resistance increase rate, and the gas generation amount can be measured and evaluated. More specifically, using a charge-discharge device (5 V, 360 A) manufactured by Fujitsu Telecom Networks Ltd. in an incubator set at 70° C., a nonaqueous lithium power storage element obtained was constant-current charged up to 3.8 V at a current value of 20 C and then constant-voltage charged with application of a constant voltage of 3.8 V for a total of 500 hours. The cell volume prior to the start of the test, Va, and the cell volume after the start of the test, Vb, were measured in accordance with the Archimedes method, and the gas generation amount was calculated by Vb-Va.

The capacity was measured by performing constant-current charging up to 3.8 V at a current value of 20 C and then constant-voltage charging with application of a constant voltage of 3.8 V for a total of 30 minutes, and subsequently performing constant-current discharging to 2.2 V at a current value of 2 C. This capacity measurement was performed prior to the start of the float test and after the completion of the float test, and the capacity retention rate was calculated.

The resistance was measured by performing constant-current charging up to 3.8 V at a current value of 20 C and then constant-voltage charging with application of a constant voltage of 3.8 V for a total of 30 minutes, and subsequently performing constant-current discharging to 2.2 V at a current value of 20 C, and a discharge curve (time-voltage) was obtained. In this discharge curve, the voltage at a discharge time=0 second, which was extrapolated by linear approximation from the voltage values at discharge times of 1 second and 2 seconds, was defined as Eo, and the resistance was calculated using the following equations: Voltage drop $\Delta E=3.8-Eo$, and $R=\Delta E/(20\ C$ (current value A)). This resistance measurement was performed prior to the start of the float test and after the completion of the float test, and the resistance increase rate was calculated.

<Production of Cell (Element Precursor)>

A cell (element precursor) to be used as a subject of the doping step was produced as follows.

[Production of Negative Electrode 1]

Using a planetary mixer, 83.0% by mass of artificial graphite and 13.0% by mass of carbon black were dry-mixed in a powder state. In the resulting mixture, 2.0% by mass of carboxymethyl cellulose (CMC) as a dispersant, 2.0% by mass of a styrene-butadiene copolymer, and distilled water were dispersed to obtain a mixture having a solid mass ratio of 39.0% by mass. The thus obtained mixture was dry-blended in a powder state using a planetary mixer to prepare a negative electrode coating liquid. Using a die coater manufactured by Toray Engineering Co., Ltd., both sides of a 10 μm-thick electrolytic copper foil were coated with the thus prepared negative electrode coating liquid at a coating rate of 1 m/s, and this copper foil was dried at a drying temperature of 60° C. to obtain a negative electrode 1. The total thickness of this negative electrode 1 was measured at arbitrary 10 spots of the negative electrode 1 using a film thickness meter LINEAR GAUGE SENSOR GS-551 manufactured by Ono Sokki Co., Ltd.

From the thus obtained measurement results, the thickness of the negative electrode 1 was determined to be 77 μm.

[Production of Negative Electrode 2]

Using a planetary mixer, 83.0% by mass of artificial graphite and 13.0% by mass of carbon black were dry-mixed in a powder state. In the resulting mixture, 2.0% by mass of carboxymethyl cellulose (CMC) as a dispersant, 2.0% by mass of a styrene-butadiene copolymer, and distilled water were dispersed to obtain a mixture having a solid mass ratio of 39.0% by mass. The thus obtained mixture was dry-blended in a powder state using a planetary mixer to prepare a negative electrode coating liquid. Using a die coater manufactured by Toray Engineering Co., Ltd., both sides of a 10 μm-thick electrolytic copper foil were coated with the thus prepared negative electrode coating liquid at a coating rate of 1 m/s, and this copper foil was dried at a drying temperature of 60° C. to obtain a negative electrode 2. The total thickness of this negative electrode 2 was measured at arbitrary 10 spots of the negative electrode 2 using a film thickness meter LINEAR GAUGE SENSOR GS-551 manufactured by Ono Sokki Co., Ltd. From the thus obtained measurement results, the thickness of the negative electrode 2 was determined to be 80 μm.

[Production of Positive Electrode Precursor]

A mixture having a solid mass ratio of 34.1% by mass was obtained by mixing 53.8% by mass of activated carbon, 1.4% by mass of carboxymethyl cellulose (CMC), 34.1% by mass of lithium carbonate, 4.0% by mass of carbon black, 3.8% by mass of acrylic latex (LTX), 2.9% by mass of polyvinylpyrrolidone (PVP), and distilled water. The thus obtained mixture was dispersed for 2 minutes using a thin-film spin system high-speed mixer "FILMIX (registered trademark)" manufactured by PRIMIX Corporation at a circumferential velocity of 10 m/s to obtain a positive electrode coating liquid. Using a double-sided die coater manufactured by Toray Engineering Co., Ltd., both sides of a 15 km-thick aluminum foil were coated with the thus obtained positive electrode coating liquid at a coating rate of 1 m/s, and this aluminum foil was dried to obtain a positive electrode precursor. The thus obtained positive electrode precursor was pressed using a roll press machine at a pressure of 6 kN/cm and a pressing-part surface temperature of 25° C. The total thickness of this positive electrode precursor was measured at arbitrary 10 spots of the positive electrode precursor using a film thickness meter LINEAR GAUGE SENSOR GS-551 manufactured by Ono Sokki Co., Ltd. From the thus obtained measurement results, the thickness of the positive electrode precursor was determined to be 158 km.

[Preparation of Electrolyte Solution]

Using a mixed solvent of ethylene carbonate (EC) and ethyl methyl carbonate (EMC) (EC:EMC=33:67 (volume ratio)) as an organic solvent, electrolyte salts were dissolved therein such that $LiPF_6$ and LiFSI had a concentration ratio of 1:1 and a total concentration of 1.2 mol/L, whereby a nonaqueous electrolyte solution 1-1 was obtained.

[Assembly Step]

Assembly of Cells 1 and 2:

From the above-obtained positive electrode precursor (double-sided), 25 pieces were cut out such that each piece had a positive electrode active material layer of 10.0 cm×10.0 cm (100 $cm^2$) in size. Subsequently, 26 pieces were cut out from the above-obtained negative electrode 1 such that each piece had a negative electrode active material layer of 10.1 cm×10.1 cm (102 $cm^2$) in size. Further, 50 pieces of 10.3 cm×10.3 cm (106 $cm^2$) polyethylene separator (manufactured by Asahi Kasei Corporation, thickness: 20 μm) were prepared. These pieces were disposed in layers in the order of the positive electrode precursor, the separator, and the negative electrode 1 such that the negative electrode 1 is the outermost layer, and the positive electrode active material layer and the negative electrode active material layer face each other via the separator, whereby an electrode laminate was obtained. A positive electrode terminal and a negative electrode terminal were ultrasonically welded to the thus obtained electrode laminate, and this electrode laminate was put into a container formed of an aluminum laminated packaging material, after which the container was heat-sealed on three sides including the electrode terminals.

Assembly of Cell 3:

A cell 3 was assembled in the same manner as the cells 1 and 2, except that the negative electrode 2 was used in place of the negative electrode 1.

[Solution Injection, Impregnation, and Sealing Steps]

Under the atmospheric pressure in a dry-air environment having a temperature of 25° C. and a dew point of −40° C. or lower, about 85.0 g of the above-prepared nonaqueous electrolyte solution was injected into the outer package housing the electrode laminate. After the injection of the nonaqueous electrolyte solution, the electrode laminate was placed in a vacuum chamber, and an operation of reducing the pressure from the atmospheric pressure and then restoring the atmospheric pressure was repeated to impregnate the electrode laminate with the nonaqueous electrolyte solution. Thereafter, the electrode laminate was placed in a vacuum sealing machine and sealed under reduced pressure, whereby the outer package was sealed to obtain a cell (element precursor).

<Additional Description of Examples>

[Doping Conditions]

Doping Conditions of Cells 1 and 3:

In a 45° C. environment, the cells were each constant-current charged at 0.4 A until the cell voltage reached 4.2 V, and the current value was subsequently changed to 1.4 A to further perform constant-current charging up to 4.5 V. Once the cell voltage reached 4.5 V, the constant-current charging was switched to constant-voltage charging, and doping was continued for 2.5 hours.

Doping Conditions of Cell 2:

In a 45° C. environment, the cell was constant-current charged at 0.8 A until the cell voltage reached 4.2 V, and the current value was subsequently changed to 1.4 A to further perform constant-current charging up to 4.5 V. Once the cell voltage reached 4.5 V, the constant-current charging was switched to constant-voltage charging, and doping was continued for 2.5 hours.

[Cycle Aging Conditions]

Cycle Aging Conditions of Cells 1 to 3:

(1) In a 45° C. environment, each cell was constant-current charged at 10.0 A until the voltage reached 4.3 V, and subsequently constant-voltage charged at 4.3 V for 5 minutes.

(2) In a 45° C. environment, each cell was constant-current discharged at 10.0 A until the voltage was reduced to 2.0 V, and subsequently constant-voltage discharged at 2.0 V for 5 minutes.

Taking the above (1) and (2) as a single cycle, a total of five cycles were performed.

[High-Temperature Aging Conditions]

High-Temperature Aging Conditions of Cells 1 to 3:

After the cycle aging step, in a 25° C., the cells were each constant-current charged at 10.0 A until the voltage reached 4.2 V, and then constant-voltage charged at 4.2 V for 30 minutes to adjust the voltage to be 4.2 V. Thereafter, the cells were stored in a 70° C. incubator for 10 hours.

A cell 4 was produced under the same electrode production conditions, cell design, doping conditions, and aging conditions as the cell 1. A cell 5 was produced under the same electrode production conditions, cell design, doping conditions, and aging conditions as the cell 2. A cell 6 was produced under the same electrode production conditions, cell design, doping conditions, and aging conditions as the cell 3.

[Construction of Learned Model and Data Analysis]

For the above-obtained cells including the cells 1, 2, and 3, a machine learning model was allowed to learn the correlations between the performance of each cell (cell capacity, cell resistance, and self-discharge coefficient) and the parameters affected by the electrode production conditions, the cell design, the doping conditions, the aging conditions, and the capacitor current $I_C$ (A), whereby a learned model was constructed. From these data, the data of the cells 1, 2, and 3 were extracted and carefully examined. The results shown in Table 1 were obtained by analyzing the data obtained from the capacitor current $I_C$ (A), which was calculated from the positive electrode potential E (V) actually measured in the doping, and calculating the following in a positive electrode potential range of 3.3 V to 3.8 V: the current capacity Q (mAh) of the capacitor current $I_C$ (A); the positive electrode potential differentiation (dQ/dE) of the current capacity Q (mAh) of the capacitor current $I_C$ (A); the time differentiation (dE/dt) of time-positive electrode potential; and the time differentiation (dE/dt_i) of time normalized with bulk current-positive electrode potential.

TABLE 1

| | Parameters | | | |
|---|---|---|---|---|
| | Q (mAh) 3.3 V to 3.8 V | dQ/dE 3.3 V to 3.8 V | dE/dt 3.3 V to 3.8 V | dE/dt_i 3.3 V to 3.8 V |
| Cell 1 | 378.8 | 761.5 | 0.000351748 | 0.000337402 |
| Cell 2 | 372.9 | 758.3 | 0.000548651 | 0.000330777 |
| Cell 3 | 376.1 | 759.7 | 0.000386328 | 0.000330039 |

The results of measuring the self-discharge coefficient (V/√h), the cell capacity (mAh), and the cell resistance (discharge resistance) (mΩ) for the completed cells are shown in Table 2.

TABLE 2

| | Cell evaluation results | | |
|---|---|---|---|
| | Self-discharge coefficient (V/√h) | Capacity (mAh) | Discharge resistance (mΩ) |
| Cell 1 | 0.0172 | 939.9 | 0.848 |
| Cell 2 | 0.0285 | 941.7 | 0.907 |
| Cell 3 | 0.0216 | 955.7 | 0.884 |

According to the results shown in Tables 1 and 2, it was found that the self-discharge coefficient (V/h), the cell capacity (mAh), and the cell resistance (discharge resistance) (mΩ) varied linearly with variation in the parameters. From these results, it is seen that the parameters affected by the capacitor current $I_C$ (A) are useful as factors that predict these cell performance.

[Construction of Learned Model and Data Analysis]

Cycle Test:

For the above-obtained cells including the cells 1, 2, and 3, a machine learning model was allowed to learn the correlations between the above-obtained cycle test results of each cell (capacity retention rate and resistance increase rate) and the parameters affected by the electrode production conditions, the cell design, the doping conditions, the aging conditions, and the electrode reaction current $I_d$ (A), whereby a learned model was constructed. From these data, the data of the cells 1, 2, and 3 were extracted and carefully examined. The results shown in Table 3 were obtained by analyzing the data obtained from the electrode reaction current $I_d$ (A) calculated from the assumed positive electrode potential E (V) in the doping, and calculating the following in a positive electrode potential range of higher than 3.8 V: the current capacity Q (mAh) of the electrode reaction current $I_d$ (A); the positive electrode potential differentiation (dQ/dE) of the current capacity Q (mAh) of the electrode reaction current $I_d$ (A); the time differentiation (dE/dt) of time-positive electrode potential; and the time differentiation (dE/dt_i) of time normalized with bulk current-positive electrode potential. Further, the results shown in Table 4 were obtained by calculating the parameters obtained by fitting of the positive electrode potential by the current separation step.

TABLE 3

| Parameters relating to electrode reaction current Id (A) | | | | |
|---|---|---|---|---|
| | Q (mAh) higher than 3.8 V | dQ/dE higher than 3.8 V | dE/dt higher than 3.8 V | dE/dt_i higher than 3.8 V |
| Cell 1 | 6.865241677 | 4.686232195 | 0.000375157 | 0.000284978 |
| Cell 2 | 7.422367443 | 8.450811904 | 0.000653301 | 0.0003153 |
| Cell 3 | 7.199564216 | 5.385115593 | 0.000389225 | 0.000288453 |

TABLE 5-continued

| Cycle test results | | | | |
|---|---|---|---|---|
| | Capacity retention rate: first-half slope | Capacity retention rate: second-half slope | Resistance increase rate: first-half slope | Resistance increase rate: second-half slope |
| Cell 3 | −3.292937236 | −1.324519183 | 0.0405706 | −0.007734832 |

Float Test:

For the above-obtained cells including the cells 4, 5, and 6, a machine learning model was allowed to learn the correlations between the above-obtained float test results of each cell (capacity retention rate (times), resistance increase rate (times), and gas generation amount (cc)) and the parameters affected by the electrode production conditions, the cell design, the doping conditions, the aging conditions, and the electrode reaction current $I_d$ (A), whereby a learned model was constructed. From these data, the data of the cells 4, 5, and 6 were extracted and carefully examined. The results shown in Table 6 were obtained by analyzing the data obtained from the electrode reaction current $I_d$ (A) calculated from the assumed positive electrode potential E (V) in the doping, and calculating the following in a positive electrode potential range of higher than 3.8 V: the current capacity Q (mAh) of the electrode reaction current $I_d$ (A); the positive electrode potential differentiation (dQ/dE) of the current capacity Q (mAh) of the electrode reaction current $I_d$ (A); the time differentiation (dE/dt) of time-positive electrode potential; and the time differentiation (dE/dt_i) of time normalized with bulk current-positive electrode potential. Further, the results shown in Table 7 were obtained by calculating the parameters obtained by fitting of the positive electrode potential by the current separation step.

TABLE 4

| Parameters obtained by fitting of positive electrode potential using current separation simulator | | | | | | | | | | | | |
|---|---|---|---|---|---|---|---|---|---|---|---|---|
| | Initial potential (V) | | | Bulk concentration (mol/m$^3$) | | | Diffusion coefficient (m$^2$/s) | | | Reaction amount (Ah/m$^2$) | | |
| | Main reaction | Side reaction 1 | Side reaction 2 | Main reaction | Side reaction 1 | Side reaction 2 | Main reaction | Side reaction 1 | Side reaction 2 | Main reaction | Side reaction 1 | Side reaction 2 |
| Cell 1 | 4.16 | 3.6 | 3.5 | 1,000 | 70 | 400 | 3.20E−15 | 4.48E−13 | 1.57E−13 | 6.611 | 0.097 | 0.158 |
| Cell 2 | 4.05 | 3.35 | 3.32 | 1,000 | 120 | 420 | 3.20E−15 | 1.79E−13 | 1.69E−13 | 7.169 | 0.104 | 0.149 |
| Cell 3 | 4.2 | 3.6 | 3.5 | 1,000 | 70 | 150 | 2.88E−15 | 4.48E−13 | 1.59E−12 | 6.939 | 0.097 | 0.164 |

Table 5 below shows the results of measuring the first-half slope and the second-half slope of the capacity retention rate as well as the first-half slope and the second-half slope of the resistance increase rate in the cycle test of the respective completed cells.

TABLE 5

| Cycle test results | | | | |
|---|---|---|---|---|
| | Capacity retention rate: first-half slope | Capacity retention rate: second-half slope | Resistance increase rate: first-half slope | Resistance increase rate: second-half slope |
| Cell 1 | −2.780817881 | −0.987051831 | 0.013081255 | 0.002507274 |
| Cell 2 | −2.395645874 | −1.70994387 | −0.019810467 | 0.011037948 |

TABLE 6

| Parameters relating to electrode reaction current Id (A) | | | | |
|---|---|---|---|---|
| | Q (mAh) higher than 3.8 V | dQ/dE higher than 3.8 V | dE/dt higher than 3.8 V | dE/dt_i higher than 3.8 V |
| Cell 4 | 7.128186425 | 5.540026602 | 0.00038956 | 0.000288434 |
| Cell 5 | 7.337906269 | 8.481016234 | 0.000635812 | 0.00031299 |
| Cell 6 | 6.661706413 | 5.309485101 | 0.000341873 | 0.000260672 |

TABLE 7

| Parameters obtained by fitting of positive electrode potential using current separation simulator | | | | | | | | | | | | |
|---|---|---|---|---|---|---|---|---|---|---|---|---|
| | Initial potential (V) | | | Bulk concentration (mol/m$^3$) | | | Diffusion coefficient (m$^2$/s) | | | Reaction amount (Ah/m$^2$) | | |
| | Main reaction | Side reaction 1 | Side reaction 2 | Main reaction | Side reaction 1 | Side reaction 2 | Main reaction | Side reaction 1 | Side reaction 2 | Main reaction | Side reaction 1 | Side reaction 2 |
| Cell 4 | 4.16 | 3.6 | 3.5 | 1,000 | 70 | 400 | 3.20E−15 | 4.48E−13 | 1.79E−13 | 6.407 | 0.097 | 0.158 |
| Cell 5 | 4.05 | 3.3 | 3.35 | 1,000 | 70 | 400 | 3.20E−15 | 4.48E−13 | 1.57E−13 | 7.092 | 0.097 | 0.149 |
| Cell 6 | 4.2 | 3.6 | 3.5 | 1,000 | 70 | 150 | 2.88E−15 | 4.48E−13 | 1.59E−12 | 6.872 | 0.095 | 0.161 |

Table 8 below shows the results of measuring the capacity retention rate (times), the resistance increase rate (times), and the gas generation amount (cc) in the float test of the respective completed cells.

TABLE 8

| Float test results | | | |
|---|---|---|---|
| | Capacity retention rate [times] | Resistance increase rate [times] | FL gas amount [cc] |
| Cell 4 | 0.983 | 1.163 | 73.7 |
| Cell 5 | 0.999 | 1.179 | 80.6 |
| Cell 6 | 0.978 | 1.002 | 67 |

According to the results shown in Tables 1 to 8, it was found that the capacity retention rate and the resistance increase rate in the cycle test as well as the capacity retention rate, the resistance increase rate, and the gas generation amount in the float test varied linearly with variation in at least one parameter selected from specific parameters. From these results, it is seen that the parameters affected by the capacitor current $I_C$ (A) and the parameters obtained by fitting of the positive electrode potential by the current separation step are useful as factors that predict the cell performance.

FIGS. 8 to 13 are graphs showing the relationship between the doping time (s) and the current density (A/m$^2$) in the doping step of the cells 1 to 6 in Examples, respectively.

<Example of Cell State Determination Method>

For the cells (element precursors) on which the solution injection, impregnation, and sealing steps were performed, the doping step, the cycle aging step, and the high-temperature aging step were performed under the below-described conditions to complete the cells 1 to 6. Thereafter, a durability test was conducted for these cells 1 to 6. In the durability test, a cycle test was conducted for the cells 1 to 3 under the below-described conditions, while a float test was conducted for the cells 4 to 6 under the below-described conditions. Further, the current $I_d$ originating from electrode reactions was separated into currents of the main reaction and the side reactions 1 and 2 by simulation, and the integrated capacity values thereof were each calculated and compared with the results of the durability test.

[Doping Conditions]

As described above, the cell 1 and the cell 4 are the same, the cell 2 and the cell 5 are the same, and the cell 3 and the cell 6 are the same.

Doping Conditions of Cells 1 and 4: at 45° C., 4.2 V-0.4 A→4.5 V-1.4 A cccvCG (cccv 2.5 h) In a 45° C. environment, the cells were each constant-current charged at 0.4 A until the cell voltage reached 4.2 V, and the current value was subsequently changed to 1.4 A to further perform constant-current charging up to 4.5 V. Once the cell voltage reached 4.5 V, the constant-current charging was switched to constant-voltage charging, and doping was continued for 2.5 hours.

Doping Conditions of Cells 2 and 5: at 45° C., 4.2 V-0.8 A→4.5 V-1.4 A cccvCG (cccv 2.5 h) In a 45° C. environment, the cells were each constant-current charged at 0.8 A until the cell voltage reached 4.2 V, and the current value was subsequently changed to 1.4 A to further perform constant-current charging up to 4.5 V. Once the cell voltage reached 4.5 V, the constant-current charging was switched to constant-voltage charging, and doping was continued for 2.5 hours.

Doping Conditions of Cells 3 and 6: at 45° C., 4.2 V-0.4 A→4.5 V-1.4 A cccvCG (cccv 2.5 h)

In a 45° C. environment, the cells were each constant-current charged at 0.4 A until the cell voltage reached 4.2 V, and the current value was subsequently changed to 1.4 A to further perform constant-current charging up to 4.5 V. Once the cell voltage reached 4.5 V, the constant-current charging was switched to constant-voltage charging, and doping was continued for 2.5 hours.

[Cycle Aging Conditions]

Cycle aging step of cells 1 to 6: at 45° C., [4.3 V-5 A-ccvCG (cv 10 min)→2.0 V-5 A-ccvDG (cv 10 min)]×5

(1) In a 45° C. environment, the cells 1 to 6 were each constant-current charged at 10.0 A until the voltage reached 4.3 V, and subsequently constant-voltage charged at 4.3 V for 5 minutes.

(2) In a 45° C. environment, the cells 1 to 6 were each constant-current discharged at 10.0 A until the voltage was reduced to 2.0 V, and subsequently constant-voltage discharged at 2.0 V for 5 minutes.

Taking the above (1) and (2) as a single cycle, a total of five cycles were performed.

[High-Temperature Aging Conditions]

After the cycle aging step, in a 25° C., the cells 1 to 6 were each constant-current charged at 10.0 A until the voltage reached 4.2 V, and then constant-voltage charged at 4.2 V for 30 minutes to adjust the voltage to be 4.2 V. Thereafter, the cells 1 to 6 were stored in a 70° C. incubator for 10 hours.

(Durability Test)

Specific examples of the durability test conducted for the cells 1 to 6 after the high-temperature aging step are described below.

[Cycle Test (Capacity Retention Rate and Resistance Increase Rate)]

In a cycle test, the capacity retention rate and the resistance increase rate are measured when a cell of interest is repeatedly charged and discharged at 25° C., whereby the slope (first half) 1/√CY of the capacity retention rate and that of the resistance increase rate in the period from the start to 10,000th cycle (CY) as well as the slope (second half)

$1/\sqrt{CY}$ of the capacity retention rate and that of the resistance increase rate in the period from 10,000th CY to 200,000th CY can be determined and evaluated. More specifically, for each of the cells 1 to 3, the charge-discharge step of performing constant-current charging up to 3.8 V at a current value of 100 C and then constant-current discharging to 2.2 V at a current value of 100 C was repeated 200,000 times in an incubator set at 25° C. using a charge-discharge device (5 V, 360 A) manufactured by Fujitsu Telecom Networks Ltd.

The capacity was measured by performing constant-current charging up to 3.8 V at a current value of 20 C and then constant-voltage charging with application of a constant voltage of 3.8 V for a total of 30 minutes, and subsequently performing constant-current discharging to 2.2 V at a current value of 2 C. This capacity measurement was performed at least prior to the start of the cycle test, after 10,000 cycles, and after 200,000 cycles. Defining the capacity measured at these time points as Qa, Qb, and Qc, respectively, the slope in the first half of the cycles was calculated by $(Qa-Qb)/\sqrt{10{,}000}$, and the slope in the second half of the cycles was calculated by $(Qb-Qc)/(\sqrt{200{,}000}-\sqrt{10{,}000})$.

The resistance was measured by performing constant-current charging up to 3.8 V at a current value of 20 C and then constant-voltage charging with application of a constant voltage of 3.8 V for a total of 30 minutes, and subsequently performing constant-current discharging to 2.2 V at a current value of 20 C, and a discharge curve (time-voltage) was obtained. In this discharge curve, the voltage at a discharge time=0 second, which was extrapolated by linear approximation from the voltage values at discharge times of 1 second and 2 seconds, was defined as Eo, and the resistance was calculated using the following equations: Voltage drop $\Delta E=3.8-Eo$, and $R=\Delta E/(20\ C$ (current value A)). This resistance measurement was performed at least prior to the start of the cycle test, after 10,000 cycles, and after 200,000 cycles. Defining the resistance measured at these time points as Ra, Rb, and Rc, respectively, the slope in the first half of the cycles was calculated by $(Ra-Rb)/\sqrt{10{,}000}$, and the slope in the second half of the cycles was calculated by $(Rb-Rc)/(\sqrt{200{,}000}-\sqrt{10{,}000})$.

[Float Test (Capacity Retention Rate, Resistance Increase Rate, and Gas Generation Amount)]

In a float test, when a cell of interest is maintained under the conditions of 70° C. and 3.8 V for 500 hours, the slope of the capacity retention rate, the slope of the resistance increase rate, and the gas generation amount can be measured and evaluated. More specifically, using a charge-discharge device (5 V, 360 A) manufactured by Fujitsu Telecom Networks Ltd. in an incubator set at 70° C., the cells 4 to 6 were each constant-current charged up to 3.8 V at a current value of 20 C and then constant-voltage charged with application of a constant voltage of 3.8 V for a total of 500 hours. The cell volume prior to the start of the test, Va, and the cell volume after the start of the test, Vb, were measured in accordance with the Archimedes method, and the gas generation amount was calculated by $Vb-Va$.

The capacity was measured by performing constant-current charging up to 3.8 V at a current value of 20 C and then constant-voltage charging with application of a constant voltage of 3.8 V for a total of 30 minutes, and subsequently performing constant-current discharging to 2.2 V at a current value of 2 C. This capacity measurement was performed prior to the start of the float test and after the completion of the float test, and the capacity retention rate was calculated.

The resistance was measured by performing constant-current charging up to 3.8 V at a current value of 20 C and then constant-voltage charging with application of a constant voltage of 3.8 V for a total of 30 minutes, and subsequently performing constant-current discharging to 2.2 V at a current value of 20 C, and a discharge curve (time-voltage) was obtained. In this discharge curve, the voltage at a discharge time=0 second, which was extrapolated by linear approximation from the voltage values at discharge times of 1 second and 2 seconds, was defined as Eo, and the resistance was calculated using the following equations: Voltage drop $\Delta E=3.8-Eo$, and $R=\Delta E/(20\ C$ (current value A)). This resistance measurement was performed prior to the start of the float test and after the completion of the float test, and the resistance increase rate was calculated.

Additional Description of Examples (i) When the data obtained in the doping step were analyzed and the integrated capacity values of specific currents were calculated from the temporal change in the current $I_d$, the results shown in Table 9 were obtained.

(ii) Subsequently, when the cycle test was conducted in the durability test of the respective completed cells 1 to 3, the evaluation results of the cells 1 to 3 were as shown in Table 10.

(iii) When the float test was conducted in the durability test of the respective completed cells 4 to 6, the evaluation results of the cells 4 to 6 were as shown in Table 10.

(iv) By comparing the amount of each reaction shown in Table 9 and the evaluation results of the tests shown in Table 10, it was found that the gas generation amount in the float test of the cell 5 was outside the target value range. Since the gas generation amount varies with the amount of the side reaction 2, it is seen that, in order to reduce the float gas generation amount to 75 cc or less, it is preferred to use an evaluation criterion that the integrated capacity value of the current of the side reaction 2 is 0.158 $Ah/m^2$ or more.

(v) By using this concept, the state wherein whether or not a completed cell contributes to the required durability performance can be determined by defining the amount of each reaction in the doping step; therefore, it is useful as an item of quality control.

FIGS. 14 to 19 show the temporal change of the current density in each reaction during the doping step of the cells 1 to 6, respectively.

Only the integrated capacity values are shown in the present Examples; however, the temporal change of the current density includes elements attributed to the bulk concentration, the diffusion coefficient, the onset potential, and the like of each reaction, and the reactions occurring in the doping step can be expressed in more detail using such numerical values. Therefore, the temporal change of the current density is also useful information for determining the state wherein whether or not a target value required for a completed cell is achievable.

TABLE 9

| | Integrated capacity [Ah/m$^2$] | | |
|---|---|---|---|
| | Main reaction | Side reaction 1 | Side reaction 2 |
| Cell 1 | 6.611 | 0.097 | 0.158 |
| Cell 2 | 7.169 | 0.104 | 0.149 |
| Cell 3 | 6.939 | 0.097 | 0.164 |
| Cell 4 | 6.407 | 0.097 | 0.158 |
| Cell 5 | 7.092 | 0.097 | 0.149 |
| Cell 6 | 6.872 | 0.095 | 0.161 |

TABLE 10

| | Initial performance | | Cycle test | | Float test | | | |
|---|---|---|---|---|---|---|---|---|
| | Capacity [mAh] | Resistance [mΩ] | Capacity retention rate [times] | Resistance increase rate [times] | Capacity retention rate [times] | Resistance increase rate [times] | Gas generation amount [cc] | Satisfaction or not of target value (○ or x) |
| Cell 1 | 939.9 | 0.848 | 0.847 | 1.058 | — | — | — | ○ |
| Cell 2 | 941.7 | 0.907 | 0.833 | 1.013 | — | — | — | ○ |
| Cell 3 | 955.7 | 0.884 | 0.838 | 1.125 | — | — | — | ○ |
| Cell 4 | 942.7 | 0.882 | — | — | 0.983 | 1.163 | 73.7 | ○ |
| Cell 5 | 941.8 | 0.859 | — | — | 0.999 | 1.179 | 80.6 | x |
| Cell 6 | 952.0 | 0.949 | — | — | 0.978 | 1.002 | 67 | ○ |
| Target value | 935 mAh to 965 mAh | ≤1 mΩ | ≥0.8 | ≤1.2 | ≥0.9 | ≤1.2 | ≤75 cc | |

As described above, a doping method was improved by recognizing the differences between calculations and actual measurements by estimating the status of the progress of the main reaction using the methods of the present disclosure.

INDUSTRIAL APPLICABILITY

According to the current separation method, performance prediction method, and cell state determination method of the present disclosure, the performance of a nonaqueous lithium power storage element can be predicted without performing an inspection or a durability test after the completion of a produced nonaqueous lithium power storage element, and these methods can thus be utilized for, for example, controlling or improving the quality of a nonaqueous lithium power storage element, and designing a nonaqueous lithium power storage element module. More specifically, it is made possible to obtain a learned model which has learned the correlations between the electrode production data as well as the charge-discharge data that are obtained by the methods of the present disclosure and relate to the electrode reactions in the doping step, and the performance or quality of an actual nonaqueous lithium power storage element. By inputting, to this learned model, the electrode production data of an unknown system as well as the charge-discharge data or the status of the progress that relate to the capacitor current or the electrode reaction current in the doping step, the cell state of a nonaqueous lithium power storage element can be determined to predict or control whether or not the nonaqueous lithium power storage element satisfies specific performance and quality level. Alternatively, based on the learned model, the cell design for achieving the performance required for a nonaqueous lithium power storage element, the cell trial production conditions, the electrode trial production conditions, the cell state determination criteria, the physical property evaluation criteria, and the quality control standards can be predicted and decided.

REFERENCE SIGNS LIST

S1: Doping condition setting step
S2: Measurement step
S3: Current calculation step
S4: Positive electrode potential correction step
S5: Current separation step
S6: Parameter calculation step
S7: Prediction step
SS3: Current density calculation step
SS4: Positive electrode potential correction step
SS5: Current separation step

The invention claimed is:

1. A method for predicting performance of a nonaqueous lithium power storage element, wherein the nonaqueous lithium power storage element comprises a cell comprising: a positive electrode precursor that comprises a positive electrode active material layer comprising lithium carbonate and activated carbon; a negative electrode that comprises a negative electrode active material layer comprising a negative electrode active material capable of occluding and releasing lithium; a separator arranged between the positive electrode precursor and the negative electrode; and an electrolyte solution, wherein the method comprises:

(1) a doping condition setting step of setting doping conditions including input current or input voltage;

(2) a measurement step of measuring a positive electrode potential E (V) and a bulk current density i (A/m$^2$) of the cell while applying the input current or the input voltage to the cell;

(3) a current calculation step of, with an assumed positive electrode potential E (V) assumed at the time of modifying the system time by Δt based on the measured positive electrode potential E (V) of the cell, calculating a capacitor current $I_C$ (A) of the cell by the following equation, calculating a capacitor current density $i_C$ (A/m$^2$) of the cell by dividing the capacitor current $I_C$ (A) by a positive electrode precursor area (m$^2$), and calculating, based on the Butler-Volmer equation and the diffusion equation, a current density $i_{R1}$ (A/m$^2$) of an electrode reaction 1 which is a main reaction in which lithium carbonate is decomposed to release lithium ions and electrons, as well as current densities $i_{R2}$ (A/m$^2$) to $i_{RN}$ (A/m$^2$) of electrode reactions 2 to N (wherein, N represents an integer of 3 or larger) which are side reactions:

[Math. 2]

$$I_C = C\frac{dE}{dt}$$

{wherein, $I_C$ represents the capacitor current (A); C represents a capacitor capacity ($F/m^2$) of the cell; E represents the assumed positive electrode potential E (V); and t represents time(s)};

(4) a positive electrode potential correction step of correcting the assumed positive electrode potential E (V) such that a total current density of the capacitor current density $i_C$ and the current densities $i_{R1}$ to $i_{RN}$ of the respective electrode reactions is equal to the bulk current density i, and thereby obtaining a corrected positive electrode potential E (V); and (5) a current separation step of repeating the steps (3) and (4) while modifying the system time such that the total current density converges to the bulk current density i, (6) a parameter calculation step of calculating at least one parameter selected from the group of parameters consisting of an integrated capacity parameter of the capacitor current $I_C$ (A), a positive electrode potential change parameter of a current capacity Q (mAh) of the capacitor current $I_C$ (A), and a temporal change parameter of the positive electrode potential E (V), in a constant-current (CC) charged region; and (7) a prediction step of inputting the thus calculated parameter to a learned model which has learned the correlations between the group of parameters and the performance of the nonaqueous lithium power storage element, and outputting the performance of the nonaqueous lithium power storage element, which performance includes at least one selected from the group consisting of cell capacity, cell resistance, and self-discharge performance, wherein in the parameter calculation step, at least one parameter selected from the group of parameters is calculated based on the capacitor current $I_C$ (A) calculated from the assumed positive electrode potential E (V), or based on the corrected positive electrode potential E (V).

2. The prediction method according to claim 1, wherein parameters of the group of parameters are each calculated in a positive electrode potential E (V) range of x (V) to y (V) {wherein, x and y are each independently 3.3 V to 3.8 V and satisfy x<y} in the constant-current (CC) charged region.

3. The prediction method according to claim 1, wherein the calculations in the step (3) are performed based on the following standards:

(i) in a case where the measured positive electrode potential E (V) is lower than an onset potential of an electrode reaction x (wherein, x corresponds to 1 to N), the current density $i_{Rx}$ of the electrode reaction x is not generated ($0\ A/m^2$);

(ii) in a case where the measured positive electrode potential E (V) is equal to or higher than the onset potential of the electrode reaction x, the current density of the electrode reaction x is determined by the Butler-Volmer equation and, when the thus determined current density is lower than a limiting current density of the electrode reaction x, this current density is defined as the current density $i_{Rx}$ of the electrode reaction x; and (iii) in a case where the current density determined based on the above-described (ii) is equal to or higher than the limiting current density of the electrode reaction x, a current density determined by the diffusion equation and the Butler-Volmer equation is defined as the current density $i_{Rx}$ of the electrode reaction x.

4. A method of producing a nonaqueous lithium power storage element, the method comprising predicting at least one performance selected from the group consisting of cell capacity, cell resistance, and self-discharge performance by the prediction method according to claim 1 at the time of doping the nonaqueous lithium power storage element, and not performing an inspection of the thus predicted performance.

5. A method for predicting durability performance of a nonaqueous lithium power storage element, wherein the nonaqueous lithium power storage element comprises a cell comprising: a positive electrode precursor that comprises a positive electrode active material layer comprising lithium carbonate and activated carbon; a negative electrode that comprises a negative electrode active material layer comprising a negative electrode active material capable of occluding and releasing lithium; a separator arranged between the positive electrode precursor and the negative electrode; and an electrolyte solution, wherein the method comprises:

(1) a doping condition setting step of setting doping conditions including input current or input voltage;

(2) a measurement step of measuring the positive electrode potential E (V) and a bulk current I (A) of the cell while applying the input current or the input voltage to the cell;

(3) a current calculation step of, with an assumed positive electrode potential E (V) assumed at the time of modifying the system time by Δt based on the measured positive electrode potential E (V) of the cell, calculating a capacitor current $I_C$ (A) and a electrode reaction current $I_d$ (A) of the cell by the following equations, calculating a bulk current density i ($A/m^2$) and a capacitor current density $i_C$ ($A/m^2$) by dividing the bulk current I (A) and the capacitor current $I_C$ (A) by a positive electrode precursor area ($m^2$), respectively, and calculating, based on the Butler-Volmer equation and the diffusion equation, a current density $i_{R1}$ ($A/m^2$) of an electrode reaction 1 which is a main reaction in which lithium carbonate is decomposed to release lithium ions and electrons, as well as current densities $i_{R2}$ ($A/m^2$) to $i_{RN}$ ($A/m^2$) of electrode reactions 2 to N (wherein, N represents an integer of 3 or larger) which are side reactions:

[Math. 4]

$$I_C = C\frac{dE}{dt}$$

$$I_d = I - I_C$$

{wherein, $I_C$ represents the capacitor current (A); C represents a capacitor capacity ($F/m^2$) of the cell; E represents the assumed positive electrode potential (V); t represents time(s); and I represents the bulk current (A)};

(4) a positive electrode potential correction step of correcting the assumed positive electrode potential E (V) such that a total current density of the capacitor current density $i_C$ and the current densities $i_{R1}$ to $i_{RN}$ of the respective electrode reactions is equal to the bulk current density i, and thereby obtaining a corrected positive electrode potential E (V); and (5) a current separation step of repeating the steps (3) and (4) while modifying the system time such that the total current density converges to the bulk current density i, (6) a parameter calculation step of calculating at least one parameter selected from the group of parameters consisting of an integrated capacity parameter of the electrode reaction current $I_d$ (A), a positive electrode potential change parameter of a current capacity (mAh) of the electrode reaction current $I_d$ (A), and a temporal change parameter of the positive electrode potential E (V), in a constant-current (CC) charged region; and (7) a prediction step of inputting the thus calculated parameter to a learned model which has learned the correlations between the group of parameters and the durability performance of the nonaqueous lithium power storage element, and outputting the durability performance of the nonaqueous lithium power storage element, wherein in the parameter calculation step, at least one parameter selected from the group of parameters is calculated based on the electrode reaction current $I_d$ (A) calculated from the assumed positive electrode potential E (V), or based on the corrected positive electrode potential E (V).

6. The prediction method according to claim 5, wherein parameters of the group of parameters are each calculated in a positive electrode potential E (V) range of x (V) to y (V) {wherein, x and y are each independently larger than 3.8 V and satisfy x<y} in the constant-current (CC) charged region.

7. The prediction method according to claim 5, wherein the calculations in the step (3) are performed based on the following standards:

(i) in a case where the measured positive electrode potential E (V) is lower than an onset potential of an electrode reaction x (wherein, x corresponds to 1 to N), the current density $i_{Rx}$ of the electrode reaction x is not generated (0 A/m$^2$);

(ii) in a case where the measured positive electrode potential E (V) is equal to or higher than the onset potential of the electrode reaction x, the current density of the electrode reaction x is determined by the Butler-Volmer equation and, when the thus determined current density is lower than a limiting current density of the electrode reaction x, this current density is defined as the current density $i_{Rx}$ of the electrode reaction x; and (iii) in a case where the current density determined based on the above-described (ii) is equal to or higher than the limiting current density of the electrode reaction x, a current density determined by the diffusion equation and the Butler-Volmer equation is defined as the current density $i_{Rx}$ of the electrode reaction x.

8. The prediction method according to claim 7, wherein in the standard (ii), the Butler-Volmer equation of the respective electrode reactions 1 to N is represented by:

[Math. 5]

$$i_{Rx} = i_{0x}\left\{\left(\frac{C_{Rx}}{C_{Rx}^R}\right)^{m_x}\exp\left(\frac{\alpha_x n_x F}{RT}\eta_x\right) - \exp\left(-\frac{(1-\alpha_x)n_x F}{RT}\eta_x\right)\right\}$$

-continued $$\eta_x = E - E_x^{eq}$$

{wherein, $i_{Rx}$ represents the current density (A/m$^2$) of the electrode reaction x (wherein, x corresponds to 1 to N); $i_{0x}$ represents an exchange current density (A/m$^2$) of the electrode reaction x;

$C_{Rx}$ and $C_{Rx}^e$ represent a reductant surface concentration (mol/m$^3$) and a reductant bulk concentration (mol/m$^3$) of the electrode reaction x, respectively; $m_x$ represents a reaction order (=1); ox represents a symmetry factor of the electrode reaction x; $n_x$ represents a valence of the electrode reaction x; F represents the Faraday constant; R represents the gas constant; T represents the temperature (K); $\eta_x$ represents an overvoltage (V) of the electrode reaction x; E represents the assumed positive electrode potential (V); and $E_x^{eq}$ represents the onset potential (V) of the electrode reaction x}, and in the standard (iii), the diffusion equation of the respective electrode reactions 1 to N is represented by:

[Math. 6]

$$\frac{\partial C_{Rx}}{\partial t} = D_x\frac{\partial^2 C_{Rx}}{\partial r^2}$$

{wherein, t represents time(s); $C_{Rx}$ represents the reductant surface concentration (mol/m$^3$) of the electrode reaction x (wherein, x corresponds to 1 to N); $D_x$ represents a reductant diffusion coefficient (m$^2$/s); and r represents a diffusion layer thickness (m)}, with a proviso that:

when r=0,

[Math. 7]

$$C_{Rx} = C_{Rx}^e$$

{wherein, $C_{Rx}^e$ represents the reductant bulk concentration (mol/m$^3$)}; or when r=L$_0$ (diffusion layer thickness),

[Math. 8]

$$-D_x\frac{\partial C_{Rx}}{\partial r} = Q_x = \frac{i_{Rx}}{n_x F}$$

{wherein, $n_x$ represents the valence of the electrode reaction x; F represents the Faraday constant; $Q_x$ represents a reductant mass flux (mol/m$^2$s); and $i_{Rx}$ represents the current density (A/m$^2$) of the electrode reaction x}.

9. The prediction method according to claim 8, wherein the side reactions comprise an electrode reaction that is a water splitting reaction, and an electrode reaction that is a decomposition reaction of an electrolyte solution solvent.

10. The prediction method according to claim 7, wherein the learned model used for predicting the durability performance of the nonaqueous lithium power storage element is a learned model which has learned the correlations between:

at least one parameter selected from the group of parameters consisting of an integrated capacity parameter of an electrode reaction current $I_d$ (A), a positive electrode potential change parameter of a current capacity (mAh)

of the electrode reaction current $I_d$ (A), and a temporal change parameter of the positive electrode potential E (V), in a constant-current (CC) charged region; or the group of parameters consisting of an integrated capacity parameter of the capacitor current $I_C$ (A), a positive electrode potential change parameter of a current capacity Q (mAh) of the capacitor current $I_C$ (A), and a temporal change parameter of the positive electrode potential E (V), in the constant-current (CC) charged region, which parameters are obtained from the doping step of the cell; and electrode production conditions, doping conditions, aging conditions, cell design, and the cell performance.

11. A learned model, obtained based on the method according to claim 10.

12. A cell state determination method of a nonaqueous lithium power storage element, the method using a nonaqueous lithium power storage element, wherein the nonaqueous lithium power storage element comprises a cell comprising: a positive electrode precursor that comprises a positive electrode active material layer comprising lithium carbonate and activated carbon; a negative electrode that comprises a negative electrode active material layer comprising a negative electrode active material capable of occluding and releasing lithium; a separator arranged between the positive electrode precursor and the negative electrode; and an electrolyte solution, wherein the method comprises:

(S1) a doping condition setting step of setting doping conditions including cell temperature and input voltage;

(S2) a measurement step of measuring a positive electrode potential E (V) and a bulk current density i ($A/m^2$) of the cell while applying the input voltage to the cell;

(S3) a current calculation step of calculating a capacitor current $I_c$ of the cell and a current $I_d$ originating from electrode reactions by current separation based on the positive electrode potential E and the bulk current density i of the cell, which are measured in the step (S2), and a positive electrode precursor area ($m^2$), using the following equations:

[Math. 9]

$$I_C = C\frac{dE}{dt}$$

$$I_d = I - I_c$$

$$i_d = i - i_c$$

{wherein, I represents a bulk current (A); i represents a bulk current density ($A/m^2$); $I_d$ represents the current (A) originating from electrode reactions; $i_d$ represents a current density ($A/m^2$) originating from the electrode reactions; $I_C$ represents the capacitor current (A) of the cell; $i_c$ represents a capacitor current density ($A/m^2$) of the cell; C represents a capacitor capacity (F); E represents the positive electrode potential E (V) of the cell; and t represents time(s)}; and (S4) a state determining step of determining the state of the cell from a temporal change ($dI_d/dt$) of the current $I_d$ originating from the electrode reactions.

13. The cell state determination method according to claim 12, wherein, in the state determining step:

the state of the cell is determined based on an integrated capacity value of at least one selected from the capacitor current $I_c$ of the cell and the current $I_d$ originating from electrode reactions, or the state of the cell is determined by extracting sample information approximate to required characteristics from a learning model comprising an integrated capacity value of at least one selected from the capacitor current $I_C$ of the cell and the current $I_d$ originating from electrode reactions.

14. The cell state determination method according to claim 12, wherein the current $I_d$ originating from electrode reactions is composed of currents of electrode reactions comprising the following as main components:

main reaction: decomposition reaction of lithium carbonate;

side reaction 1: water splitting reaction; and side reaction 2: decomposition reaction of an electrolyte solution solvent, and the integrated capacity value of a specific current that serves as a criterion of determination in the state determining step is one of the following:

the integrated capacity value of the current of the main reaction is 5 $Ah/m^2$ to 10 $Ah/m^2$, the integrated capacity value of the current of the side reaction 1 is 0.01 $Ah/m^2$ to 0.3 $Ah/m^2$, and the integrated capacity value of the current of the side reaction 2 is 0.05 $Ah/m^2$ to 0.5 $Ah/m^2$.

15. The cell state determination method according to claim 12, wherein the current $I_d$ originating from electrode reactions is composed of currents of electrode reactions comprising the following as main components:

main reaction: decomposition reaction of lithium carbonate;

side reaction 1: water splitting reaction; and side reaction 2: decomposition reaction of an electrolyte solution solvent, the main components are defined by the following procedures:

(SS3) the current density calculation step of assuming the positive electrode potential E (V) at the time of modifying the system time by Δt, calculating the capacitor current density $i_c$ ($A/m^2$) of the cell, and calculating the current of each of the main reaction in which lithium carbonate is decomposed to release lithium ions and electrons, the side reaction 1 which is a water splitting reaction, and the side reaction 2 which is a decomposition reaction of an electrolyte solution solvent, based on the below-described standards;

(SS4) the positive electrode potential correction step of correcting the thus assumed positive electrode potential E such that a total current density of the capacitor current $i_C$ and the current densities $i_{R1}$ to $i_{RN}$ of the respective electrode reactions is equal to the bulk current density i, and thereby obtaining a corrected positive electrode potential E; and (SS5) the current separation step of repeating the steps (SS3) and (SS4) while modifying the system time such that the total current density converges to the bulk current density i, and the standards in the step (SS3) are the following:

(i) in a case where the measured positive electrode potential E is lower than an onset potential of an electrode reaction x (wherein, x corresponds to 1 to N), the current density $i_{Rx}$ of the electrode reaction x is not generated (0 $A/m^2$);

(ii) in a case where the measured positive electrode potential E (V) is equal to or higher than the onset potential of the electrode reaction x, the current density of the electrode reaction x is determined by the Butler-Volmer equation and, when the thus determined current density is lower than a limiting current density of the electrode reaction x, this current density is defined as the current density $i_{Rx}$ of the electrode reaction x; and (iii) in a case where the current density determined based on the above-described (ii) is equal to or higher than the limiting current density of the electrode reaction x, a current density determined by the diffusion equation and the Butler-Volmer equation is defined as the current density $i_{Rx}$ of the electrode reaction x.

16. The cell state determination method according to claim 12, wherein the current $I_d$ originating from electrode reactions is composed of currents of electrode reactions comprising the following as main components:

main reaction: decomposition reaction of lithium carbonate;

side reaction 1: water splitting reaction; and side reaction 2: decomposition reaction of an electrolyte solution solvent, the main components are defined by the following procedures:

(SS3) the current density calculation step of assuming the positive electrode potential E (V) at the time of modifying the system time by Δt, calculating the capacitor current density $i_C$ ($A/m^2$) of the cell, and calculating the current of each of the main reaction in which lithium carbonate is decomposed to release lithium ions and electrons, the side reaction 1 which is a water splitting reaction, and the side reaction 2 which is a decomposition reaction of an electrolyte solution solvent, based on the below-described standards;

(SS4) the positive electrode potential correction step of correcting the thus assumed positive electrode potential E such that a total current density of the capacitor current $i_C$ and the current densities $i_{R1}$ to $i_{RN}$ of the respective electrode reactions is equal to the bulk current density i, and thereby obtaining a corrected positive electrode potential E; and (SS5) the current separation step of repeating the steps (SS3) and (SS4) while modifying the system time such that the total current density converges to the bulk current density i, and the standards in the step (SS3) are the following:

(i) in a case where the measured positive electrode potential E is lower than an onset potential of an electrode reaction x (wherein, x corresponds to 1 to N), the current density $i_{Rx}$ of the electrode reaction x is not generated (0 $A/m^2$);

(ii) in a case where the measured positive electrode potential E (V) is equal to or higher than the onset potential of the electrode reaction x, the current density of the electrode reaction x is determined by the Butler-Volmer equation and, when the thus determined current density is lower than a limiting current density of the electrode reaction x, this current density is defined as the current density $i_{Rx}$ of the electrode reaction x; and (iii) in a case where the current density determined based on the above-described (ii) is equal to or higher than the limiting current density of the electrode reaction x, a current density determined by the diffusion equation and the Butler-Volmer equation is defined as the current density $i_{Rx}$ of the electrode reaction x.

17. A method of producing a nonaqueous lithium power storage element, the method comprising the cell state determination method according to claim 12.

* * * * *